(12) United States Patent
Noto

(10) Patent No.: US 12,367,221 B2
(45) Date of Patent: Jul. 22, 2025

(54) DETERMINING DATA INHERITANCE OF DATA SEGMENTS

(71) Applicant: Ancestry.com DNA, LLC, Lehi, UT (US)

(72) Inventor: Keith D. Noto, San Francisco, CA (US)

(73) Assignee: Ancestry.com DNA, LLC, Lehi, UT (US)

( * ) Notice: Subject to any disclaimer, the term of this patent is extended or adjusted under 35 U.S.C. 154(b) by 0 days.

(21) Appl. No.: 18/754,109

(22) Filed: Jun. 25, 2024

(65) Prior Publication Data

US 2024/0411781 A1   Dec. 12, 2024

Related U.S. Application Data

(63) Continuation of application No. 18/377,487, filed on Oct. 6, 2023, now Pat. No. 12,050,629, which is a continuation-in-part of application No. 16/936,444, filed on Jul. 23, 2020.

(60) Provisional application No. 63/542,636, filed on Oct. 5, 2023, provisional application No. 63/534,810, filed on Aug. 25, 2023, provisional application No. 62/882,188, filed on Aug. 2, 2019.

(51) Int. Cl.
   *G06F 16/00*   (2019.01)
   *G06F 16/28*   (2019.01)
   *G06F 16/31*   (2019.01)

(52) U.S. Cl.
   CPC .......... *G06F 16/285* (2019.01); *G06F 16/322* (2019.01)

(58) Field of Classification Search
   CPC .............. G06F 16/285; G06F 16/322

USPC ........................................................ 707/737
See application file for complete search history.

(56) References Cited

U.S. PATENT DOCUMENTS

| | | | |
|---|---|---|---|
| 6,570,567 B1 | 5/2003 | Eaton |
| 7,062,752 B2 | 6/2006 | Simpson et al. |
| 7,249,129 B2 | 7/2007 | Cookson et al. |
| 7,818,281 B2 | 10/2010 | Kennedy et al. |
| 8,510,057 B1 | 8/2013 | Avey et al. |
| 8,769,438 B2 | 7/2014 | Mangum et al. |

(Continued)

FOREIGN PATENT DOCUMENTS

| | | |
|---|---|---|
| WO | WO 02/17190 A1 | 2/2002 |
| WO | WO 2012/099890 A1 | 7/2012 |

(Continued)

OTHER PUBLICATIONS

PCT International Search Report and Written Opinion, PCT Application No. PCT/US2024/042974, Dec. 6, 2024, 16 pages.

*Primary Examiner* — Alexandria Y Bromell
(74) *Attorney, Agent, or Firm* — Fenwick & West LLP

(57) ABSTRACT

A computing device may receive a target data instance. The computing device may identify a plurality of matched segments that match to the target data instance for at least a threshold length. The computing device may define, based on overlapping of the matched segments, the target data instance as a plurality of data string ranges, wherein each divided data string is matched to a set of overlapping matched segments. The computing device may apply an iterative clustering algorithm to group the plurality of data string ranges based on values of a similarity metric among data string ranges that are assigned to a given group. The computing device may attribute a first set of data string ranges that are assigned to a first group to a first inheritance.

30 Claims, 26 Drawing Sheets

(56) References Cited

U.S. PATENT DOCUMENTS

| | | | |
|---|---|---|---|
| 9,116,882 B1 | 8/2015 | Macpherson et al. | |
| 9,213,944 B1 | 12/2015 | Do et al. | |
| 9,213,947 B1 | 12/2015 | Do et al. | |
| 9,336,177 B2 | 5/2016 | Hawthorne et al. | |
| 9,367,800 B1 | 6/2016 | Do et al. | |
| 9,836,576 B1 | 12/2017 | Do et al. | |
| 9,864,835 B2 | 1/2018 | Avey et al. | |
| 9,977,708 B1 * | 5/2018 | Do | G16B 40/20 707/707 |
| 10,114,922 B2 | 10/2018 | Byrnes et al. | |
| 10,223,498 B2 | 3/2019 | Han et al. | |
| 10,347,365 B2 | 7/2019 | Wong et al. | |
| 10,354,745 B2 | 7/2019 | Wong et al. | |
| 10,558,930 B2 | 2/2020 | Noto et al. | |
| 10,679,729 B2 | 6/2020 | Ball et al. | |
| 2002/0019746 A1 | 2/2002 | Rienhoff et al. | |
| 2002/0143578 A1 | 10/2002 | Cole et al. | |
| 2003/0059808 A1 | 3/2003 | Liu et al. | |
| 2003/0101000 A1 | 5/2003 | Bader et al. | |
| 2003/0113727 A1 | 6/2003 | Girn et al. | |
| 2003/0172065 A1 | 9/2003 | Sorenson et al. | |
| 2004/0083226 A1 | 4/2004 | Eaton | |
| 2004/0093334 A1 | 5/2004 | Scherer | |
| 2004/0126840 A1 | 7/2004 | Cheng et al. | |
| 2005/0089852 A1 | 4/2005 | Lee et al. | |
| 2005/0147947 A1 | 7/2005 | Cookson et al. | |
| 2005/0164704 A1 | 7/2005 | Winsor | |
| 2005/0164705 A1 | 7/2005 | Rajkotia et al. | |
| 2005/0192008 A1 | 9/2005 | Desai et al. | |
| 2007/0050354 A1 | 3/2007 | Rosenberg | |
| 2007/0260599 A1 | 11/2007 | McGuire et al. | |
| 2008/0027656 A1 | 1/2008 | Parida | |
| 2008/0040046 A1 | 2/2008 | Chakraborty et al. | |
| 2008/0081331 A1 | 4/2008 | Myres et al. | |
| 2008/0082955 A1 | 4/2008 | Andreessen et al. | |
| 2008/0113727 A1 | 5/2008 | Vallejo et al. | |
| 2008/0154566 A1 | 6/2008 | Myres et al. | |
| 2008/0162510 A1 | 7/2008 | Baio et al. | |
| 2008/0255768 A1 | 10/2008 | Martin et al. | |
| 2009/0030985 A1 | 1/2009 | Yuan | |
| 2012/0054190 A1 | 3/2012 | Peters | |
| 2012/0191903 A1 | 7/2012 | Araki et al. | |
| 2012/0283108 A1 | 11/2012 | Sampas | |
| 2013/0085728 A1 | 4/2013 | Tang et al. | |
| 2013/0149707 A1 | 6/2013 | Sorenson et al. | |
| 2013/0297221 A1 | 11/2013 | Johnson et al. | |
| 2014/0045705 A1 | 2/2014 | Bustamante et al. | |
| 2014/0067355 A1 | 3/2014 | Noto et al. | |
| 2014/0082568 A1 | 3/2014 | Hulet et al. | |
| 2014/0108527 A1 | 4/2014 | Aravanis et al. | |
| 2014/0278138 A1 | 9/2014 | Barber et al. | |
| 2016/0026755 A1 | 1/2016 | Byrnes et al. | |
| 2017/0213127 A1 | 7/2017 | Duncan | |
| 2017/0220738 A1 | 8/2017 | Barber et al. | |
| 2017/0262577 A1 | 9/2017 | Ball et al. | |
| 2017/0277827 A1 | 9/2017 | Granka et al. | |
| 2019/0139623 A1 | 5/2019 | Bryc et al. | |
| 2021/0034647 A1 | 2/2021 | Nguyen et al. | |
| 2023/0019141 A1 * | 1/2023 | Garrigan | G16B 20/10 707/707 |

FOREIGN PATENT DOCUMENTS

| | | |
|---|---|---|
| WO | WO 2014/145280 A1 | 9/2014 |
| WO | WO 2016/061260 A1 | 4/2016 |
| WO | WO 2016/061568 A1 | 4/2016 |

* cited by examiner

DETERMINING DATA INHERITANCE OF DATA SEGMENTS

CROSS-REFERENCE TO RELATED APPLICATIONS

The present application is a continuation of U.S. patent application Ser. No. 18/377,487, filed on Oct. 6, 2023, which claims the benefit of U.S. Provisional Patent Application No. 63/534,810, filed on Aug. 25, 2023, and U.S. Provisional Patent Application No. 63/542,636, filed on Oct. 5, 2023. The present application is also a continuation-in-part of U.S. application Ser. No. 16/936,444, filed on Jul. 23, 2020, which claims priority from a provisional application No. 62/882,188, filed on Aug. 2, 2019. All of the above referenced applications are hereby incorporated by reference in their entirety.

FIELD

The disclosed embodiments relate to linking datasets in a database and more specifically to linking datasets by using a clustering technique.

BACKGROUND

A large-scale database such as a database of an online database that has millions of users can include billions of data records. This type of database may allow users to build make meaningful discoveries through examining various data records. Users may try to identify relevant data in the database. However, identifying relevant data in the sheer amount of data is not a trivial task. Datasets associated with different individuals or events may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures or characteristics of two apparently unrelated named entities, or any combination of natures. However, the two data instances or corresponding events or named entities may be inherited from one or more common sources so that the two data instances share some similarities in the data.

SUMMARY

In some embodiments, the techniques described herein relate to a computer-implemented method for determining data inheritance of data segments, the computer-implemented method including: receiving a target data instance; identifying a plurality of matched data segments that match to the target data instance for at least a threshold length; defining, based on overlapping of the matched data segments, the target data instance as a plurality of data string ranges, wherein each divided data string range is matched to a set of overlapping matched data segments; applying an iterative clustering algorithm to group the plurality of data string ranges based on values of a similarity metric among data string ranges that are assigned to a given group; and attributing a first set of data string ranges that are assigned to a first group to a first data inheritance.

In some embodiments, the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

In some embodiments, the matched data segments are retrieved from a database of close data matches, each close data match sharing a total length with the target data instance for at least a second threshold length that is larger than the threshold length.

In some embodiments, defining the target data instance as a plurality of data string ranges includes: identifying a plurality of informative sites, an informative site being a site with heterozygous position-specific data string value values in the target data instance and a homogeneous data value in two or more matched data segments, identifying a conflicting informative site, the conflicting informative site being an informative site where the two or more matched data segments have contradicting homozygous position-specific data string values at the conflicting informative site, breaking up at least one of the matched data segments of the two or more matched data segments at a breakpoint based on the conflicting informative site, and delimiting two data string ranges of the target data instance at the breakpoint.

In some embodiments, the iterative clustering algorithm includes: examining a first candidate assignment that assigns a first candidate set of data string ranges to a given group, determining a first value of the similarity metric of the first candidate set, examining a second candidate assignment that assigns a second candidate set of data string ranges to the given group, determining a second value of the similarity metric of the second candidate set, and selecting the second candidate assignment.

In some embodiments, the iterative clustering algorithm includes two or more stages, and the two or more stages include a first clustering tree stage and a refinement stage.

In some embodiments, the iterative clustering algorithm includes: constructing a similarity matrix for the plurality of data string ranges, the similarity matrix includes values of the similarity metric of two given data string ranges, constructing a clustering tree that assigns, based on the values in the similarity matrix, the plurality of data string ranges into positions of nodes in the clustering tree, and dividing the clustering tree into two or more branches, each branch including a plurality of nodes and corresponding to a group assignment.

In some embodiments, the iterative clustering algorithm includes: examining a candidate assignment, determining an objective function is based on the similarity metric, swapping, iteratively, one or more data string ranges from a first group to a second group or vice versa to improve a value of the objective function.

In some embodiments, the objective function is further based on a distribution of real-life data events.

In some embodiments, a value of the similarity metric of two given data string ranges is determined based on lengths of matched data segments corresponding to a matched data instance whose segments are classified as matched data segments in both of the two given data string ranges.

In some embodiments, a value of the similarity metric of two given data string ranges is determined further based on (1) a first length of data string matched segment corresponding to a matched data instance in a first data string range of the two given data string ranges and (2) a second length of data string matched segment correspond to the matched data instance's second-degree relative in a second data string range of the two given data string ranges.

In some embodiments, the techniques described herein relate to a computer-implemented method, further including performing a filtering to remove one or more matched data segments prior to applying the iterative clustering algorithm, wherein the filtering includes: determining one or more candidate matched data segments belonging to potential descendant of two or more data inheritances, identifying, from the one or more candidate matched data segments, a data string matched segment that belong to a descendant of the two or more data inheritances, and removing the identified data string matched segment.

In some embodiments, the techniques described herein relate to a computer-implemented method, further including: applying the iterative clustering algorithm again to the first set of data string ranges of the target data instance to group the first set of data string ranges into at least a subset of data string ranges, the subset of data string ranges an earlier data inheritance in the first data inheritance.

In some embodiments, the techniques described herein relate to a computer-implemented method, further including: identifying a data expression; determining the data expression is attributable to position-specific data string values in the first set of data string ranges; and reporting that the data expression of the target data instance is passed down from the first data inheritance.

In some embodiments, the plurality of matched data segments are matched based on data bits.

In some embodiments, the techniques described herein relate to a system including: one or more processors; and memory configured to store code including instructions, wherein the instructions, when executed by the one or more processors, cause the one or more processors to perform: receiving a target data instance; identifying a plurality of matched data segments that match to the target data instance for at least a threshold length; defining, based on overlapping of the matched data segments, the target data instance as a plurality of data string ranges, wherein each divided data string range is matched to a set of overlapping matched data segments; applying an iterative clustering algorithm to group the plurality of data string ranges based on values of a similarity metric among data string ranges that are assigned to a given group; and attributing a first set of data string ranges of the target data instance that are assigned to a first group to a first data inheritance.

In some embodiments, the techniques described herein relate to a system, wherein the target data instance is a structured data instance, and the iterative clustering algorithm assigns the first set of data string ranges to a first data inheritance source belong to the first data inheritance and the iterative clustering algorithm assigns a second set of data string ranges to a second data inheritance source.

In some embodiments, the techniques described herein relate to a system, wherein the matched data segments are retrieved from a database of close data matches, each close data match sharing IBD with the target data instance for at least a second threshold length that is larger than the threshold length.

In some embodiments, the techniques described herein relate to a system, wherein defining the target data instance as a plurality of data string ranges includes: identifying a plurality of informative sites, an informative site being a site with heterozygous position-specific data string value values in the target data instance and a homogeneous data value in two or more matched data segments, identifying a conflicting informative site, the conflicting informative site being an informative site where the two or more matched data segments have contradicting homozygous position-specific data string values at the conflicting informative site, breaking up at least one of the matched data segments of the two or more matched data segments at a breakpoint based on the conflicting informative site, and delimiting two data string ranges of the target data instance at the breakpoint.

In some embodiments, the techniques described herein relate to a non-transitory computer-readable medium configured to store code including instructions, wherein the instructions, when executed by one or more processors, cause the one or more processors to perform: receiving a target data instance; identifying a plurality of matched data segments that match to the target data instance for at least a threshold length; defining, based on overlapping of the matched data segments, the target data instance as a plurality of data string ranges, wherein each divided data string range is matched to a set of overlapping matched data segments; applying an iterative clustering algorithm to group the plurality of data string ranges based on values of a similarity metric among data string ranges that are assigned to a given group; and attributing a first set of data string ranges of the target data instance that are assigned to a first group to a first data inheritance.

In some embodiments, a non-transitory computer readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and a storage medium that is configured to store instructions. The instructions, when executed by one or more processors, cause the one or more processors to perform a process that includes steps described in the above computer-implemented methods or described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
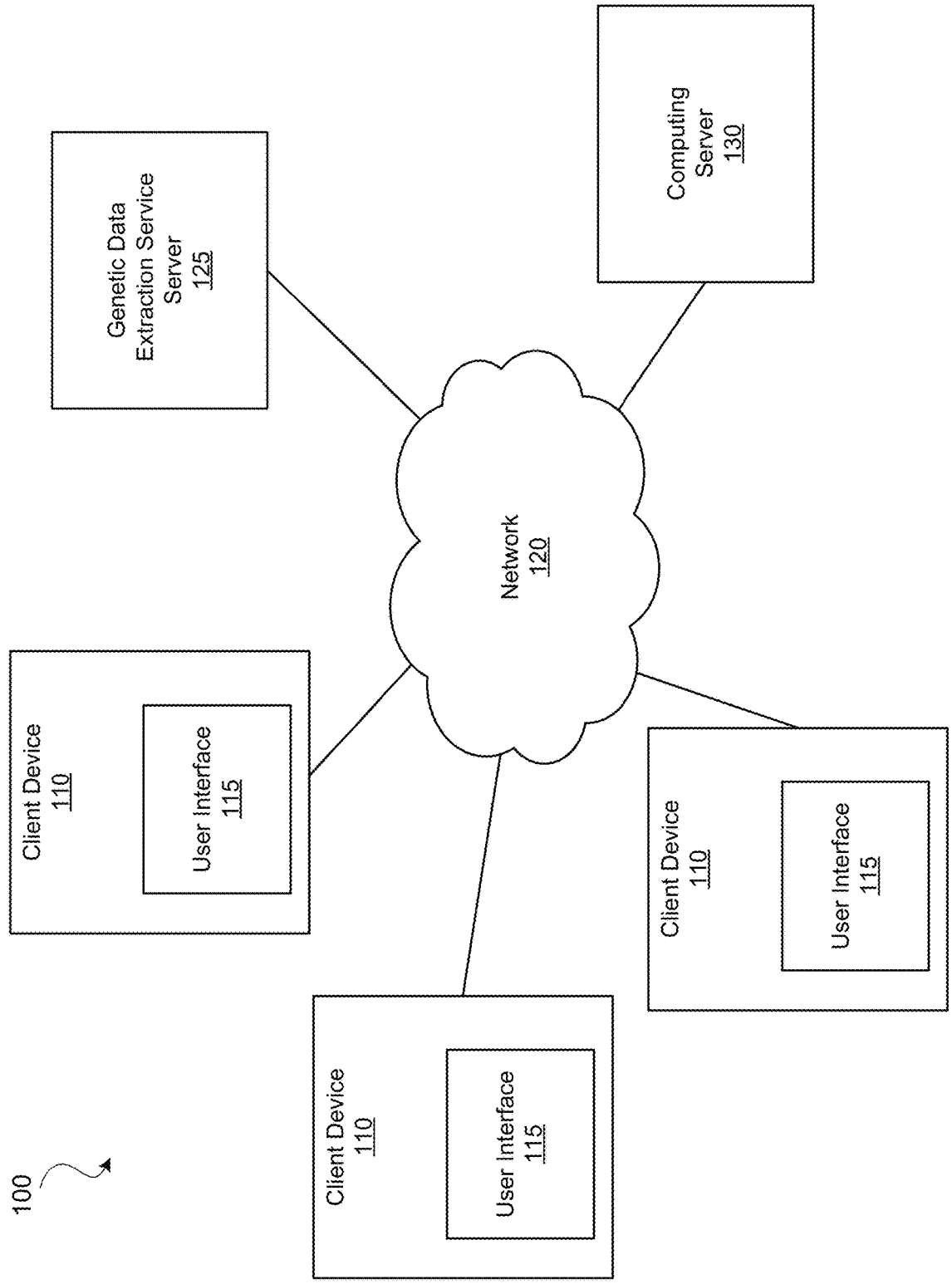
FIG. 1 illustrates a diagram of a system environment of an example computing system, in accordance with some embodiments.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2A:
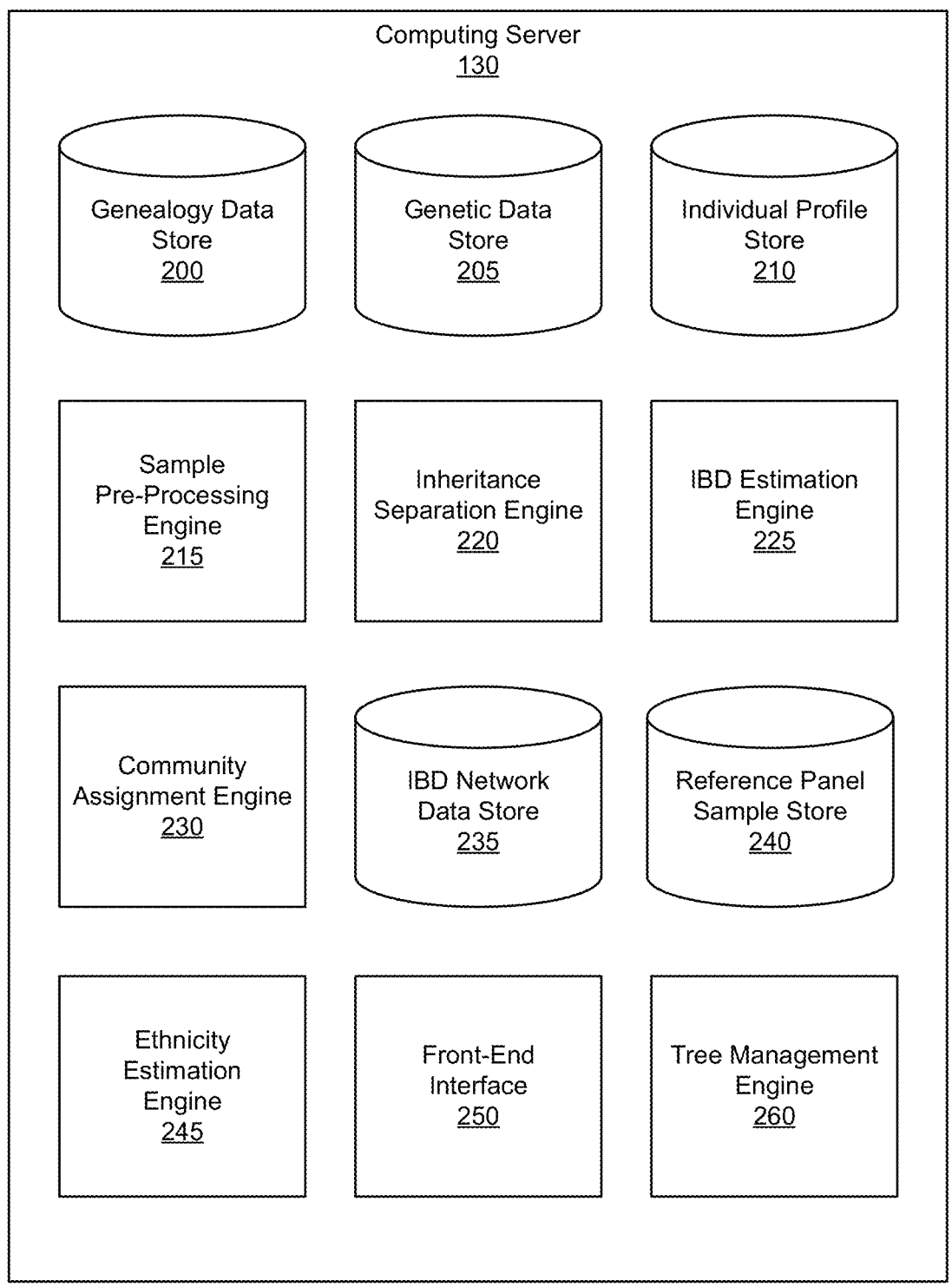
FIG. 2A is a block diagram of an architecture of an example computing system, in accordance with some embodiments.

FIG. 2A is a block diagram of an architecture of an example computing server 130, in accordance with some embodiments. In the embodiment shown in FIG. 2A, the computing server 130 includes a genealogy data store 200, a genetic data store 205, an individual profile store 210, a sample pre-processing engine 215, an inheritance separation engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. An ancestor here does not imply that the person is deceased. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may also be referred to as a genomic dataset, which may include a digital dataset of nucleotide data (e.g., SNP data), SNP positions, and corresponding metadata. A genomic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles at each SNP site. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile.

For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the inheritance separation engine 220 which phases the individual's diploid genotypes to generate a pair of haplotypes for each user.

The inheritance separation engine 220 may separate genetic data of individuals into genomic ranges that determine how each genomic range may be inherited from an ancestor. For example, the inheritance separation engine 220 may phase diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The inheritance separation engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The inheritance separation engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the inheritance separation engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The inheritance separation engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long-distance accuracy in terms of haplotype separation. For example, in some embodiments, a jig phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of subcluster pairs of first parental groups and second parental groups. Each subcluster pair may be in a window. The window may correspond to a genomic segment and has a similar concept of window used in the ethnicity estimation engine 245 and the rest of the disclosure related to HMMs, but how windows are precisely divided and defined may be the same or different in the inheritance separation engine 220 and in an HMM. Each subcluster pair may correspond to a genetic locus. In some embodiments, each subcluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of subcluster pairs). Generating the super-cluster of the parental side may include generating a candidate parental side assignment of parental groups across a set of subcluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

In some embodiments, the phasing of haplotypes may be the first level of separation in inheritance separation. The inheritance separation engine 220 may use an inheritance separation process to further separate DNA material from one parent into DNA materials of two grandparents. At an even higher level of separation, the DNA materials of a grandparent may be further separated into higher-level ancestors.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity.

For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine subclusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the subclusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Data Inheritance Determination

Data may be inherited and evolved based on real-world events that are not always recorded or documented. Yet, while the real-world events may not be completely documented, the change and inheritance of those events may be traceable by comparing data strings among data instances. For example, two data instances may be generated independently and individually reflect the status of their respective named entities or events. The data patterns in the data instances may reflect the natures, histories, or characteristics of data inheritance sources such as related or unrelated named entities or events. However, multiple data instances or corresponding named entities or events may be inherited from one or more common sources so that the data instances share some similarities in the data pattern. As such, the nature of inheritance may be revealed by analyzing and comparing the multiple data instances, and sometimes a large number of data instances. Those real-life events that result in shared data strings among data instances may be referred to as data inheritance events, even though those real-life events, at the time of the occurrence, may not involve data or data generation at all. For example, the real-life events may be historical events that occurred before the invention of computer or data but present data instances may still reflect those historical events.

In some cases, however, only portions of data strings are inherited from a data inheritance event and the precise locations and extent of inheritance are not apparent without a complex process to analyze and compare the one or more data instances. In some cases, for a given data instance, it may be difficult to identify how various portions of the data instance are inherited from different real-world events or named entities. A data instance may inherit data from various sources that are referred to as inheritance sources. Various processes described herein provide solutions to identify inheritance sources of a data instance by analyzing the data patterns in other data instances and identifying how data are passed down.

Figure 2B:
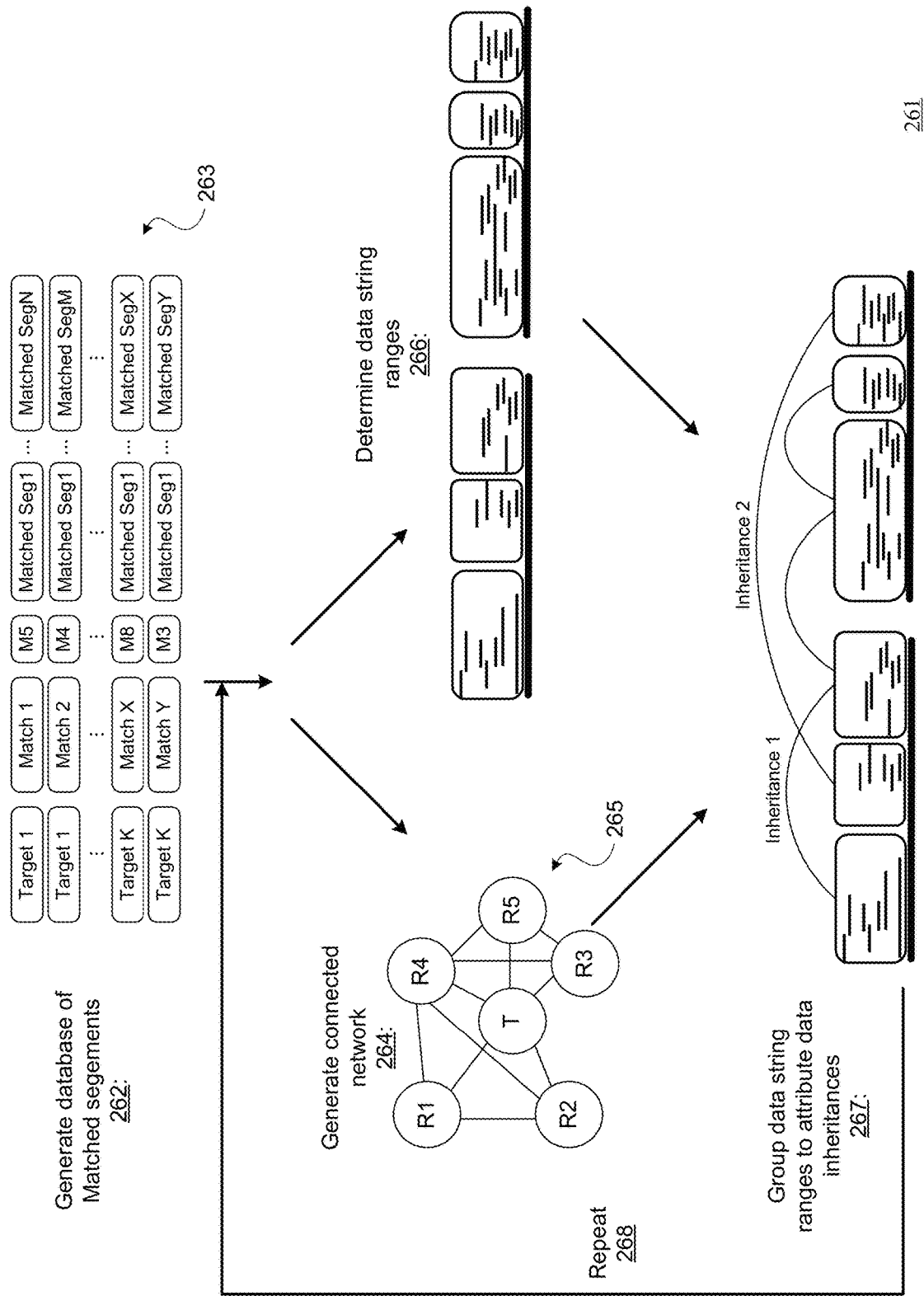
FIG. 2B is a conceptual diagram graphically illustrating an example process for determining data inheritances, in accordance with some embodiments.
Figure 2C:
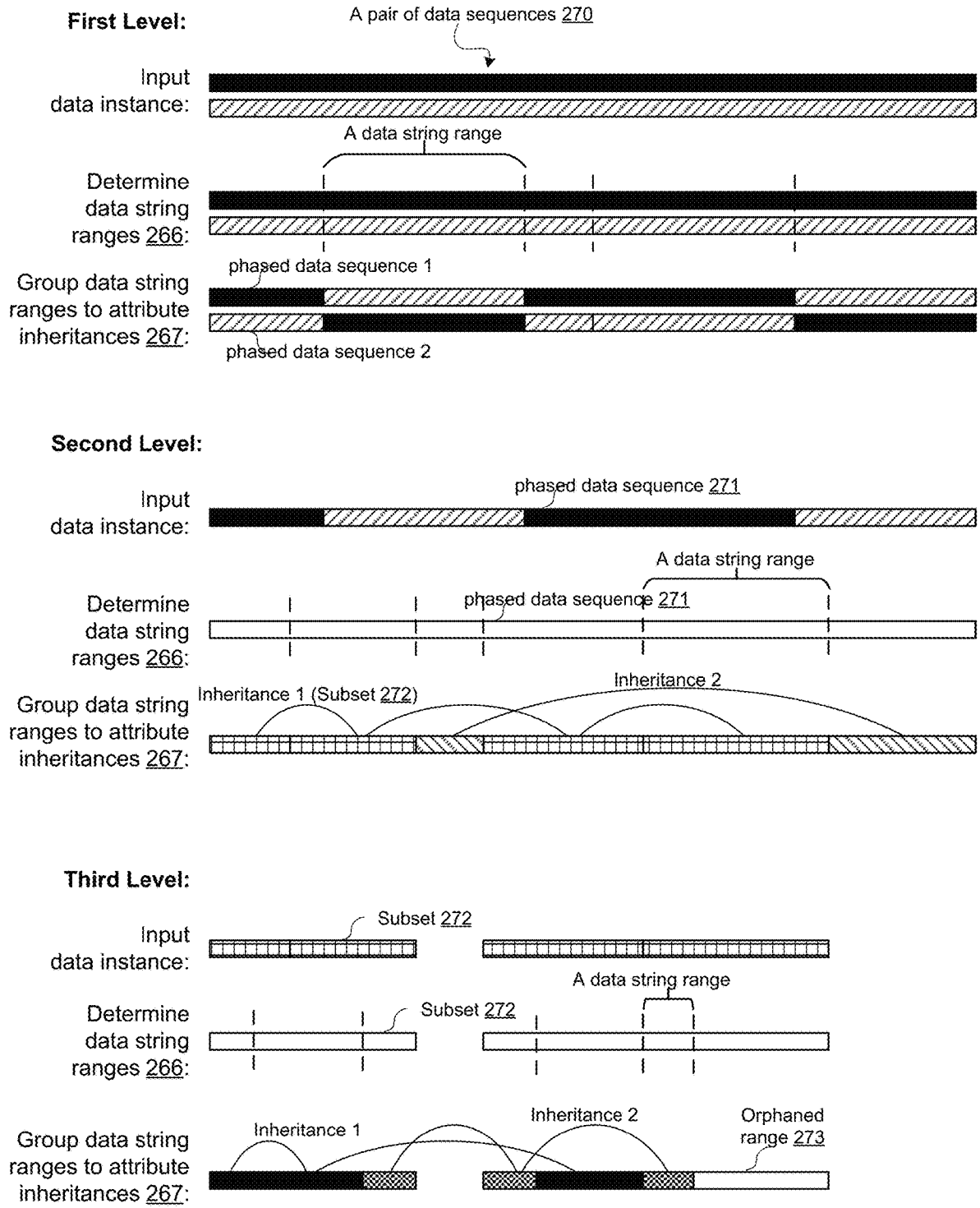
FIG. 2C is a conceptual diagram illustrating different levels of data inheritance separation, in accordance with some embodiments.
Figure 2D:
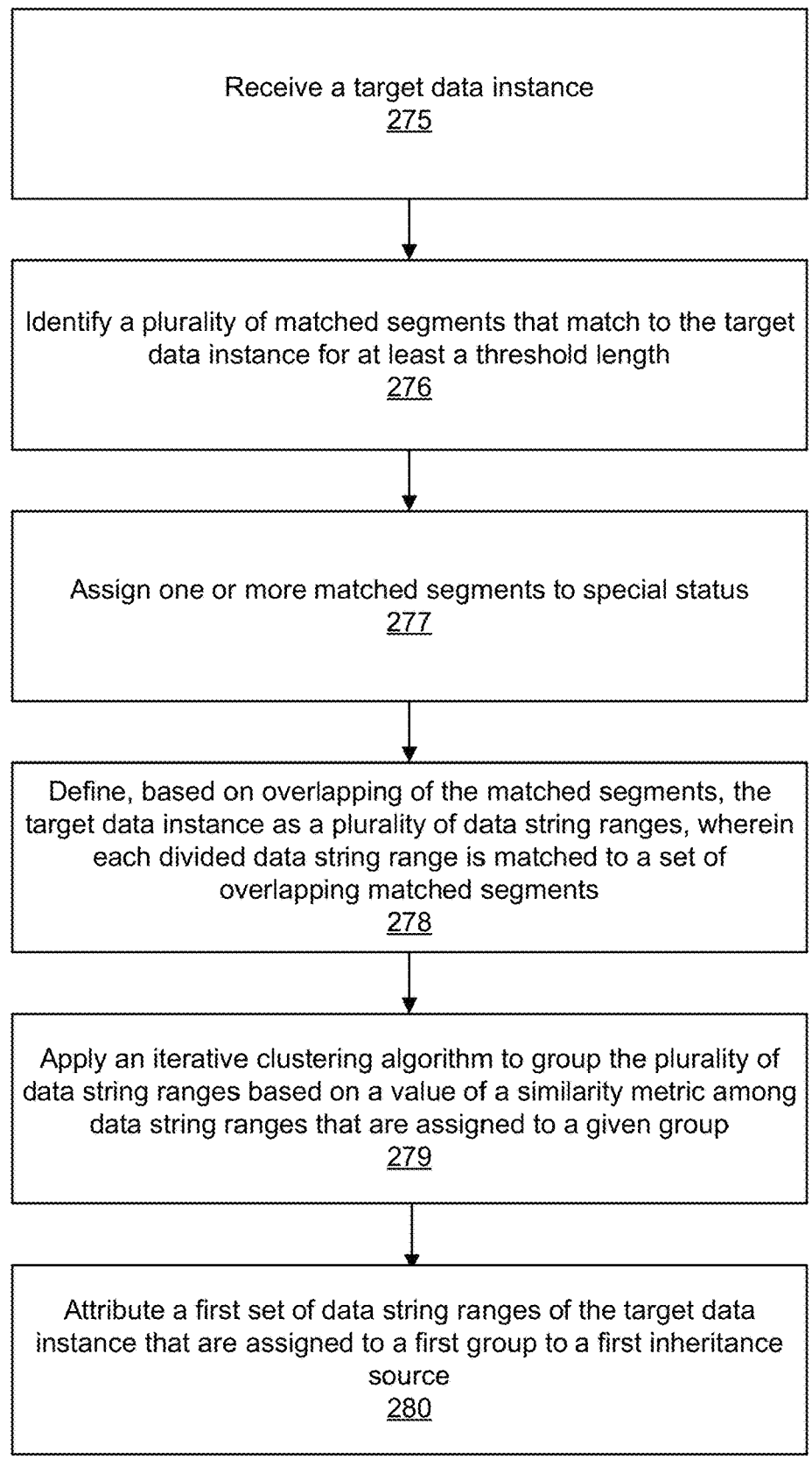
FIG. 2D is a flowchart depicting an example process for determining data inheritances of data segments which may belong to a named entity, such as a target individual, in accordance with some embodiments.

FIG. 2B is a conceptual diagram graphically illustrating an example process 261 for determining data inheritances, in accordance with some embodiments. FIG. 2C is a conceptual diagram illustrating different levels of data inheritance separation, in accordance with some embodiments. FIG. 2D is a flowchart depicting an example process 261 for determining data inheritances of data segments which may belong to a named entity, such as a target individual, in accordance with some embodiments. The process 261 may be embodied as a software algorithm that may be stored as computer instructions that are executable by one or more processors. The instructions, when executed by the processors, cause the processors to perform various steps in the process 261. In various embodiments, the process 261 may include additional, fewer, or different steps. While various steps in process 261 may be discussed with the use of computing server 130, each step may be performed by a different computing device. FIGS. 2B, 2C, and 2D are discussed in conjunction with each other.

Referring to FIG. 2B, the process 261 may include different stages. The details of each stage will be further discussed in FIG. 2D and subsequent figures.

In the stage 262, the computing server 130 may first generate a database of matched data instances 263. The database of matched data instances 263 includes various data instances that each has one or more data segments that match with other data instances. Each target data instance may be associated with a list of matched data instances. Each matched data instance may be associated with information about a list of matched segments that are matched to the target data instance's data string ranges.

Using the database of matched data instances 263, in stage 264, the computing server 130 may generate a network of data instances 265. The estimated degree of relatedness between two data instances may be determined based on the extent of data string matches in two data instances. The computing server 130 may look up the data of each closely matched data instance in the database of matched data instances 263 to see how each closely matched data instance is related to another closely matched data instance. The target data instance and the closely matched data instances may be represented as nodes and their relationships may be represented as edges. A network of data instances 265 may be constructed as a result.

Using the database of matched data instances 263, in stage 266, the computing server 130 may also determine data string ranges in the target data instance. The data string ranges are divided based on how matched segments of other data instances overlap with each other.

After the data string ranges are determined, at stage 267, the computing server 130 may group the data string ranges and attribute each group to a data inheritance. The grouping may be performed by one or more clustering techniques. The grouping may rely on the network of data instances 265. However, in some embodiments, the stage of generation 264 of a network of data instances 265 may be optional. In some embodiments, the computing server 130 may directly apply one or more clustering techniques to the data string ranges determined in stage 266. However, the use of the information from the network of data instances 265 may increase the accuracy of the grouping because the close data instances often are more informative in determining data inheritance. Various techniques used in the grouping process will be discussed in further detail below.

The process 261 of determining data inheritance may be repeatedly applied for additional levels as indicated by arrow 268. The database matched individuals 263 may be pre-built and the data may be fetched in each repeated application of the process 261.

Data inheritance may refer to how data patterns are passed down in various data inheritance sources. FIG. 2C is a conceptual diagram illustrating different levels of data inheritance separation that may be achieved by repeating the process 261. For example, at the first level of data inheritance separation, the target data instance may be a pair of data strings 270 which is unstructured. Structure of data strings may be referred to as phasing. The pair of data strings 270 is represented by two lines with different filled patterns. In some embodiments, even at the first level, the target data instance may be a single sequence of data strings.

At a second level of data inheritance separation, one of the structured (phased) data instances inherited from one of the data inheritance sources may be used as an input. For example, structured (phased) data instance 1 (labeled as structured (phased) data instance 271) from the first level is used as the input for the second level. The process 261 determines that a first subset of data string ranges of the structured (phased) data instance 271 is inherited from a first grand data inheritance source (data inheritance 1) and a second subset of data string ranges of the structured (phased) data instance 271 is inherited from a second grand data inheritance source (data inheritance 2).

The separation of data inheritances using the process 261 may further be repeated at a higher level to separate data inheritances from additional data inheritance sources that are further away. For example, at the third level of data inheritance separation, one of the subsets of data string ranges that belong to a data inheritance is used as an input. The subset illustrated is labeled as subset 272. The process 261 determines that certain data string ranges in the subset 272 belong to the first data inheritance and other data string ranges in the subset 272 belong to the second data inheritance. The process 261 may be further repeated.

At any level of data inheritance separation, one or more data string ranges may be unable to be classified as belonging to any group. This may be due to insufficient data or evidence to classify a range as a data inheritance. Such a range may be referred to as an orphaned range 273 and can occur at any level, not merely the third level as illustrated in FIG. 2C.

At any level of data inheritance separation, the input data may be referred to as the target data instance and the output segments that are grouped to two or more sides of data inheritances may be referred to as data string ranges. For example, at the first level of data inheritance separation, the target data instance may be a pair of data strings 270 and the data string ranges may be a pair of structured data instances that are each respectively assigned to a data inheritance source. At the second level of data inheritance separation, the target data instance may be a structured data instance 271 of a particular data inheritance source and the data string ranges may be segments of in the structured data instance.

Referring to FIG. 2D, a flowchart that provides additional detail of the process 261 is illustrated, in accordance with some embodiments. In some embodiments, process 261 can include receiving a target data instance. The target data instance may be any data instance that is stored in data store 200 or 205. For example, a target data instance may be data that is associated with a named entity such as a user of the computing server 130 and the named entity has data stored in the data store 200 or 205. The computing server 130 may process the data instance using the pre-processing engine 215 and store the processed data in the data store 205. A data instance may include a sequence of data bits. The sequence of data bits may include a long range of data reads from different data blocks.

As discussed, the process 261 may be repeated. The input for each level of separation may be a smaller set of the initial data instance.

The target data instance may be raw or processed, phased or unphased, depending on embodiments and situations. For example, in some embodiments, the target data instance may be processed by the sample pre-processing engine 215 and/or the engine 220. As discussed in further detail in this disclosure, the process 261 may serve as a phasing algorithm to separate a data instance into a pair of structured (phased) data instances (e.g., the first level of separation). In some embodiments, the process 261 may be applied repeatedly to determine the data inheritance of various data string ranges in the target data instance, as illustrated in FIG. 2C.

In some embodiments, the target data instance may start with a structured data instance that is inherited from a data inheritance source. In turn, the process 261 may break the structured data instance into two or more sets of data string ranges. The process 261 may assign a first set of data string ranges to a first grand data inheritance source and a second set of data string ranges to a second grand data inheritance source. In some embodiments, a repeated application of the process 261 to a new target data instance that includes only a particular set of data string ranges may further divide the particular set of data string ranges into two or more lines of data inheritance sources. For example, applying the process 261 to the first set of data string ranges that are determined to be inherited from the first data inheritance source may further divide the first set of data string ranges into multiple subsets that are respectively belonging to one or more data inheritance sources that passed down the data to the target data instance.

In some embodiments, the determination of data inheritance of data instances may be based on matched data instances (data instances that have one or more segments of data bits that match the target data instance) that are related to the target data instance in various degrees. Those matched data instances may be closely matched data instances, distantly matched data instances, and other matched data instances that share some degree of data inheritance with the target data instance. A large number of matched data instances are used to resolve, on a large scale, how a certain set of data segments passed down from a line of data inheritance sources.

By way of example, continuing with reference to FIG. 2D, in some embodiments, process 261 can include identifying 276 a plurality of matched segments that match to the target data instance for at least a threshold length (step 266). The matched segments may be based on position-specific data string matches and may be identified by comparing the data strings in the target data instance with a large number of other data instances that are stored in the computing server 130. The identification of those matched segments may be performed at stage 262. The data instance of a potentially matching data instance may be compared to the target data instance. Two segments (one from the potentially matching data instance and another from the target data instance) may be considered as no longer matching one or more mismatch sites are found. In some embodiments, the computing server 130 may tolerate a single or a small number of mismatched sites. The precise number of tolerated mismatched sites may be part of an iterative process of the process 261 to be further discussed below.

As many data instances may share data bits with the target data instance to a certain degree, a threshold length may be set to determine whether a matched segment is to be included in the process 261 as a matched data string segment. Various thresholds may be used, whether a threshold is static or dynamic, individualized or fixed across different target data instances.

Example Database of Matched Data Instances

In some embodiments, the determination of matched segments may be pre-determined before the runtime of the main algorithms of the process 261 that are used to determine data inheritance sources. The matched data may be stored in a database of matched data instances 263. The discussion of this section may be an example of the stage 262 in FIG. 2B. The database of matched data instances 263 may store data instances (whether a target data instance or a matched data instance) as 32-bit identifiers, a number of matched segments, total shared data bits and a list of matched segments. The list of matched segments may be in any suitable format, such as a semicolon-separated list of comma-separated pairs of data bit position identifiers. An example of such data structure is illustrated in the table below. The entire database may include a number of target data instances and the corresponding matched data instances of each target data instance.

| Target ID | Match ID | # of Matched Segments | Total length | Matched Segments Identifiers |
|---|---|---|---|---|
| A2D1N1 | S1D2N0 | 1 | 12.77 | rs34982, rs23942 |
| A2D1N1 | K6D7N6 | 1 | 13.23 | rs32894, rs12310 |
| A2D1N1 | R2D1N1 | 1 | 10.16 | rs91241, rs81235 |
| A2D1N1 | D1L4D9 | 8 | 70.99 | rs93243, rs91245; rs77077, rs4077; . . . |
| . . . | | | | |
| A2D1N1 | C5D4N9 | 1 | 8.88 | rs61203, rs41294 |
| D9M7D9 | G2X2W2 | 1 | 10.01 | rs12345, rs28282 |
| . . . | | | | |

In some embodiments, the retrieval of data instances of potentially matched data instances may be from a large-scale database of matched data instances 263 as part of the data store 205. The large-scale database may take the format discussed in the table above. In some embodiments, the large-scale database of matched data instances 263 includes over 1,000 data instances. In some embodiments, the large-scale database of matched data instances 263 includes over 5,000 data instances. In some embodiments, the large-scale database of matched data instances 263 includes over 10,000 data instances. In some embodiments, the large-scale database of matched data instances 263 includes over 50,000 data instances. In some embodiments, the large-scale database of matched data instances 263 includes over 100,000 data instances. In some embodiments, the large-scale database of matched data instances 263 includes over 500,000 data instances. In some embodiments, the large-scale database of matched data instances 263 includes over 1,000,000 data instances.

In some embodiments, the size of the large-scale database of matched data instances 263 may be over 500 GB. In some embodiments, the size of the large-scale database of matched data instances 263 may be over 1 TB. In some embodiments, the size of the large-scale database of matched data instances 263 may be over 5 TB. In some embodiments, the size of the large-scale database of matched data instances 263 may be over 10 TB. In some embodiments, the size of the large-scale database of matched data instances 263 may be over 20 TB. In some embodiments, the size of the large-scale database of matched data instances 263 may be over 40 TB.

In some embodiments, to accelerate the entire process 261, the computing server 130 may optionally reduce a large-scale database of matched data instances 263 to a reduced set of closely matched data instances. Each closely matched data instance may share segments with the target data instance of a target data instance for at least a second threshold length that is larger than the first threshold length. For example, the second threshold length may be set as a certain length of bits that is larger than the first threshold. The rest of more distant matches are filtered and removed from the database. For example, in the table above, for the target data instance with the identifier A2D1N1, only the matched data instance with the identifier D1L4D9 is kept in the reduced set. The use of a reduced set of close data matches may significantly reduce the amount of data (e.g., from over 40 TB to 10 GB) to a size that is loadable into the random access memory (RAM) of the computing server 130. Since the entire set of the matched data may be loaded into the RAM, the rest of the process 261 may be significantly improved. The use of a reduced set of close data matches improves the operation of the computing process and meaningfully speeds up the process 261 by avoiding repeated process of loading and removing data from RAM.

Closely Matched Data Instances

Continuing with reference to FIG. 2D, in some embodiments, process 261 can include assigning one or more data string matched segments to special status (step 277). This step may also include determining the special relationship of some of the data instances of the target data instance and may correspond to an example of the stage 264 in FIG. 2B. A purpose of step 277 is to identify the relationships of closely matched data instances of the target data instance as precisely as possible based on the data from the database of matched data instances. In other words, based on the total length of shared data bits between a target data instance and a closely matched data instance, the computing server 130 may attempt to determine the precise special relationship between the target data instance and closely matched data instance (e.g., how the target data instance and the closely matched data instance are related by a real-life event). The computing server 130 may determine the special relationship as precise as possible, although in some cases examining the data bits alone may not be sufficient to determine the exact relationship.

Based on the identified relationships, one or more special status may be assigned to the corresponding matched segments of those closely matched data instances. One example of special status is an extra-informative match. In separating a target data instance into two or more data inheritances (e.g., separating data inheritances at the first level, or separating data inheritances at the second level, etc.), if a closely matched data instance is determined to be definite on one side of the data inheritance source, the matched segments of the close data instance are marked as extra-informative matches. Another example special status is unhelpful status. This type of close data instances is not useful for data inheritance separation. The matched segments of those close data instances are filtered out and not used in process 261.

In some embodiments, the filtering may be used to remove a close data instance that may not be helpful in separating data inheritances of a target data instance because the close data instance may share the same data inheritance sources of the target data instance. Conceptually, at any round of application of the process 261, the process 261 is to separate a set of data string ranges into two or more subsets that are passed down from different lines of data inheritance sources. If a closely matched data instance is determined to have data bits that are passed down from the exactly same lines of data inheritance sources as the target data instance, the data bits of the close data instance may not be helpful to separate the data inheritances of the data bits of the target data instance.

A purpose is to determine whether matched segments of closely matched data instances are specifically helpful or likely to be unhelpful in separating data inheritances. In one case, computing server 130 may identify a target data instance's closely matched data instance as a data instance as extra-informative. In another case, the computing server 130 may label another closely matched data instance as not helpful. Thus, the computing server 130 does not use the corresponding matched segments for separating data inheritance sources of the target data instance.

Referring to network 265 illustrated in FIG. 2B, all data instances are closely matched data instances of the target data instance T. R4 matches everybody and is removed from the process 261, but R1, R2, R3 and R5 may be labeled as extra-informative. Furthermore, R1 and R2 match each other and may be considered to be on the same side of a data inheritance (e.g., a first data inheritance source). R3 and R5 may be considered to be on another data inheritance (a second data inheritance source).

In some embodiments, the computing server 130 may also consult other sources such as data from the data instance profile store 210 and tree management engine 260 to determine the familial relationship between a closely matched data instance and the target data instance. For example, the target data instance may have constructed one or more family trees whose data instances in the family tree have data instances stored in the computing server 130. The relationship between those data instances with the target data instance may be known and confirmed. The computing server 130 may use those relationships in assigning special status to the corresponding matched segments.

Segmenting and Grouping

Continuing with reference to FIG. 2D, in some embodiments, process 261 can include defining, based on overlapping of the data string matched segments, the target data instance as a plurality of data string ranges (step 278). In this step, the data string ranges are delimited from the target data instance. This step may be an example of the stage 266 in FIG. 2B. Each divided data string range is matched to a set of overlapping IBD-matched segments.

Continuing with reference to FIG. 2D, in some embodiments, process 261 can include applying an iterative clustering algorithm to group the plurality of data string ranges based on a value of a similarity metric among data string ranges that are assigned to a given group (step 279). This step may be an example of stage 267 in FIG. 2B. Grouping of the data string ranges separates various data string ranges into two or more sets. One set is classified to one of the data inheritances and another set is classified to another of the data inheritances.

In some embodiments, the similarity metric that is used to group the data string ranges may take various suitable forms. In some embodiments, a value of the similarity metric of two given data string ranges is determined based on lengths of matched segments. For example, say two given data string ranges are tentatively assigned to the same group, the computing server 130 may examine whether there is a matched data instance that has a first matched segment matched to the first data string range and a second matched segment matched to the second data string range. If so, the value of the similarity metric between these two data string ranges increases. In some embodiments, a value of the similarity metric of two given data string ranges is determined further based on (1) a first length of data string matched segment corresponding to a matched data instance in the first data string range of the two given data string ranges and (2) a second length of data string matched segment corresponds to the matched data instance's second-degree matches in a second data string range of the two given data string ranges.

Various examples of iterative clustering algorithms will be further discussed below. In some embodiments, the computing server 130 may examine a first candidate assignment that assigns a first candidate set of data string ranges to a given group. The computing server 130 may determine a first value of the similarity metric of the first candidate set. The computing server 130 may examine a second candidate assignment that assigns a second candidate set of data string ranges to the given group. The computing server 130 may determine a second value of the similarity metric of the second candidate set. The computing server 130 may select the first or the second candidate assignment based on the values of the similarity metric and may iteratively adjust the candidate assignments in a direction that increases the value of the similarity metric.

In some embodiments, the iterative clustering algorithm may include two or more stages. In some embodiments, the two or more stages may include a first clustering tree stage and a refinement (fine-tune) stage. For example, in the first clustering tree stage, the computing server 130 may construct a similarity matrix for the plurality of data string ranges. The similarity matrix may include values of the similarity metric of two given data string ranges. The computing server 130 may construct a clustering tree that assigns, based on the values in the similarity matrix, the plurality of data string ranges into positions of nodes in the clustering tree. The computing server 130 may divide the clustering tree into two or more branches. Each branch may include a plurality of nodes and corresponding to a group assignment. Details of the clustering tree stage will be discussed below.

Continuing with reference to FIG. 2D, in some embodiments, process 261 can include attributing a first set of data string ranges of the target data instance that are assigned to a first group to a first data inheritance and attribute a second set of data string ranges that are assigned to the second group to a second data inheritance (step 280). For example, at the level of data inheritance separation technique, the data string ranges may correspond to structured (phased) data instance segments. A first set of structured (phased) data instance segments is grouped and classified as inherited from a first data inheritance source. A second set of structured (phased) data instance segments is grouped and classified as inherited from a second data inheritance source. If the process 261 is applied again to one of the phased long-range structured (phased) data instances, now the target data instance is the phased long-range structured (phased) data instance. The structured (phased) data instance will be divided into a plurality of data string ranges. A first set of data string ranges may be grouped and classified as inherited from a first grand data inheritance source. A second set of data string ranges may be grouped and classified as inherited from a second grand data inheritance source.

In some embodiments, the computing server 130 may apply the iterative clustering algorithm again to the first set of data string ranges of the target data instance to group the first set of data string ranges into at least a subset of data string ranges. The subset of data string ranges is an earlier data inheritance source than the first data inheritance source. For example, for the data string ranges that are assigned to a grand data inheritance source, the process 261 may be applied again to further divide the data string ranges into two great-grand data inheritance sources.

Measuring Similarity

In some embodiments, the delimited data string ranges of the target data instance may be grouped using one or more clustering algorithms based on one or more objective goals that define how the data string ranges should be grouped. In some embodiments, the objective goals are related to similarity among the data string ranges.

Figure 2E:
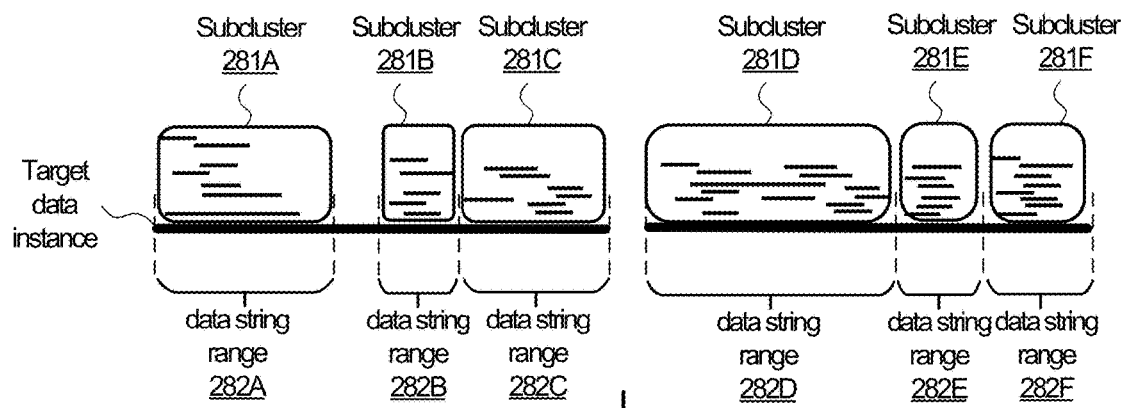
FIGS. 2E and 2F are conceptual diagrams illustrating the concept of similarity metric and clustering algorithms.
Figure 2E:
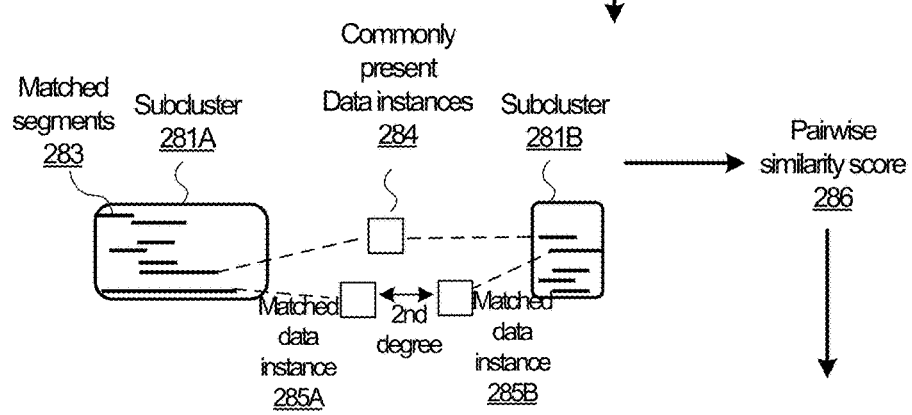
Figure 2E:
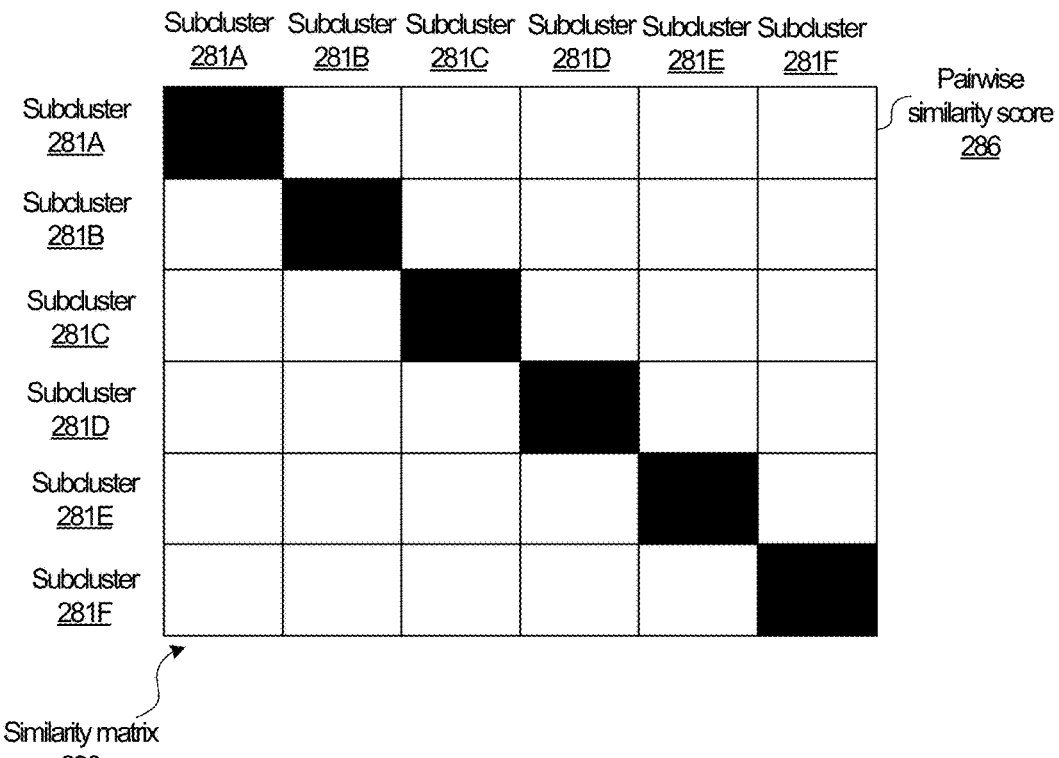
Figure 2F:
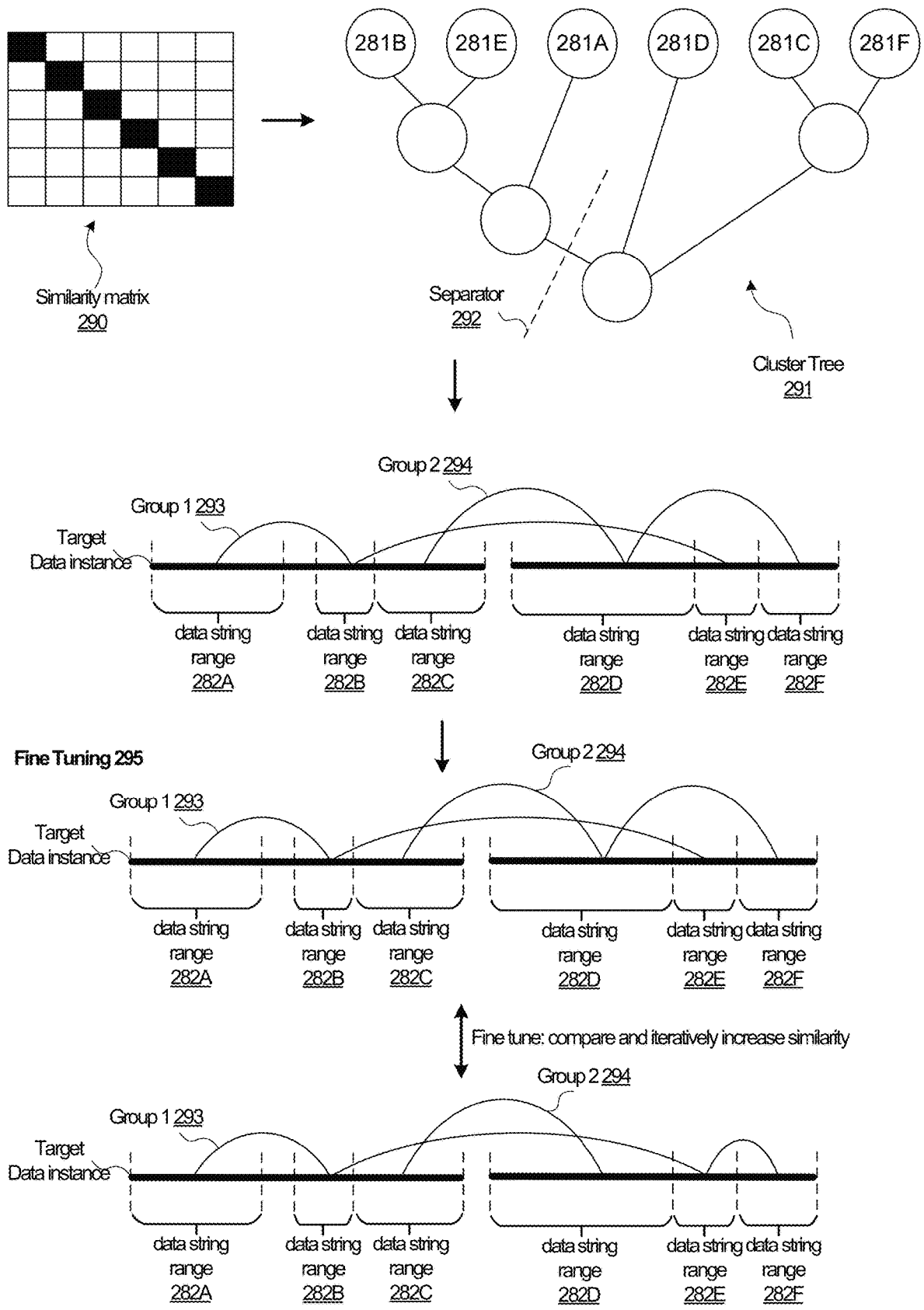

FIGS. 2E and 2F are conceptual diagrams illustrating the concept of similarity metric and clustering algorithms. The second level of separation of data inheritance is used to illustrate the similarity metric and clustering algorithms, but the concept may be applied to any level of separation. For the second level, the data instance may be a structured (phased) data instance. The target data instance is broken into a plurality of data string ranges 282A, 282B, 282C, 282D, 282E, and 282F (or generally, without specifying a particular data string range, 282). Each data string range has a corresponding subcluster 281 of matched segments that match one or more sub-range in the data string range. Hence, subclusters 281A, 281B, 281C, 281D, 281E, and 281F (or generally, without specifying a particular subcluster, 281) are also present. The number of data string ranges and subclusters is for illustration only. In an actual example, the computing server 130 analyzes a significantly more number of data string ranges.

For two given data string ranges, each data string range may correspond to a subcluster that contains a number of matched data instances. In some embodiments, using subclusters 281A and 281B as an example pair, the pairwise similarity of the two data string ranges 282A and 282B is measured with respect to (1) the matched data instances 284 that are commonly present in both of the corresponding subclusters 281A and 281B and (2) the matched segments 283 of those commonly matched data instances 284. Since the matched data instances may be related to the target data instance, the more evidence supporting that two data string ranges 281A and 281B share a larger number of commonly matched data instances 284, the more likely that the data string ranges inherit the data strings from the same data inheritance group. Hence, two data string ranges with a high degree of similarity may be grouped together and be attributed to the same data inheritance source. In some embodiments, the similarity between data string ranges is measured by a similarity metric that compares the similarity of the matched data instances that are in the subclusters corresponding to the data string ranges.

In some embodiments, the similarity metric may take various suitable forms. In some embodiments, a value of the similarity metric of two given data string ranges 282 is determined based on lengths of matched segments 283 that belong to a commonly present matched data instance 284 whose segments are classified as matched segments that fall within two given data string ranges 282. The value of the similarity metric may be referred to as a similarity score 286. For example, say two given data string ranges are tentatively assigned to the same group, the computing server 130 may examine whether there is a matched data instance which has a first matched segment that falls within the first data string range and a second matched segment that falls with the second data string range. If so, the matched data instance is a commonly present matched data instance 284, and the value of the similarity metric between these two data string ranges increases. In some embodiments, the value may be increased based on the number of commonly present matched data instances 284 in the two data string ranges. For example, the computing server 130 may be able to find more than one commonly present matched data instances 284. Alternatively, or additionally, the value may be based on the lengths of the two data string matched segments 283 that belong to the same commonly present matched data instance 284. In some embodiments, the similarity score may further increase if the commonly present matched data instance 284 is marked as extra-informative close data instance, for example, by weighing the score contribution from the matched segments of the extra-informative close data instance more heavily than other regular commonly present matched data instances.

In some embodiments, the computing server 130 may relax the criteria of what qualifies as a commonly present match data instance in two subclusters. In some embodiments, the commonly present matched data instance 284 is defined as the same data instance 284 who has two matched segments each respectively in one of the subclusters. In some embodiments, to reduce the number of the orphaned segment (e.g., illustrated as orphaned segment 273 that is not able to be linked to any group), the commonly present matched "data instance" is in fact a pair of matched data instances 285A and 285B who are closely matched data instances to each other. This second-degree relationship may be used to relax the criteria. In a relaxed selection of commonly present matched "data instance," a first data instance 285A, and a second data instance 285B, which are closely matched with each other, are respectively present in one of the subclusters but neither of them is commonly present in both subcluster. In other words, a matched segmented 283 of the first data instance 285A is matched to the first data string range (e.g., 282A) of the target data instance so that the first data instance 285A is present in the corresponding first subcluster 281A. A matched segmented 283 of the second data instance 285B is matched to the second data string range (e.g., 282B) of the target data instance so that the second data instance 285B is present in the corresponding second subcluster 281B. In such a case, in calculating the similarity matrix, the computing server 130 may consider that a commonly present matched "data instance" exists. In such a case, the similarity score 286 between subclusters 281A and 281B increases because matched data instances 285A and 285B are close data instances, even though they are not the same data instance. However, the weight of this type of second-degree relationship towards the value of the similarity metric may be reduced compared to a true commonly present matched data instance 284. In some embodiments, if it is determined that both matched data instances 285A and 285B are also close data instances of the target data instance, the second-degree relationship may be less discounted and is weighed more to the overall score.

By way of a specific example, in some embodiments, the similarity score 286 is a sum of the average (harmonic mean) for each pair of segments 283 that connect two subclusters. In some embodiments, these connections are downweighed significantly if the connections are based on a distant second-degree relationship between the two matches.

Different embodiments may use various ways to calculate the similarity between subclusters 281. In some embodiments, the similarity between two subclusters 281 may be based on a number of matched segments 283 whose corresponding data instances are shared between the two subclusters 281. In other words, it is based on the number of matched segments 283 in the two subclusters 281 whose corresponding matched data instances are the same. In some embodiments, the similarity between two subclusters 281 may be further based on the number of second-degree relationships. In other words, it is based on the number of matched segments 283 in the two subclusters 281 whose corresponding matched data instances are data instances of each other. In some embodiments, the similarity between two subclusters 281 may further be based on a combination of the number of matched segments in the two subclusters whose corresponding data instances are the same, and the number of matched segments in the two subclusters whose corresponding data instances are matches of each other.

In some embodiments, for second level or above data inheritance separation, a similarity score 286 may further be adjusted based on additional real-life events that may be able to be modeled. In some embodiments, real-life events may be modeled. One or more breaking points in a data string may be identified. By identifying a breakpoint for the data instances, two data string ranges may be delimited, one left to the breaking point and one right to the breaking point. Two data string ranges, one at each side of the breaking point, may be determined to be separate because these two data string ranges are likely separately inherited from different lines of data inheritance sources. A negative similarity weight may be applied to the similarity score 286 of these two data string ranges because of the determined likely real-life breaking event.

The precise weights of various factors that affect a similarity score 286, such as factors like having true commonly present matched data instances, a commonly present matched data instance being extra-informative, the second-degree relationships, and the breaking events, may be parameterized and may be adjusted based on experimental results and/or based on training data if one or more machine learning models are trained to model the weights.

Referring back to FIG. 2E, in some embodiment, using the values of similarity metrics between many different pairs of subclusters 281 that each corresponds to a pair of data string ranges 282, a similarity data object such as a similarity matrix 290 can be constructed. The similarity matrix 290 may record the similarity scores 286 between any pairs of subclusters 281. For the separation of two data inheritances (e.g., phasing data inheritance source 1 and data inheritance source 2 at the first level, phasing grand data inheritance source 1 and grand data inheritance source 2 at the second level), for any subclusters A and B, a first similarity score 286 may be monitored data instance to the subcluster A and subcluster B that are classified to the same group. A second similarity score 286 may also be monitored data instance to the subcluster A and subcluster B that are classified into two different groups. For other pairs of subclusters, equivalent similarity scores 286 may be stored and a similarity matrix 290 can be constructed.

While in this disclosure similarity matrix 290 is used as an example, in some embodiments, dissimilarity matrix may also be used. The similarity matrix 290 in various embodiments may be defined positively to measure a degree of similarity or negatively to measure a degree of dissimilarity.

Example Tree Clustering Approach

In various embodiments, one or more different types of iterative clustering algorithms may be applied at different levels of data inheritance separation. For example, in the second level of data inheritance separation where two grand data inheritance sources' data inheritances are separated from a structured (phased) data instance, a tree clustering approach may be used. In some embodiments, the tree clustering approach may be used at every level of data inheritance separation.

Continuing the illustration to FIG. 2F, in some embodiments, a similarity matrix 290 that is discussed above is constructed based on pairwise similar scores 286 between different pairs of subclusters 281. A hierarchical clustering algorithm such as the unweighted pair group method with arithmetic mean (UPGMA) may be used to construct a cluster tree 291 using each subcluster 281 as a node in the tree. The subclusters 281 that have higher similarity score 286 are grouped closer in the tree 291. Pairs or sets of subclusters with the highest similarity scores 286 are placed in the deepest root in the tree based on the construct of the hierarchical clustering algorithm. In some embodiments, the tree 291 constructed is a binary and rooted tree. After the tree 291 is constructed, the computing server 130 may determine the best location for a group separator 292 to be placed to separate the tree leaves (nodes) into two (or more) groups 293 and 294, each group corresponding to a data inheritance. For example, the interior nodes that are rooted deeper than the group separator 292 are assigned to one group and the rest of the nodes in the tree are assigned to another group. The grouping of the subclusters 281 may be translated to the grouping of data string ranges 282. Hence, group 1 540 and group 2 294 of data string ranges may be assigned.

In some embodiments, the selection of the location of the group separator 292 may be selected iteratively based on one or more objective goals. In some embodiments, one of the objective goals may be to maximize the total similarity score among the nodes in a group. For example, a candidate group separator may be tentatively placed and the total similarity score of a group based on the placement of the candidate group separator may be calculated. The total similarity score may be a simple sum, a weighted sum, or another form of statistical aggregation. In some embodiments, for example, the similarity scores may be multiplied by the probability density of expected data inheritance, such as the amount of data bits that would be assigned as inherited (e.g., inherited by one grand data inheritance source at the second level of separation). The probability density may be modeled as a Gaussian parameter empirically. The total similarity score is adjusted according by the probability density of this data instance imbalance assignment. In some embodiments, another candidate group separator is considered, and the total similarity score is calculated and may also be adjusted based on the probability density of data inheritance. The process may be repeated until the best candidate group separator is found.

Example Fine-Tuning of Group Assignment

In some embodiments, a clustering approach may be a two-stage approach. After one or more clustering algorithms are applied, a fine-tuning process 295 may be executed to further adjust the group assignment of the data string ranges. For example, in some embodiments, the result of the tree clustering approach may be served as an initial assignment of two groupings 293 and 294 of data string ranges 282. A fine-tuning process 295 in a refinement stage may be executed to further adjust the group assignment based on the initial assignment.

In some embodiments, in the refinement stage (fine tuning), the computing server 130 may examine a candidate assignment. The computing server 130 may determine an objective function based on the similarity metric. The computing server 130 may swap, iteratively, one or more data string ranges from a first group to a second group or vice versa to improve the value of the objective function. For example, as illustrated at the bottom of FIG. 2F, the data string range 282F is switched from group 2 to group 1. In some embodiments, the objective function may be based on a distribution of real-life data events.

By way of example, the objective function may measure the connection similarity score among both group assignments of data string ranges. For example, at the second level of data inheritance separation, the objective function may be the sum of the scores of each pair of segments assigned to the same grand data inheritance source. In some embodiments, the objective function may be based on multiple factors in addition to the sum of the similarity scores. In some embodiments, additionally or alternatively, the objective function is factored by the probability density of the total amount of data string ranges assigned to each data inheritance, modeled as a Gaussian distribution with a mean that is at the expected mean. For example, for the second level of separation, the expected mean of each data inheritance is modeled at 0.25. In some embodiments, additionally or alternatively, the objective function is factored by the probability density of the number of recombination events of each data inheritance, modeled as a Gaussian distribution with a mean that is at the expected mean. For example, for the second level of separation, the expected mean of the number of recombination is at around 35 based on an empirical study of recombination in a population. The standard deviations of the Gaussian distributions may be determined empirically and may be selected based on empirical results.

In some embodiments, an example of the objective score S for an assignment A is $$S(A, M) = \qquad (1)$$
$$N(C(A), 0.25, 0.12) \times N(R(A), 34.9, 24) \times \sum\nolimits_{i,j} \delta(Ai, Aj) \times M(Ai, Aj)$$

where
$N(x, \mu, \sigma)$ is the PDF at point x of a normal distribution with mean $\mu$ and standard deviation $\sigma$,
$C(A)$ is the proportion of data string assigned to a data inheritance given the assignment A,
$\delta(a_1, a_2)$ is +1 if $a_1$ and $a_2$ are the same (assigned to the same data inheritance) and −1 otherwise, and
$M(a_1, a_2)$ is the similarity score (the strength of the connection between two subclusters) of the two data string regions $a_1$ and $a_2$.

In some embodiments, the computing server 130 may create several threads for iterations. Each thread may start with the initial assignment generated by the clustering algorithm in the first stage. Each thread may perform a random-walk style search for an improved solution. The random walk may include flipping one data string range from one group to the other. At each step, a change with a probability proportional to the improvement in score may be chosen, taking over the space of changes to the score of all possible changes (e.g., the worst move as probability zero). After some number of iterations or when the fine-tune algorithm's result converges, the probabilistic-random-walk may be stopped or may continue to choose only the strictly best improvement for a few more steps until there is no change to assignment that increases the objective score. Multiple threads of iterations (e.g., 64) may be used, each starts with a different random walk. The assignment in one of the threads with the highest objective score may be chosen as the final assignment.

Example Inheritance Determination

Figure 3A:
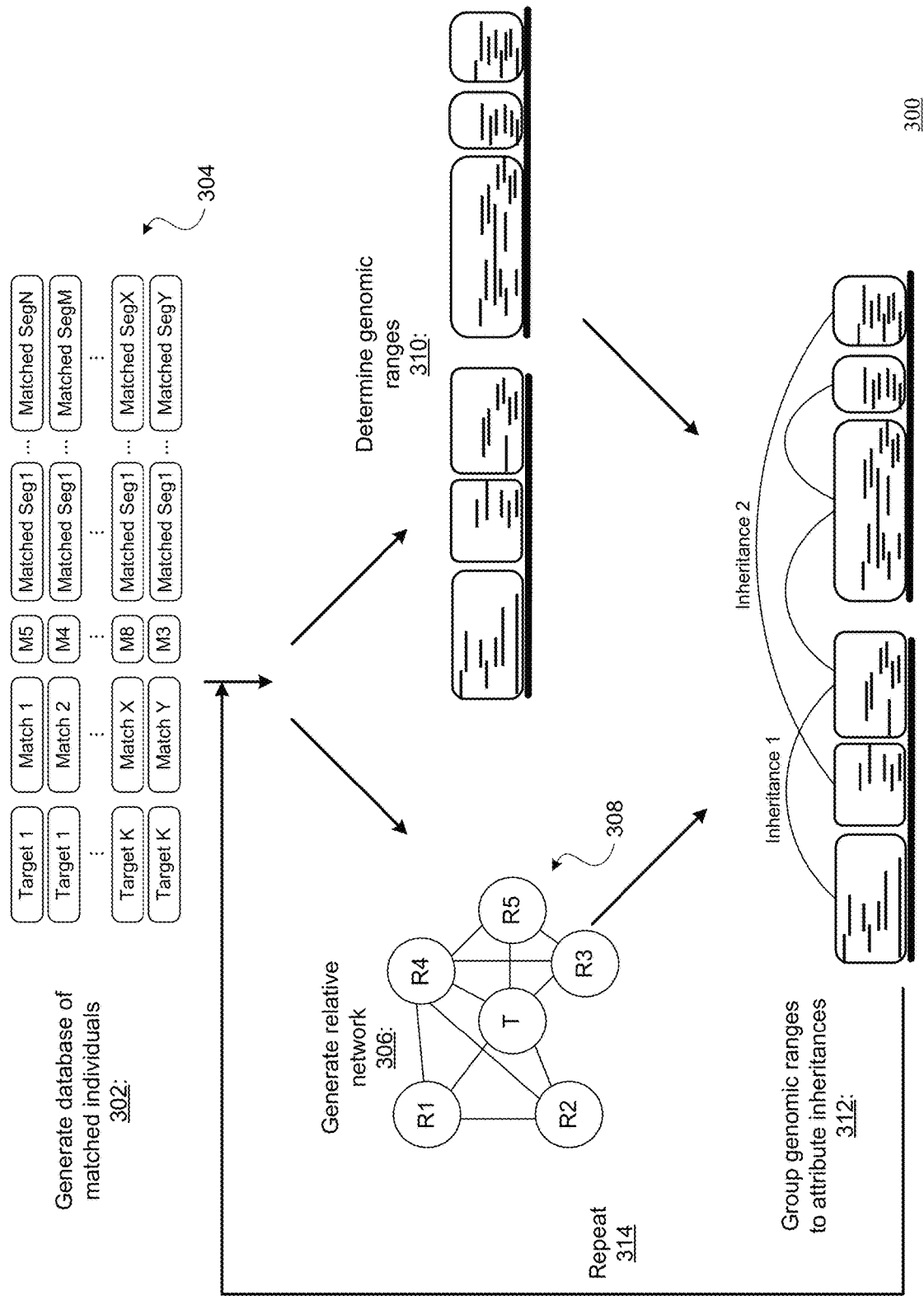
FIG. 3A is a conceptual diagram graphically illustrating an example process for determining inheritances, in accordance with some embodiments.
Figure 3B:
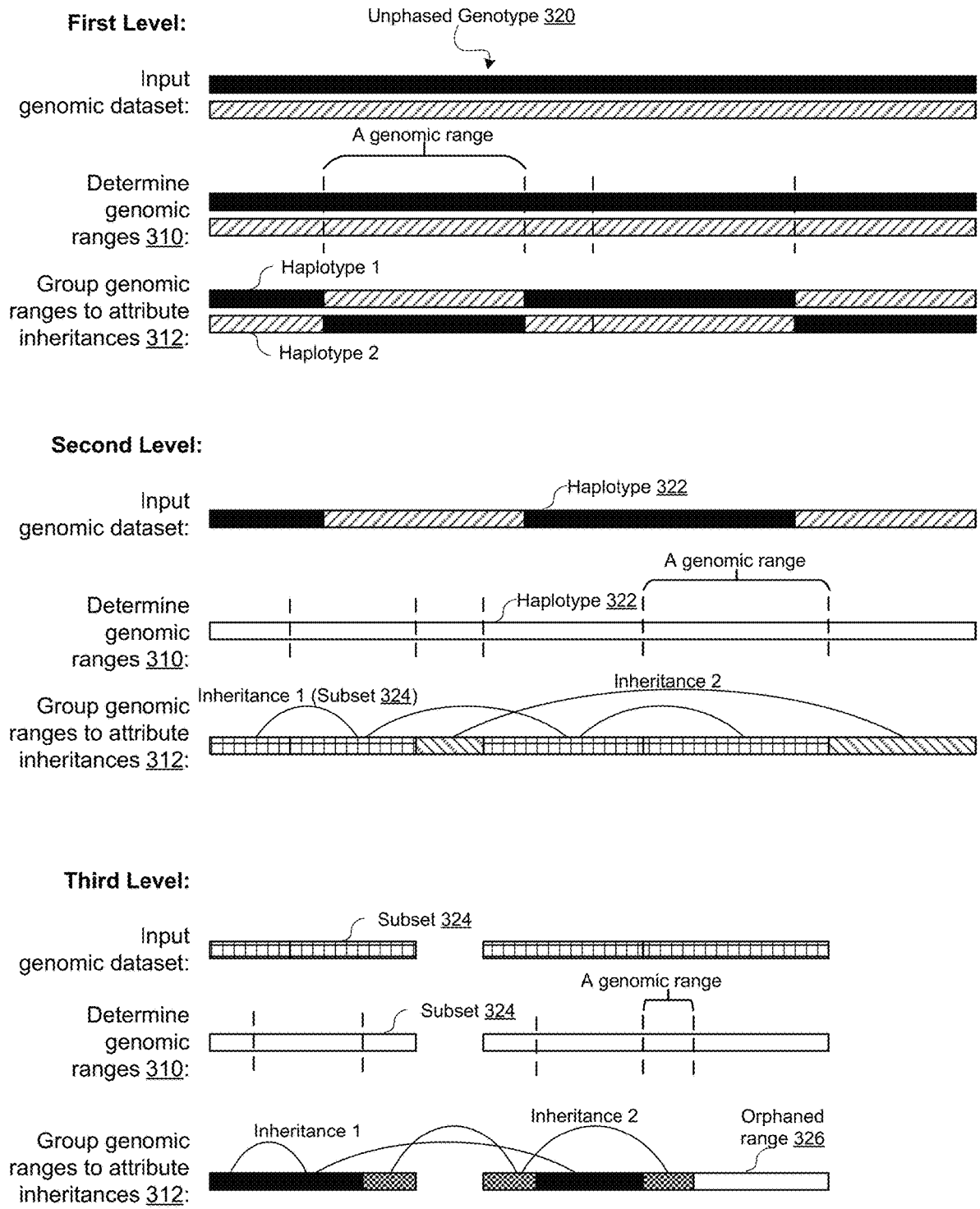
FIG. 3B is a conceptual diagram illustrating different levels of inheritance separation, in accordance with some embodiments.
Figure 3C:
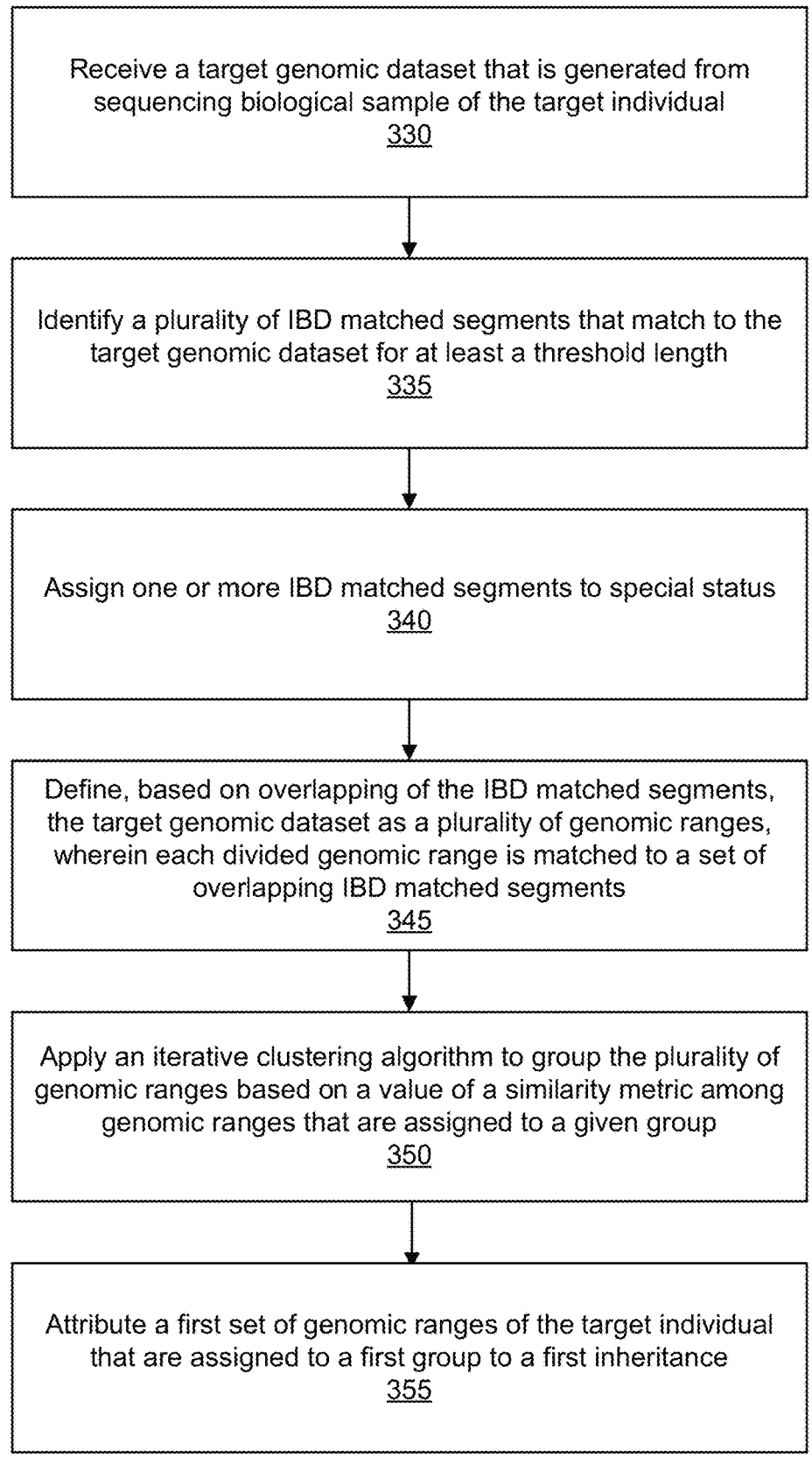
FIG. 3C is a flowchart depicting an example process for determining inheritances of genomic segments of a target individual, in accordance with some embodiments.

FIG. 3A is a conceptual diagram graphically illustrating an example process 300 for determining inheritances, in accordance with some embodiments. FIG. 3B is a conceptual diagram illustrating different levels of inheritance separation, in accordance with some embodiments. FIG. 3C is a flowchart depicting an example process 300 for determining inheritances of genomic segments of a target individual, in accordance with some embodiments. The process may be performed by one or more engines of the computing server 130 illustrated in FIG. 2A, such as the sample pre-processing engine 215, the inheritance separation engine 220, and the IBD estimation engine 225. The process 300 may be embodied as a software algorithm that may be stored as computer instructions that are executable by one or more processors. The instructions, when executed by the processors, cause the processors to perform various steps in the process 300. In various embodiments, the process 300 may include additional, fewer, or different steps. While various steps in process 300 may be discussed with the use of computing server 130, each step may be performed by a different computing device. FIGS. 3A, 3B, and 3C are discussed in conjunction with each other.

Referring to FIG. 3A, the process 300 may include different stages. The details of each stage will be further discussed in FIG. 3C and subsequent figures.

In the stage 302, the computing server 130 may first generate a database of matched individuals 304. The database of matched individuals 304 includes various target individuals' matched segment information. Each target individual may be associated with a list of matched individuals. Each matched individual may be associated with information about a list of matched segments that are matched to the target individual's genomic data.

Using the database of matched individuals 304, in stage 306, the computing server 130 may generate a network of relatives 308. The estimated degree of relatedness may be defined based on an estimated number of meiosis separations between a pair of individuals (e.g., a target individual and a potential relative). The meiosis separation may correspond to the count of the estimated number of meiosis separations through the most recent common ancestor (MRCA) between the pair of individuals. For example, the estimated degree of relatedness between the familial relationship of first cousins may be 4 because the MRCA in this example is one of the grandparents. The meiosis separations include (i) individual A-parent A, (ii) parent A-common grandparent, (iii) common grandparent-parent B, and (iv) individual B-parent B. In another example, the estimated degree of relatedness for the familial relationship between an aunt-niece relationship may be 3 because the MRCA here is the parent of the aunt (grandparent of the niece).

When the genomic data of two individuals is available but the precise familial relationship is unknown, the number of meiosis separations may be established based on which range the total length of shared segments between the two individuals falls within. The length of the shared IBD segments may be denoted as w and the number of meiosis separations may be denoted as m. In some embodiments, the relationship score may be or may correspond to a conditional probability of the estimated degree of relatedness, m, given the length of the shared IBD segments, w. The conditional probability may be denoted as Pr(m|w). In some embodiments, the values of the conditional probability may be determined based on the Bayes Law. For example, Pr(m|w)=Pr(w|m)*Pr(m)/Pr(w). In some embodiments, regarding Pr(w|m), the computing server 130 may retrieve known confirmed relatives from its genealogy data store 205 (e.g., known pairs of relatives with a confirmed m) and determine the length of the shared IBD segments, w. Based on a large number of known confirmed relatives, a distribution of Pr(w|m) may be determined and stored in the memory of the computing server 130. In some embodiments, regarding Pr(m), the computing server 130 may treat the degree of relatedness as uniformly distributed until m equals a threshold number (e.g., m=12) that is too large to be considered the pair of relatives being related. In some embodiments, regarding Pr(w), the computing server 130 may sample the genetic data in the genetic data store 210 to build a distribution of the length of shared IBD segments among various users of the computing server 130. The distribution may be stored in tee memory of the computing server 130. Based on the Bayes Law, the distribution of Pr(m|w) may be determined as a table and stored in a memory.

Based on the numbers of meiosis separations, the closely matched relatives (e.g., m≤4) may be selected from the database of matched individuals 304 of the target individual. The computing server 130 may look up the data of each closely matched relative in the database of matched individuals 304 to see how each closely matched relative is related to another closely matched relative. The target individual and the closely matched relatives may be represented as nodes and their relationships may be represented as edges. A network of relatives 308 may be constructed as a result.

Using the database of matched individuals 304, in stage 310, the computing server 130 may also determine genomic ranges in the genomic dataset of the target individual. The genomic ranges are divided based on how matched segments of other individuals overlap with each other. An example of delimiting the genomic ranges is further discussed in FIG. 4A through FIG. 7A.

After the genomic ranges are determined, at stage 312, the computing server 130 may group the genomic ranges and attribute each group to an inheritance. The grouping may be performed by one or more clustering techniques. The grouping may rely on the network of relatives 308. However, in some embodiments, the stage of generation 306 of a network of relatives 308 may be optional. In some embodiments, the computing server 130 may directly apply one or more clustering techniques to the genomic ranges determined in stage 310. However, the use of the information from the network of relatives 308 may increase the accuracy of the grouping because the close relatives often are more informative in determining inheritance. Various techniques used in the grouping process will be discussed in further detail below.

The process 300 of determining inheritance may be repeatedly applied for additional levels as indicated by arrow 314. The database matched individuals 304 may be pre-built and the data may be fetched in each repeated application of the process 300.

Inheritance may refer to the genetic lineage of an individual that is passed down from an ancestor (e.g., a parent, a grandparent, a great grandparent, a more distanced ancestor). FIG. 3B is a conceptual diagram illustrating different levels of inheritance separation that may be achieved by repeating the process 300. For example, at the first level of inheritance separation, the target individual's genomic data may be biallelic genotype 320 which is unphased. The unphased and biallelic nature is represented by two lines with different filled patterns. While genotype 320 is represented by a sequence of biallelic readings, the sequence may include reading from various locations in the genome and may include readings across different chromosomes. The separation of inheritances at this level refers to a phasing process that determines a first haplotype being inherited from a first parent and a second haplotype being inherited from a second parent.

At a second level of inheritance separation, one of the haplotypes inherited from one of the parents may be used as an input. For example, haplotype 1 (labeled as haplotype 322) from the first level is used as the input for the second level. The process 300 determines that a first subset of genomic ranges of the haplotype 322 is inherited from a first grandparent (inheritance 1) and a second subset of genomic ranges of the haplotype 322 is inherited from a second grandparent (inheritance 2).

The separation of inheritances using the process 300 may further be repeated at a higher level to separate inheritances from great-grandparents and additional ancestors. For example, at the third level of inheritance separation, one of the subsets of genomic ranges that belong to an inheritance is used as an input. The subset illustrated is labeled as subset 324. The process 300 determines that certain genomic ranges in the subset 324 belong to the first inheritance and other genomic ranges in the subset 324 belong to the second inheritance. The process 300 may be further repeated.

At any level of inheritance separation, one or more genomic ranges may be unable to be classified as belonging to any group. This may be due to insufficient data or evidence to classify a range as an inheritance. Such a range may be referred to as an orphaned range 326 and can occur at any level, not merely the third level as illustrated in FIG. 3B.

At any level of inheritance separation, the input data may be referred to as the target genomic dataset and the output segments that are grouped to two or more sides of inheritances may be referred to as genomic ranges. For example, at the first level of inheritance separation, the target genomic dataset may be an unphased biallelic genotype sequence 320 and the genomic ranges may be a pair of phased haplotypes that are each respectively assigned to a parent. At the second level of inheritance separation, the target genomic dataset may be a phased haplotype 322 of a particular parent and the genomic ranges may be segments of in the phased haplotype.

Referring to FIG. 3C, a flowchart that provides additional detail of the process 300 is illustrated, in accordance with some embodiments. In some embodiments, process 300 can include receiving a target genomic dataset that is generated from sequencing biological sample of the target individual (step 330). For example, a target individual may be a user (e.g., a new user) of the computing server 130 and provide their biological sample to the genetic data extraction service server 125 for extraction and sequencing. The target individual may also be referred to as a proband. The computing server 130 may process the genomic data using the sample pre-processing engine 215 and store the genomic data in the genetic data store 205. The genomic data may include one or more sequences of allelic reads of part of the target individual's genome. A genomic sequence may include a consecutive sequence of nucleotide site or a sequence of selected targeted sites such as SNP sites in interest. The genomic sequence may include a long range of allelic reads from different genetic loci across different chromosomes. The genomic data can be in various formats that are discussed in FIG. 1 and FIG. 2A. While the terms genome and genomic are used, the term does not imply that the genomic dataset includes the entire genome. In some embodiments, the genomic sequence may include targeted SNP sites of any portion of the genome. In some embodiments, the genomic sequence may include targeted SNP sites in a majority of the genome.

In various embodiments, the target genomic dataset that is generated from the sequencing of a biological sample does not need to be generated directly from the sequencing. Multiple data processing steps may occur between the sequencing and the generation of the target genomic dataset. Also, as discussed, the process 300 may be repeated. The input for each level of separation may be a smaller set of the initial genotype data that is generated from the sequencing.

The target genomic dataset at each level of separation may still be considered as generated from the sequencing.

The target genomic dataset of the target individual may be raw or processed, phased or unphased, depending on embodiments and situations. For example, in some embodiments, the target genomic dataset may be processed by the sample pre-processing engine 215 and/or the inheritance separation engine 220. As discussed in further detail in this disclosure, the process 300 may serve as a phasing algorithm to separate a genotype in the target genomic dataset into a pair of haplotypes (e.g., the first level of separation). In some embodiments, the process 300 may be applied repeatedly to determine the inheritance of various genomic ranges in the target genomic dataset, as illustrated in FIG. 3B. For example, in some embodiments, the target genomic dataset may start with unphased biallelic reads that are generated from DNA sequencing. The first round of inheritance determination using the process 300 may separate the unphased biallelic reads into a pair of haplotypes, each inherited from a parent. In some embodiments, the target genomic dataset may start with a phased haplotype that is inherited from a parent. In turn, the process 300 may break the phased haplotype into two or more sets of genomic ranges. The process 300 may assign a first set of genomic ranges to a first grandparent belonging to the first inheritance and a second set of genomic ranges to a second grandparent. In some embodiments, a repeated application of the process 300 to a new target genomic dataset that includes only a particular set of genomic ranges may further divide the particular set of genomic ranges into two or more lines of inheritance. For example, applying the process 300 to the first set of genomic ranges that are determined to be inherited from the first parent may further divide the first set of genomic ranges into multiple subsets that are respectively belonging to one or more ancestors who passed down the genetic materials to the first grandparent.

In some embodiments, the determination of inheritance of genomic data may be based on IBD matches of a database of individuals that are related to the targeted individual in various degrees. Those individuals may be close relatives, distant relatives, and other individuals in a population who share some degree of inheritance with the target individual. The IBD matches of those individuals are used to resolve, on a large scale, how a certain set of genomic segments passed down from a line of inheritance.

By way of example, continuing with reference to FIG. 3C, in some embodiments, process 300 can include identifying 335 a plurality of matched segments that match to the target genomic dataset for at least a threshold length (step 310). The matched segments may be IBD-matched segments. The matching of segments may be performed by methods that are discussed in the IBD estimation engine 225. Additionally, or alternatively, the genomic dataset of a potentially matching individual may be compared to the target genomic dataset. Two segments (one from the potentially matching individual and another from the target individual) may be considered as no longer matching when one or more homozygous mismatched site is found (e.g., the potentially matching individual having the alleles TT at a site and the target individual having the alleles GG at the same site). Details of an example way to find IBD-matched segments on the genomic level are discussed in FIG. 4B. In some embodiments, the computing server 130 may consider the matching ends once a homozygous mismatched site is found. In some embodiments, the computing server 130 may tolerate a single or a small number of homozygous mismatched sites. The precise number of tolerated mismatched sites may be part of an iterative process of the process 300 to be further discussed below.

As many individuals may share DNA with the target individual to a certain degree, a threshold length may be set to determine whether a matched segment is to be included in the process 300 as an IBD-matched segment. In some embodiments, a first threshold length of 8 cM (8 centimorgan) may be used. In other embodiments, a different threshold may be used, whether it is static or dynamic, individualized or fixed across different target individuals. In some embodiments, the inclusion of IBD-matched segments may be based on a breaking of subcluster process that will be discussed in further detail below, such as in step 345 and in FIG. 4A through FIG. 4C.

Example Database of Matched Individuals

In some embodiments, the determination of matched segments may be pre-determined before the runtime of the main algorithms of the process 300 that are used to determine inheritance. The matched data may be stored in a database of matched individuals 304. The discussion of this section may be an example of the stage 302 in FIG. 3A. The database of matched individuals 304 may store individuals (whether a target individual or a matched individual) as 32-bit identifiers, a number of matched segments, total shared DNA in cM, a meiosis separation relationship (M0, M1, M2, M3, etc.), and a list of matched segments. The list of matched segments may be in any suitable format, such as a semicolon-separated list of comma-separated pairs of SNP identifiers. An example of such data structure is illustrated in the table below. The entire database may include a number of target individuals and the corresponding matched individuals of each target individual.

| Target ID | Match ID | # of Matched Segments | Total cM | Meiosis Separation Relationship | Matched Segments Identifiers |
|---|---|---|---|---|---|
| A2D1N1 | S1D2NO | 1 | 12.77 | 10 | rs34982, rs23942 |
| A2D1N1 | K6D7N6 | 1 | 13.23 | 10 | rs32894, rs12310 |
| A2D1N1 | R2D1N1 | 1 | 10.16 | 10 | rs91241, rs81235 |
| A2D1N1 | D1L4D9 | 8 | 70.99 | 5 | rs93243, rs91245; rs77077, rs4077; |
| ... | | | | | ... |
| A2D1N1 | C5D4N9 | 1 | 8.88 | 10 | rs61203, rs41294 |
| D9M7D9 | G2X2W2 | 1 | 10.01 | 10 | rs12345, rs28282 |
| ... | | | | | |

In some embodiments, the retrieval of genomic datasets of potentially matched individuals may be from a large-scale database of matched individuals 304 as part of the genetic data store 205. The large-scale database may take the format discussed in the table above. In some embodiments, the large-scale database of matched individuals 304 includes the genomic datasets of over 1,000 individuals. In some embodiments, the large-scale database of matched individuals 304 includes the genomic datasets of over 5,000 individuals. In some embodiments, the large-scale database of matched individuals 304 includes the genomic datasets of over 10,000 individuals. In some embodiments, the large-scale database of matched individuals 304 includes the genomic datasets of over 50,000 individuals. In some embodiments, the large-scale database of matched individuals 304 includes the genomic datasets of over 100,000 individuals. In some embodiments, the large-scale database of matched individuals 304 includes the genomic datasets of over 500,000 individuals. In some embodiments, the large-scale database of matched individuals 304 includes the genomic datasets of over 1,000,000 individuals.

In some embodiments, the size of the large-scale database of matched individuals 304 may be over 500 GB. In some embodiments, the size of the large-scale database of matched individuals 304 may be over 1 TB. In some embodiments, the size of the large-scale database of matched individuals 304 may be over 5 TB. In some embodiments, the size of the large-scale database of matched individuals 304 may be over 10 TB. In some embodiments, the size of the large-scale database of matched individuals 304 may be over 20 TB. In some embodiments, the size of the large-scale database of matched individuals 304 may be over 40 TB.

In some embodiments, to accelerate the entire process 300, the computing server 130 may optionally reduce a large-scale database of matched individuals 304 to a reduced set of closely matched individuals. Each closely matched individual may share segments with the target genomic dataset of a target individual for at least a second threshold length that is larger than the first threshold length. For example, the second threshold length may be set as 65 cM or another suitable number. The rest of more distant matches are filtered and removed from the database. For example, in the table above, for the target individual with the identifier A2D1N1, only the matched individual with the identifier D1L4D9 is kept in the reduced set. The use of a reduced set of closed matches may significantly reduce the amount of data (e.g., from over 40 TB to 10 GB) to a size that is loadable into the random access memory (RAM) of the computing server 130. Since the entire set of the matched data may be loaded into the RAM, the rest of the process 300 may be significantly improved. The use of a reduced set of closed matches improves the operation of the computing process and meaningfully speeds up the process 300 by avoiding repeated process of loading and removing data from RAM.

Closely Matched Relatives

Continuing with reference to FIG. 3C, in some embodiments, process 300 can include assigning one or more IBD matched segments to special status (step 340). This step may also include determining the familial relationship of some of the relatives of the target individual and may correspond to an example of the stage 306 in FIG. 3A. A purpose of step 340 is to identify the relationships of closely matched relatives of the target individual as precisely as possible based on the data from the database of matched individuals. In other words, based on the total length of shared IBD segments between a target individual and a closely matched relative, the computing server 130 may attempt to determine the precise familial relationship between the target individual and closely matched relative (e.g., is the closely matched relative a parent, a grandparent, a first cousin, a child, an uncle/aunt, etc.). The computing server 130 may determine the familial relationship as precise as possible, although in some cases using genomic data alone may not be sufficient to determine the exact relationship. For example, in some cases, the computing server 130 may determine that a closely matched relative is on one parental side of the family but does not know what the precise relationship is. In other cases, based on the high value of cM shared between the two individuals, the computing server 130 may be able to determine the precise relationship readily, such as a parent-child relationship.

Based on the identified relationships, one or more special status may be assigned to the corresponding matched segments of those closely matched relatives. One example of special status is an extra-informative match. In separating a target genomic dataset into two or more inheritances (e.g., separating parent inheritances at the first level, or separating grandparent inheritances at the second level, etc.), if a close relative is determined to be definite on one side of the inheritance, the matched segments of the close relative are marked as extra-informative matches. Another example special status is same-inheritance status. This type of close relatives is not useful for inheritance separation. The matched segments of those close relatives are filtered out and not used in process 300.

In some embodiments, the filtering may be used to remove a close relative that may not be helpful in separating inheritances of a target genomic dataset because the close relative may share the same inheritances of the target genomic dataset. Conceptually, at any round of application of the process 300, the process 300 is to separate a set of genomic ranges into two or more subsets that are passed down from different lines of inheritances. If a close relative is determined to have their genomic data passed down from those lines of inheritances, the genomic data of the close relative may not be helpful to separate the inheritances. For example, in the phasing level of separating two parents, if the close relative is considered a potential descendant of the target individual's parents (e.g., the close relative is the target individual's niece or nephew), in some embodiments, the matched segments of that close relative are filtered out and not used in subsequent steps of the process 300.

In assigning special status, the computing server 130 may determine one or more candidate IBD matched segments belonging to potential descendant of two or more inheritances of the target individual. The two or more inheritances are to be separated by this inheritance determination process. The computing server 130 may determine the familial relationship between a closely matched relative and the target individual. The computing server 130 may identify, from the one or more candidate IBD matched segments, a IBD matched segment that belong to a descendant of the two or more inheritances. The computing server 130 may remove the identified IBD matched segment. If the computing server 130 determines that a close relative is on only one side of inheritance, the computing server 130 may mark the corresponding matched segments as extra-informative.

Using the level of parent separation as an example, a purpose of step 315 is to determine whether matched segments of closely matched relatives are specifically helpful or likely to be unhelpful in separating inheritances. The concepts of using parent inheritance separation may be generalized to other levels of inheritance separation, such as grandparent inheritance separation. In one case, computing server 130 may identify a target individual's closely matched relative as a relative of only a single and label the relative as extra-informative. In another case, the computing server 130 may label another closely matched relative as potential descendants of the target individual's both parents and is not helpful in separating the parents' DNA. Thus, the computing server 130 does not use the corresponding matched segments for phasing.

In some embodiments, the computing server 130 may use the total lengths of matching (in cM) with the target individual to classify relatives into a set of closely matched relatives. What may be considered a closely matched relative may depend on the level of application of the process 300. For example, for the first level of separation of the inheritances from two parents, the range required to be considered closely matched may be higher than the range for the second level of separation of the inheritances from two grandparents. For example, for parent inheritance separation, total length of matching that indicates the relationship of first cousins, nieces, nephews, etc. may be considered as closely matched relatives. Among the set of closely matched relatives and the target individual, the computing server 130 may determine pairwise relationships among those relatives. The pairwise relationships may be retrieved from the database of matched individuals. A network of relationships among the closely matched relatives may be constructed based on the pairwise relationships.

In some embodiments, based on the network of relationships, the computing server 130 may assign special status to one or more closely matched relatives. For example, if a closely matched relative matches all of the target individual's other closely matched relatives in the network, the closely matched relative is considered a potential descendant of both lines of inheritances. The matched segments of a closely matched relative may be removed and are not used in process 300. If a closely matched relative's pairwise relationships with other closely matched relatives are lower than a threshold, such as if the closely matched relative does not match all others, the computing server 130 may classify the closely matched relative as being on only one side of the inheritance (e.g., belonging to only the paternal side or the maternal side). The matched segments of that closely matched relative may be labeled as extra-informative.

Referring to network 308 illustrated in FIG. 3A, all individuals are closely matched relatives of the target individual T. R4 matches everybody and is removed from the process 300 (may be R4 is a child or nephew of the target individual), but R1, R2, R3 and R5 may be labeled as extra-informative. Furthermore, R1 and R2 match each other and may be considered to be on the same side of an inheritance (e.g., a first parent's side of the family). R3 and R5 may be considered to be on another inheritance (a second parent's side of the family).

In some embodiments, the computing server 130 may also apply a few specific rules in identify familial relationships or classifying whether a closely matched relative is extra-informative. In some embodiments, special relations such as twins and siblings (M0 and M2 matches) may be labeled as such based on the lengths of shared IBD segments alone. The matched segments for those relatives may be removed because twins and siblings are not useful for separating inheritances. For a relative who is either a parent or a child (having M1 meiosis separation relationship), if two M1 matches are available and these two M1 matches do not share sufficient DNA (e.g., up to 400 cM), the two M1 matches are considered parents of the target individual and given extra-informative status. Other example rules may use triangulation to determine if a particular closely matched relative's relationships only makes sense with other closely matched relatives if the particular closely matched relative is on a single side of inheritance.

If an M1 match (not sure if the relative is a parent or a child) or M3 match (not sure if the relative is a grandparent, grandchild, aunt, uncle, niece, nephew, or half sibling) cannot be labeled by any of the above, the computing server 130 may load shared matches from the database of matched individuals and compute the probability of the possible relationships using one or more machine learning models.

In some embodiments, the computing server 130 may also consult other sources such as data from the individual profile store 210 and tree management engine 260 to determine the familial relationship between a closely matched relative and the target individual. For example, the target individual may have constructed one or more family trees whose relatives in the family tree have genomic datasets stored in the computing server 130. The relationship between those relatives with the target individual may be known and confirmed. The computing server 130 may use those relationships in assigning special status to the corresponding matched segments.

Segmenting and Grouping

Continuing with reference to FIG. 3C, in some embodiments, process 300 can include defining, based on overlapping of the IBD matched segments, the target genomic dataset as a plurality of genomic ranges (step 345). In this step, the genomic ranges are delimited from the target genomic dataset. This step may be an example of the stage 310 in FIG. 3A. Each divided genomic range is matched to a set of overlapping IBD-matched segments. The process of defining the plurality of genomic ranges is conceptually and graphically illustrated in FIG. 4A through FIG. 7A and will be discussed in further detail below. The overlapping of the IBD-matched segments is graphically illustrated in FIG. 4A. How a genomic range is divided is also further discussed below.

Continuing with reference to FIG. 3C, in some embodiments, process 300 can include applying an iterative clustering algorithm to group the plurality of genomic ranges based on a value of a similarity metric among genomic ranges that are assigned to a given group (step 350). This step may be an example of stage 312 in FIG. 3A. Grouping of the genomic ranges separates various genomic ranges into two or more sets. One set is classified to one of the inheritances and another set is classified to another of the inheritances.

In some embodiments, the similarity metric that is used to group the genomic ranges may take various suitable forms. In some embodiments, a value of the similarity metric of two given genomic ranges is determined based on lengths of IBD-matched segments corresponding to a matched individual whose segments are classified as IBD-matched segments in both of the two given genomic ranges. For example, say two given genomic ranges are tentatively assigned to the same group, the computing server 130 may examine whether there is a matched individual who has a first IBD-matched segment matched to the first genomic range and a second IBD-matched segment matched to the second genomic range. If so, the value of the similarity metric between these two genomic ranges increases, and the value is based on the lengths of the two IBD-matched segments. In some embodiments, a value of the similarity metric of two given genomic ranges is determined further based on (1) a first length of IBD matched segment corresponding to a matched individual in the first genomic range of the two given genomic ranges and (2) a second length of IBD matched segment corresponds to the match individual's second-degree relative in a second genomic range of the two given genomic ranges.

Various examples of iterative clustering algorithms will be further discussed below. In some embodiments, the computing server 130 may examine a first candidate assignment that assigns a first candidate set of genomic ranges to a given group. The computing server 130 may determine a first value of the similarity metric of the first candidate set. The computing server 130 may examine a second candidate assignment that assigns a second candidate set of genomic ranges to the given group. The computing server 130 may determine a second value of the similarity metric of the second candidate set. The computing server 130 may select the first or the second candidate assignment based on the values of the similarity metric and may iteratively adjust the candidate assignments in a direction that increases the value of the similarity metric.

In some embodiments, the iterative clustering algorithm may include two or more stages. In some embodiments, the two or more stages may include a first clustering tree stage and a refinement (fine-tune) stage. For example, in the first clustering tree stage, the computing server 130 may construct a similarity matrix for the plurality of genomic ranges. The similarity matrix may include values of the similarity metric of two given genomic ranges. The computing server 130 may construct a clustering tree that assigns, based on the values in the similarity matrix, the plurality of genomic ranges into positions of nodes in the clustering tree. The computing server 130 may divide the clustering tree into two or more branches. Each branch may include a plurality of nodes and corresponding to a group assignment. Details of the clustering tree stage will be discussed below.

Continuing with reference to FIG. 3C, in some embodiments, process 300 can include attributing a first set of genomic ranges of the target individual that are assigned to a first group to a first inheritance and attribute a second set of genomic ranges that are assigned to the second group to a second inheritance (step 355). For example, at the level of parent inheritance separation, the genomic ranges may correspond to haplotype segments. A first set of haplotype segments is grouped and classified as inherited from a first parent. A second set of haplotype segments is grouped and classified as inherited from a second parent. The grouping may be cross-chromosome and span across almost the entire genome or more than a majority of the genome. As such, long-distance and cross-chromosome phasing is possible by using IBD matches. This type of phasing may be referred to as IBD phasing. If the process 300 is applied again to one of the phased long-range haplotypes, now the target genomic dataset is the phased long-range haplotype. The haplotype will be divided into a plurality of genomic ranges. A first set of genomic ranges may be grouped and classified as inherited from a first grandparent. A second set of genomic ranges may be grouped and classified as inherited from a second grandparent.

In some embodiments, the computing server 130 may apply the iterative clustering algorithm again to the first set of genomic ranges of the target individual to group the first set of genomic ranges into at least a subset of genomic ranges. The subset of genomic ranges are an earlier inheritance in the first inheritance. For example, for the genomic ranges that are assigned to a grandparent, the process 300 may be applied again to further divide the genomic ranges into two great-grandparents.

The computing server 130 may assign metadata to matched individuals' genomic datasets to associate the dataset with a family side of the target individual. For example, the computing server 130 may assign metadata to one or more matched individual datasets. The metadata may specify that one or more matched individual datasets are connected to the target individual dataset by an inheritance. The computing server 130 may also save the genomic dataset with genomic ranges. Each genomic range is associated with identifiers that identify the parent, the grandparent, and other inheritance.

It should be noted that the grouping at each level can be long-range and cross-chromosome.

Algorithmic Examples of Segmenting and Grouping

Figure 4A:
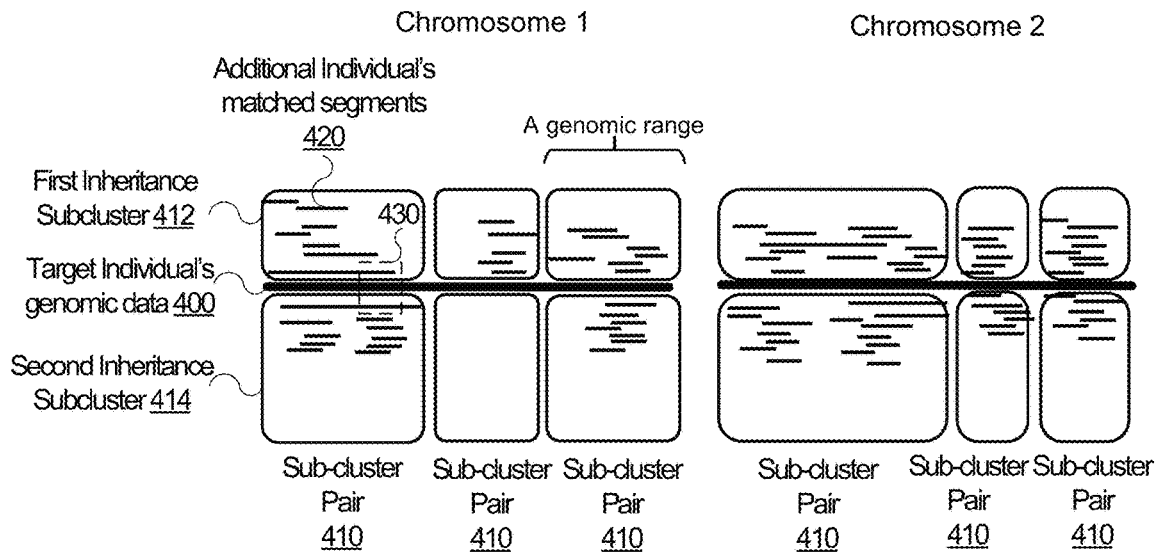
FIGS. 4A, 4B, and 4C are conceptual diagrams comparing segments of genomic data between matched individuals and a target individual.
Figure 4B:
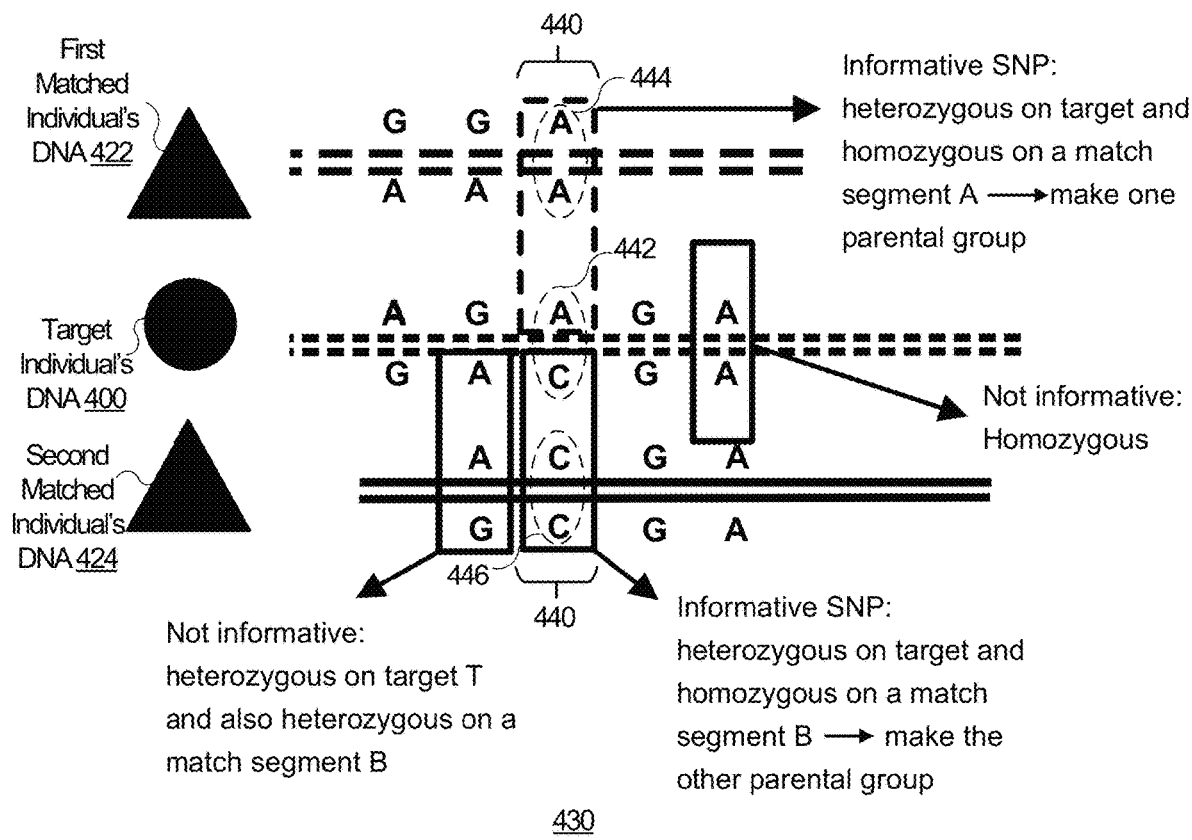
Figure 4C:
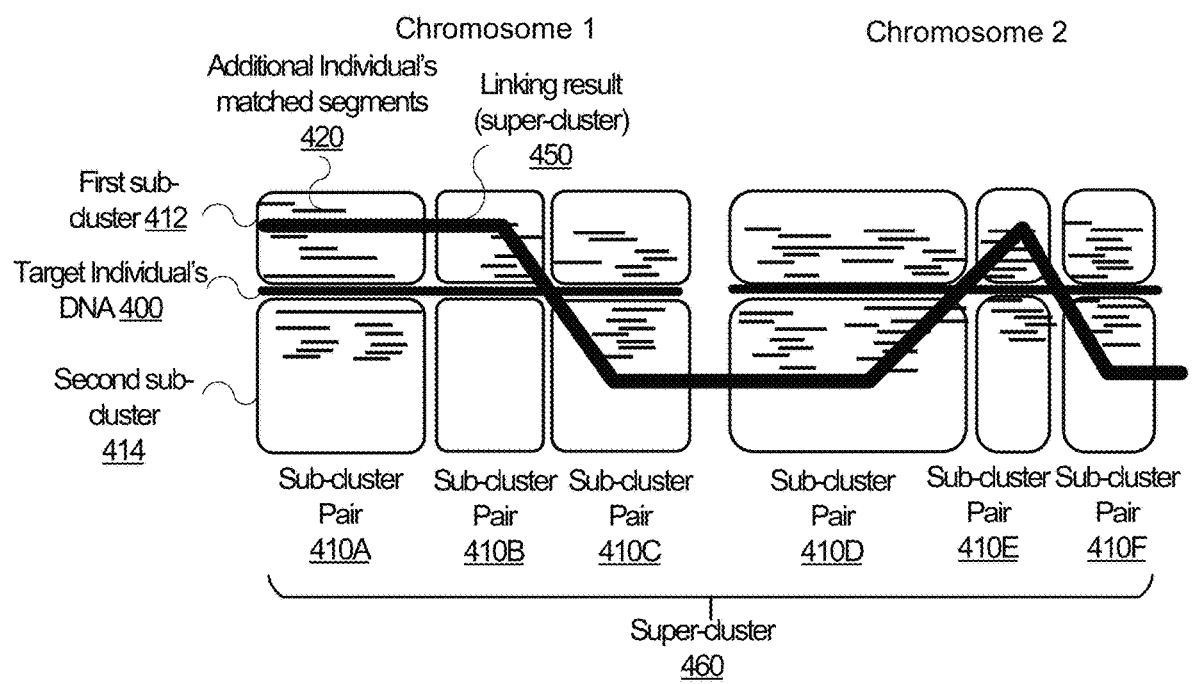

FIGS. 4A, 4B, and 4C are conceptual diagrams comparing segments of genomic data between matched individuals and a target individual. FIGS. 4A, 4B, and 4C illustrate, at the genomic level, how a target genomic dataset may be divided into genomic segments and how the genomic segments are grouped. FIGS. 4A, 4B, and 4C provide examples of stages 310 and 312 in FIG. 3A. The illustration in FIGS. 4A, 4B, and 4C is explained primarily using the first level of inheritance separation (separating two parents' genetic data) as an example, the steps for segmenting and grouping may be generalized to higher levels of inheritance separation.

By way of example, the computing server 130 may classify individuals who may be related to the target individual to a first inheritance side (first parental side in the first level of separation) and a second inheritance side (second parental side in the first level of separation) by comparing the genomic data of the individuals to of the target individual. In some embodiments, the process described may classify potential relatives to one of the inheritance sides without the genomic dataset of either parent of the target individual, although a parent's genomic dataset may be marked as extra-informative and may improve the accuracy of the inheritance determination. In some embodiments, the genomic datasets of other individuals may be directly compared to the genomic dataset of the target individual in classifying whether those individuals belong to a first or second inheritance side.

By way of example, the computing server 130 may receive a target individual genomic dataset and additional individual genomic datasets, such as by retrieving data from a genetic data store 205 or from the database of matched individuals 304. The target individual genomic dataset may include data from a plurality of allele sites of interest such as SNP sites of interest. Some of the allele sites may be homozygous while others may be heterozygous. The computing server 130 also may identify a number of additional individuals who may be related to the target individuals by IBD. Those individuals may be stored in the database of matched individuals 304 and may be referred to as matched individuals. The computing server 130 may receive a plurality of genomic datasets of those individuals (referred to as matched individual genomic datasets, in contrast to the target individual genomic dataset).

At the first level of separation, the computing server 130 may retrieve a target genotype sequence of the target individual. The target genotype sequence may be biallelic. The computing server 130 may also retrieve the genomic datasets of matched individuals. Each site in various sequences may be homozygous for major alleles, heterozygous, or homozygous for the minor allele, and in some cases can be missing—not called by the lab, not otherwise imputed by the computing server 130. In some cases, the major allele is whichever is more common in a population. In other cases, the designation of major or minor can be arbitrary. Any genotype sequence may be referred to as a genomic dataset.

The computing server 130 may divide the target individual genomic dataset into a plurality of genomic segments. For a genomic segment, the computing server 130 may scan through different matched individual genomic datasets (e.g., by consulting the database of matched individuals 304) to see if there are matched individual genomic datasets that have a matched segment. The computing server 130 may set a predetermined number as a threshold for considering whether a segment is a match. For example, in order to qualify as a match, a genomic dataset may need to include a sequence of alleles at multiple consecutive SNP sites that overlap with some portion of the target individual genomic dataset at a genetic locus.

The computing server 130 may classify more than one matched individual genomic dataset that has a matched segment that overlaps the target individual genomic dataset at a genetic locus as matches to the target individual. Those classified genomic datasets collectively may be referred to as a subcluster. For the first level of inheritance separation, subclusters may appear as a pair because the input genomic dataset is biallelic and can be separated into to a first parental subcluster and a second parental subcluster. At higher levels of inheritance separation, the input genomic dataset may have been phased. Each divided genomic segment may correspond to a subcluster that includes a number of matched segments of matched individuals that are mapped to the genomic segment.

The computing server may generate a plurality of subclusters. At the first level of inheritance separation, the subclusters appear in pairs corresponding to a first parental subcluster and a second parental subcluster. FIG. 4A illustrates a conceptual diagram for multiple subclusters pairs 410. Thick horizontal lines in FIG. 4A represent the target individual genomic data 400. Thin and shorter horizontal lines represent matched individuals' matched segments 420. Each subcluster pair 410 may correspond to a segment of the target individual's genomic data 400. The genomic segment may correspond to one or more genetic loci. Each subcluster pair 410 has a first parental subcluster 412 and a second parental subcluster 414. At higher levels of inheritance separation, each divided genomic segment may correspond to a subcluster. For each genomic segment that corresponds to a subcluster pair 410, the computing server 130 may identify matched individuals' segments 420 that match (e.g., matched by IBD) the target individual's genomic data 400 and classify the matched segments to one of the two parental subclusters 412 or 414.

FIG. 4B illustrates, at a genomic level, an example process of classifying matched segments of matched individuals to one of the two parental subclusters 412 or 414 in order to determine genomic ranges in stage 310 of FIG. 3A, in accordance with some embodiments. FIG. 4B is a conceptual diagram illustrating an enlarged view of a region 430 in FIG. 4A, which includes the target individual's DNA 400, a first matched individual's DNA 422 (a first matched segment), and a second matched individual's DNA 424 (a second matched segment). In some embodiments, the computing server 130 may use one or more heterozygous allele sites of the target individual genomic dataset to classify different matched segments into two different parental groups 412 and 414. For example, the computing server 130 may identify a particular heterozygous allele site (e.g., 442) of the target individual genomic dataset at a genetic locus. The heterozygous allele site 442 includes a first allele (e.g., A) and a second allele (e.g., C) that is different from the first allele. The computing server 130 may assign the first allele as the first parental side and the second allele as the second parental side.

The computing server 130 may use an informative SNP site to for the classification of two parental subclusters. In some embodiments, to separate two parental subclusters, the computing server 130 may identify an allele site that has a heterozygous allele for the target individual and homozygous allele at the same site of one or more matched individuals. Taking the third site 440 in FIG. 4B as an example, the computing server 130 may start with a heterozygous allele site 442 (A-C) of the target individual DNA. The computing server 130 identifies that a first matched segment of a first matched individual has homozygous (A-A) alleles 444 at the allele site 440 and classifies the matched dataset to the first parental subcluster 412. Likewise, the computing server 130 identifies that a second matched segment of a second matched individual has homozygous (C-C) alleles 446 at the allele site 440 and classifies the second matched segment to the second parental subcluster 414. In some embodiments, an informative SNP site may be a heterozygous allele site of the target individual genomic dataset that has at least two corresponding additional genomic datasets of two potential relatives who each have homozygous alleles at the site. While for the particular case shown in FIG. 4B that the homozygous alleles of the two matched individuals are different (e.g., one with A-A and another with C-C), in some cases, the homozygous alleles of the two matched individuals may be the same (e.g., both with A-A or both with C-C). If the computing server 130 identifies a second matched individual whose genomic dataset also has a homozygous allele at the target allele site but the allele is different from the first matched individual (e.g., the first matched individual is A-A and the second matched individual is C-C), then those two match individuals may correspond to two parental subclusters of the target individual. If the computing server 130 identifies a second matched individual whose genomic dataset also has a homozygous allele at the target allele site and the allele is the same as the first matched individual (e.g., both individuals have A-A), then those two match individuals may correspond to the same parental subcluster of the target individual.

For higher levels of inheritance separation, the input genomic dataset may be phased. An informative site may be a site of the target individual that is heterozygous before phasing. Since the input is phased, only one allele of the informative site is used. Only matched individuals with a homozygous allele at the informative site that matches the phased allele of the target individual are matched in a particular genomic segment.

To classify matched segments into subclusters, the computing server 130 may examine potentially matched segments that are contiguous subsets of SNPs corresponding to the target individual's sequence 400. A candidate matched segment may match the target genotype sequence for a length that exceeds a predetermined threshold. The computing server 130 may begin at the informative heterozygous site A-C 442 of the target individual's genomic sequence 400. The computing server 130 may classify candidate matched segments (e.g., including segment 422) that have A-A at the target site 440 and identify this group of candidate matched segments 420 as the first parental subcluster. The computing server 130 may also classify other candidate matched segments (e.g., including segment 424) that have C-C at the target site 440 to the second parental subcluster. At this point, in some cases, not all retrieved candidate matched segments are put into a subcluster yet because some candidate matched segments have heterozygous alleles at the target site 440 or have missing data at the target site 440. The computing server 130 may move along the target individual's genomic sequence 400 to identify another heterozygous site (e.g., a site having alleles C-T, not shown in FIG. 4B). At this second heterozygous site, additional candidate matched segments 420 that were not classified at the first heterozygous site 440 (due to the candidate's site being heterozygous or due to missing data) may be classified.

In classifying one or more candidate matched segments to either parental subcluster of the target individual, the computing server 130 may break a matched segment into two segments if matching fails (e.g., a candidate matched segment 420 fails to match the haplotype of the target individual) as the computing server 130 continues to compare the sequences. As the computing server 130 continues to move along the target individual's genomic sequence 400, the computing server 130 may find classified candidate matched segments 420 that are contradicting each other. For example, two candidate matched segments 420 may be classified to the same parental subcluster due to both having A-A at the first site 440. Yet, at the next informative site that corresponds to the second heterozygous site of the target individual, the two candidate matched segments 420 have contradicting homozygous alleles (e.g., one having C-C and another having T-T). In this situation, this informative site may be referred to as a conflicting informative site. In such a case, the computing server 130 may break one of the two candidate matched segments 420 into sub-segments to resolve the conflict. As a result, a matched segment that is originally put into one of the parental subclusters may be broken into two sub-segments. Each sub-segment may be put into a different parental subcluster.

The contradiction in various sites among different candidate matched segments 420 may be attributable to various reasons. For example, the target or candidate sequences may be wrong due to genotyping error or imputation error. A candidate matched segment 420 may have incorrect endpoints (e.g., the sequence extends beyond where the haplotype sharing really stops). The candidate sequences may share the alleles with the target individual's sequence with both parents but the candidate matched segments 420 switch at some point because of a recombination event in the family history. The last case may occur relatively frequently among matches between the target individual and other descendants of the target's parents (e.g., her siblings, nephews, children, etc.). Hence, the computing server 130 may break up a candidate matched segment by inserting breakpoints to create two matched segments. In some cases, after inserting breakpoints, small segments that are shorter than a predetermined threshold may be discarded.

To summarize, each segment of the target individual's genomic dataset may include a number of informative SNPs. In some cases, not all alleles on the same matched segment have the same parental subcluster. For example, the first 30 SNPs might belong to the first parental subcluster, but the next 20 SNPs might belong to the second parental subcluster. There could be a number of reasons for this phenomenon: (1) the matched segment is from a descendent of the target individual's parents and therefore, the match could be on both sides of the family and (2) the matched segment might be extended erroneously due to the IBD matching process, which allows match extension until a homozygous mismatch happens. In some embodiments, for the first case, the problem may be mitigated or eliminated by the step 340 where closely matched relatives with descendent status may be removed. In the second case, the part of the match that is wrong may not belong to either parent. The issue may be resolved by breaking up the matches at positions. These positions are selected by considering the evidence presented by other matched segments overlapping the target individual at the loci of question. After matches are broken into segments that are consistently on only one parental side, only segments with length over a certain threshold (e.g., 5 cM) are kept for further clustering into pairs of parental subclusters.

In some embodiments, rather than resolving the conflict by breaking a matched segment, the computing server 130 may ignore the conflicts because of potential genotyping or imputation errors. Whether to break a matched segment may depend on a cost parameter that is monitored by the computing server 130. At this stage since the input genomic data is unphased, the computing server 130 may carry out phasing and breaking up segments iteratively. Assuming phasing is from the leftmost site (or starting with any arbitrary site and extending to any arbitrary direction), the first site can generally be phased arbitrarily. Afterward, each site is phased in whichever way minimizes the cost of breaking up matched segments. A matched segment is broken if the matched segment is forced to switch from one of the parental subclusters to another parental subcluster, or vice-versa. In some embodiments, the cost of breaking up a matched segment depends on the distance from the breakpoint to the nearest end of the matched segment. Breaking a matched segment near either end costs less, according to a sigmoid-shaped cost function. The cost of breaking up segments may also depend on the status of the matched segments. If a matched segment is an extra-informative, breaking the matched segment generally will cost more than regular matched segments that are not extra-informative.

In choosing to add breakpoints, the computing server 130 may try to reduce or minimize the number of matched segments that are broken at places where the matched segment really shares a haplotype with the target individual. Given the choice between breaking many matched segments and breaking a few, the computing server 130 may choose to break a few based on the cost function monitored by the computing server 130. The computing server 130 may also consider the confidence that a matched segment shares a haplotype with the target individual, which is lower near the endpoints (beginning and end) of the segment because the matched segments are generally estimated in a way that allows them to be too long on either or both sides. As such, the computing server 130 may be more likely to address a conflicting informative site in the middle of a matched segment.

In some embodiments, after the candidate matched segments are broken, there are no more conflicts or the existing conflicts are ignored after balancing the cost. The process of detecting conflicts may classify matched segments into various subclusters and breaking the subclusters (through breaking the matched segments) until the subclusters are stable. At this stage, the genomic dataset of the target individual may be divided into genomic ranges, as illustrated in FIG. 3B and FIG. 4A. In some embodiments, the matched segments in the same subcluster share the same alleles at the sites within a genomic range that is between two breakpoints. Two matched segments in the opposite parental subclusters 412 and 414 have opposite alleles (as reflected in the heterozygous alleles in the target individual) within the segment between the two breakpoints.

In some embodiments, a threshold may be set for defining a genomic range that contains a subcluster (or a subcluster pair 410 at the first level). For example, a subcluster may include a set of matched segments such that each overlaps another by a significant number of informative sites. The minimum number of overlap informative sites may correspond to a predetermined threshold (e.g., 40). The threshold may also be in the range of 5, 10, 20, 40, 50, 100, 150, 200, 500, 1000, etc. To build or expand one or more subclusters 410, the computing server 130 may start with each matched segment in its own subcluster and go through other matches. If the matches overlap by more than a threshold number of informative sites, the computing server 130 may join both of their entire subclusters into one.

The computing server 130 may further repeat the breaking of candidate matched segments 420, identification of matches, and building and expanding of subclusters for other genetic loci in order to define genomic ranges for the target individual. Each chromosome may be divided into a plurality of genomic ranges. In the particular example shown in FIG. 4A, for illustration, each chromosome is divided into three genomic ranges, but a chromosome may be divided into many more intervals. In some embodiments, the division may correspond to known genetic loci. In the particular embodiment shown in FIG. 4A, the computing server 130 defines six pairs of genomic ranges that can be grouped.

After the genomic ranges of the target genomic dataset are determined at stage 310, a grouping of the genomic ranges at stage 312 may be performed using one or more clustering algorithms.

The computing server 130 may perform group assignments for different subclusters to determine inheritance. However, in some embodiments, which group belongs to a paternal inheritance or a maternal inheritance may be undetermined at this point. For example, the first group of parental subclusters may belong to the father's side but may also belong to the mother's side.

The computing server 130 may group (link) parental subclusters across multiple genomic ranges to generate at least one super-cluster. A super-cluster may correspond to a grouping that is determined to belong to an inheritance. At the first level, linking the subclusters 410 may refer to classifying the parental subclusters in each subcluster 410 to one of the parental sides. For example, referring to FIG. 4C, while the computing server 130 classifies matched segments into one of the parental subclusters in each subcluster 410, without linking, the computing server 130 may not know if the top parental subcluster 412 of the first subcluster pair 410A belongs with the first parental side or the second parental side. The top parent group 412 of the second subcluster pair 410A, even though currently placed on the north side of the parental side, may in fact belong to the south side of the parental side. There may be cases where the two lower parental subclusters may not belong to the same parental side. The reasons are that there are people who belong to the lower parental of the first subcluster 410A and also to the upper parental subcluster of the other subcluster (e.g., third subcluster 410C) and/or there are many matches between the individuals belonging to the lower parental subcluster of the first subcluster 410A and individuals belonging to the upper parental subcluster of the third subcluster 410C. In some embodiments, the computing server 130 groups two or more subclusters 410 into a super-cluster based on any individuals who have multiple matched segments with the target individual in multiple subclusters 410 or based on matched segments among the relatives that may or may not be shared with the target individual. At a higher level of inheritance separation, the grouping may classify a first set of subclusters to a first group that represents a first inheritance and classify a second set of subclusters to a second group that represents a second inheritance. Graphically, the grouping at the first level may be represented by the zig-zag line in FIG. 4C. The grouping at higher levels may be represented by the rainbow bridges illustrated in FIG. 3B.

Figure 5A:
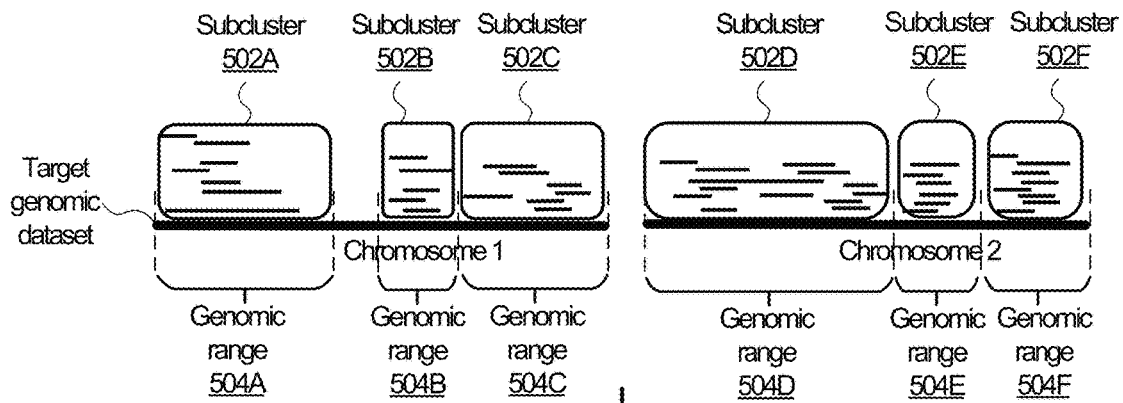
FIGS. 5A and 5B are conceptual diagrams illustrating the concept of similarity metric and clustering algorithms.
Figure 5A:
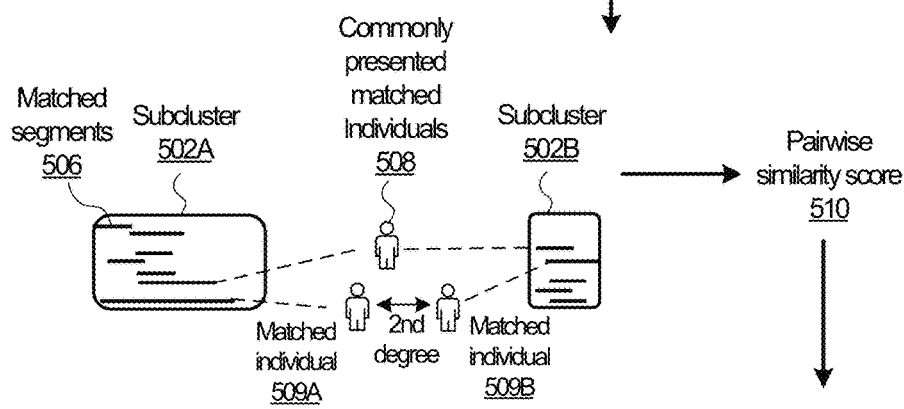
Figure 5A:
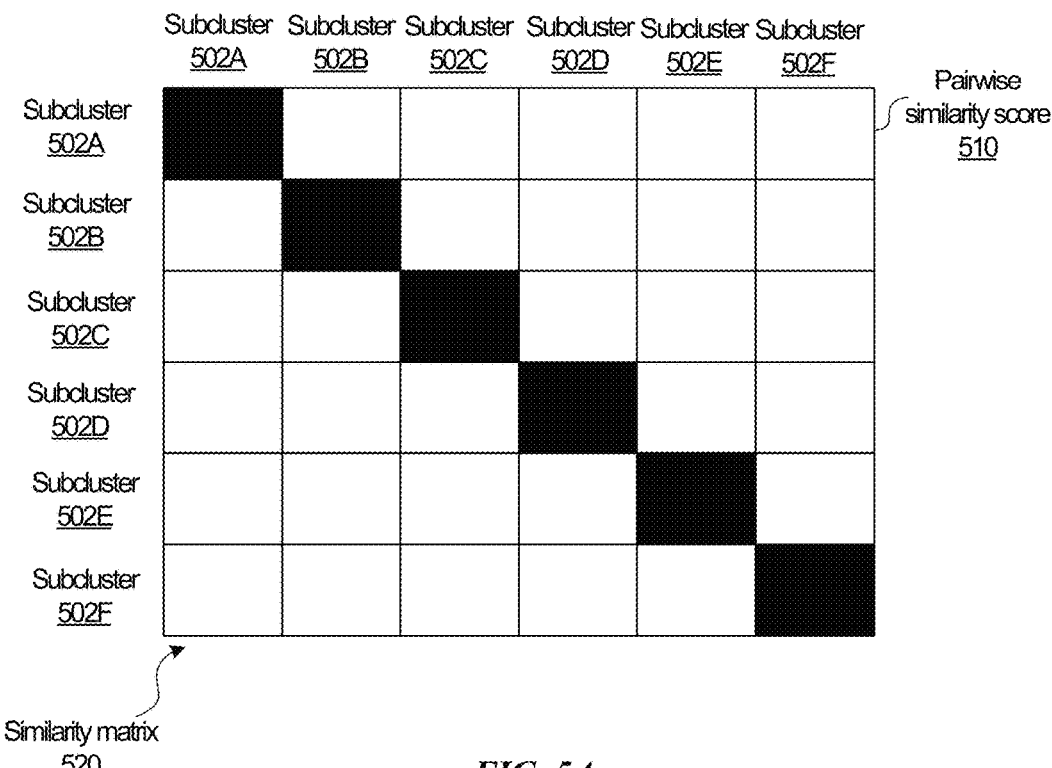
Figure 5B:
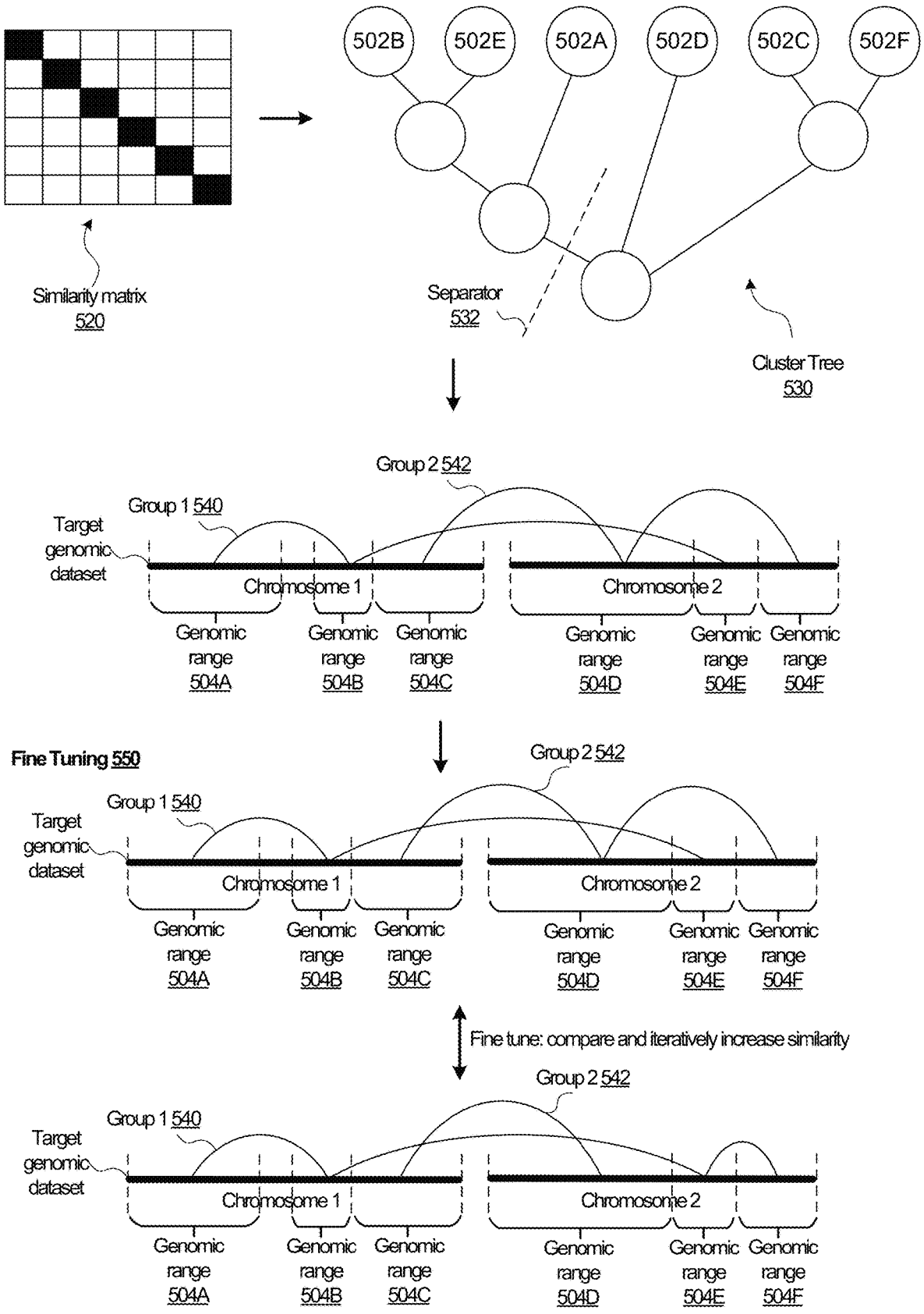
Figure 5C:
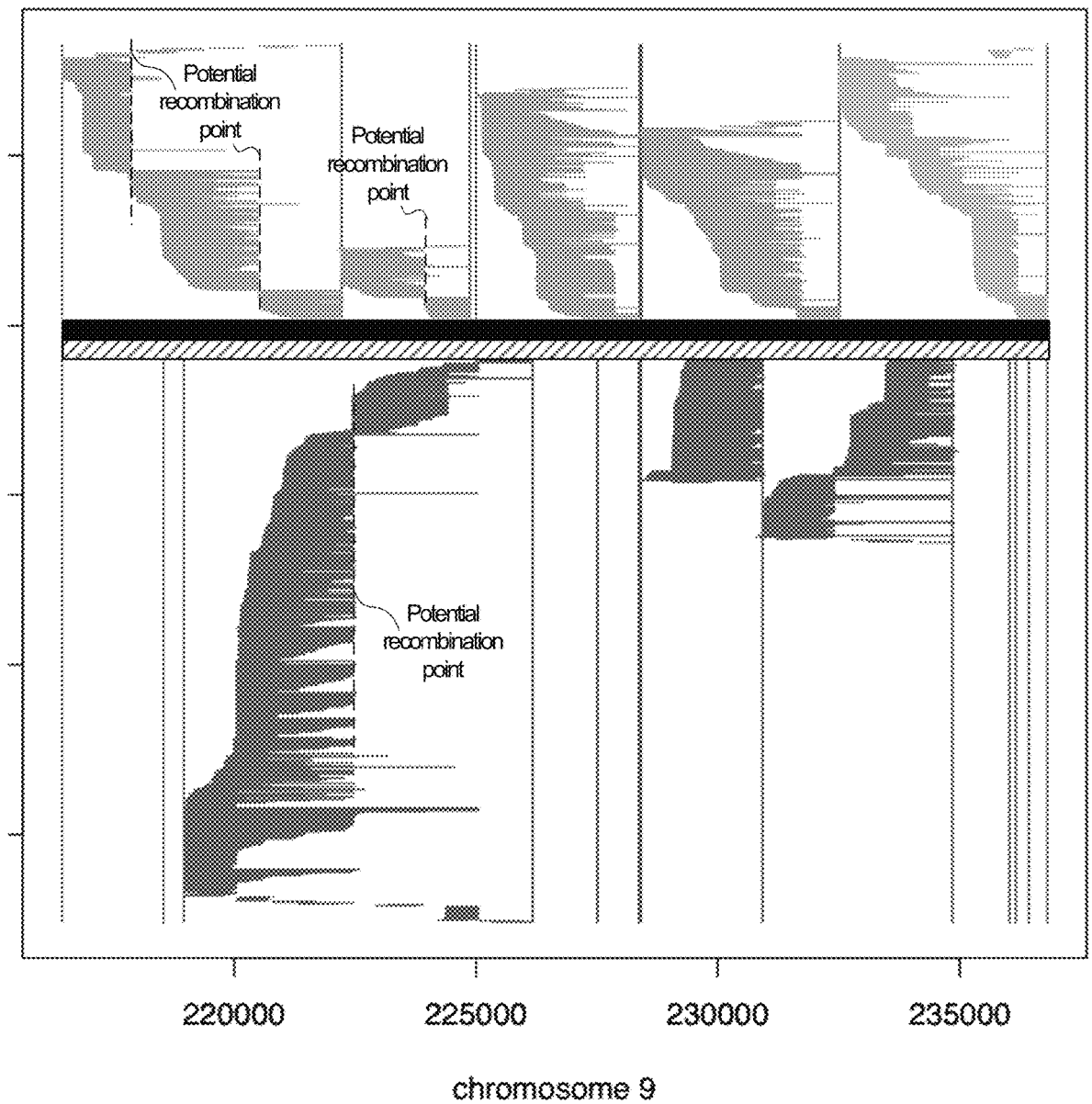
FIG. 5C is a graph illustrating an actual example of matched segment of a target individual for one of the individual's chromosomes.
Figure 6A:
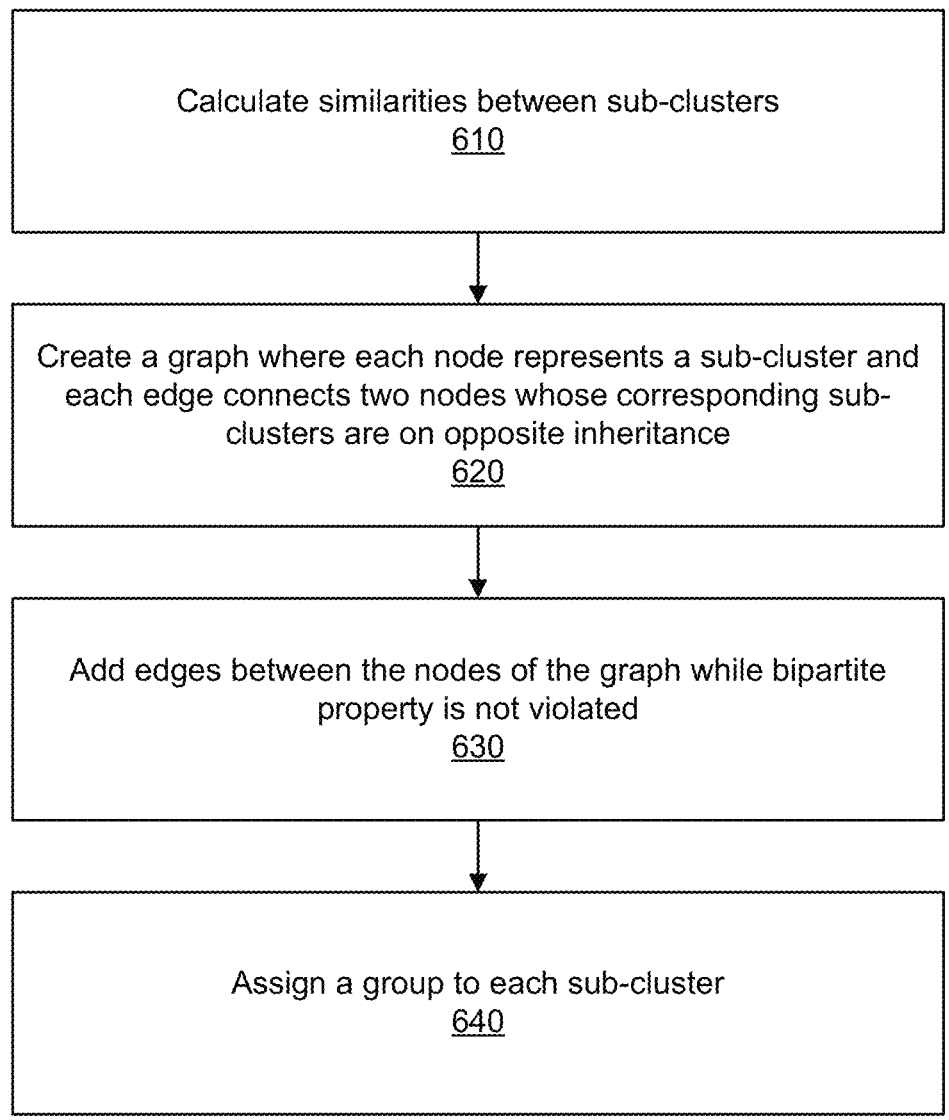
FIG. 6A is an example flowchart depicting a process for generating one or more super-clusters and their phasing result using a bipartite graph by applying forward formulation, in accordance with some embodiments.
Figure 6B:
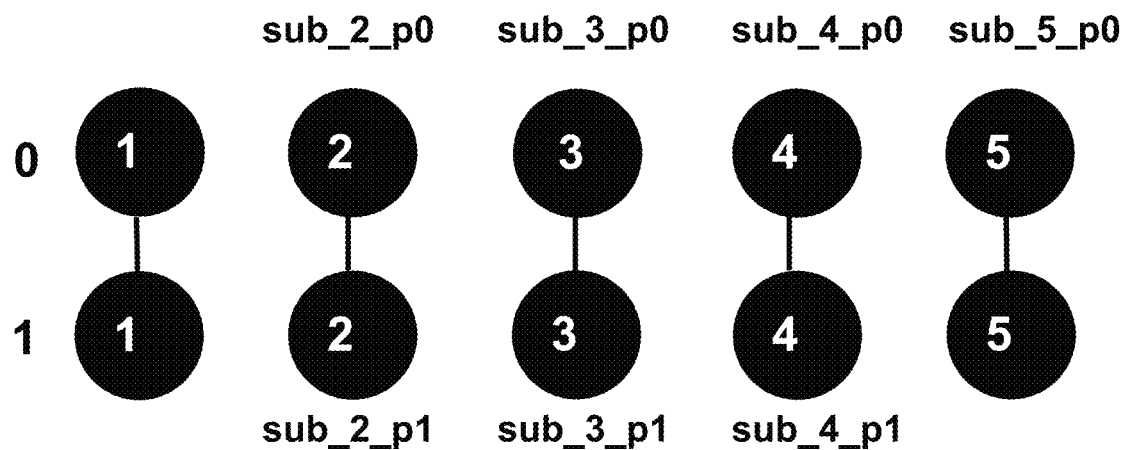
FIG. 6B is a conceptual diagram of an example initial bipartite graph as the parental side label.
Figure 6C:
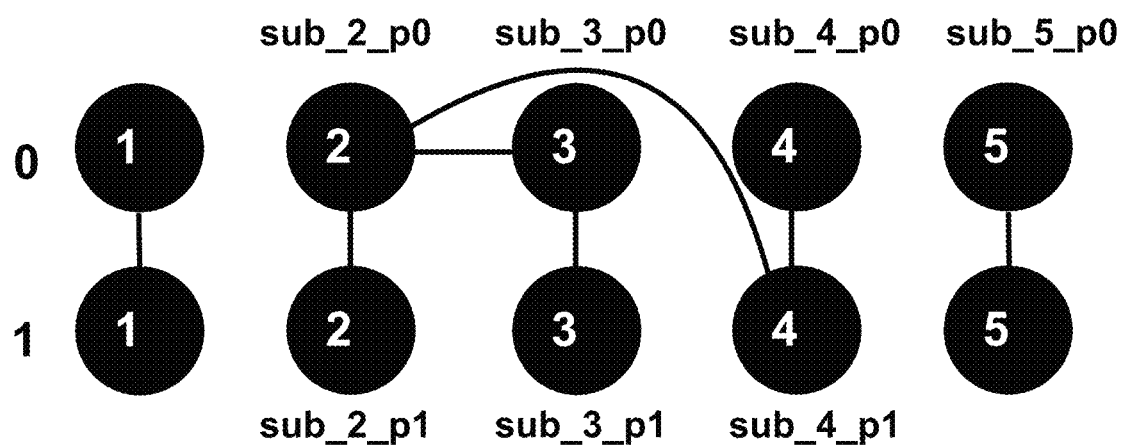
FIG. 6C shows an example of adding additional edges.
Figure 6D:
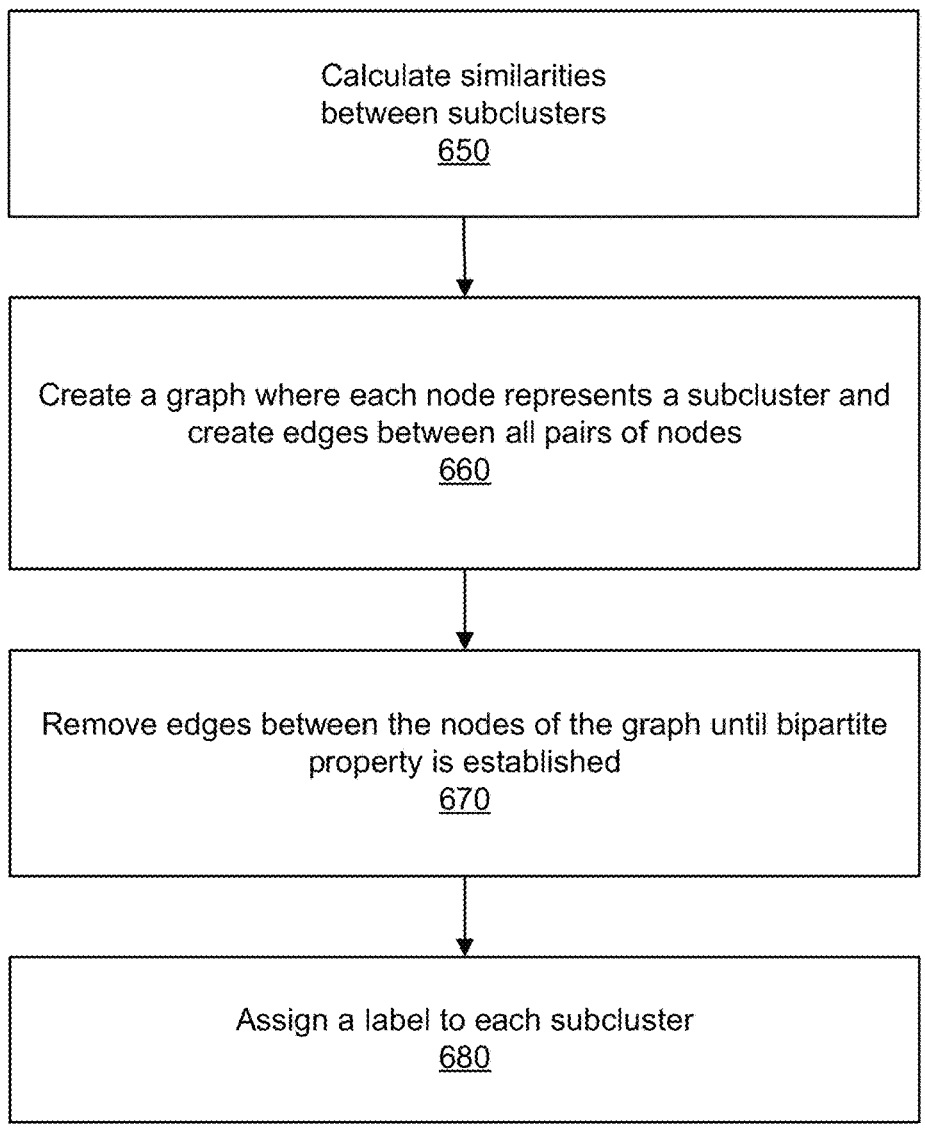
FIG. 6D is an example flowchart depicting a process for generating one or more super-clusters and their phasing result using a bipartite graph by applying backward formulation and FIG. 6E shows an example of removing an edge through iteration, in accordance with some embodiments.
Figure 6E:
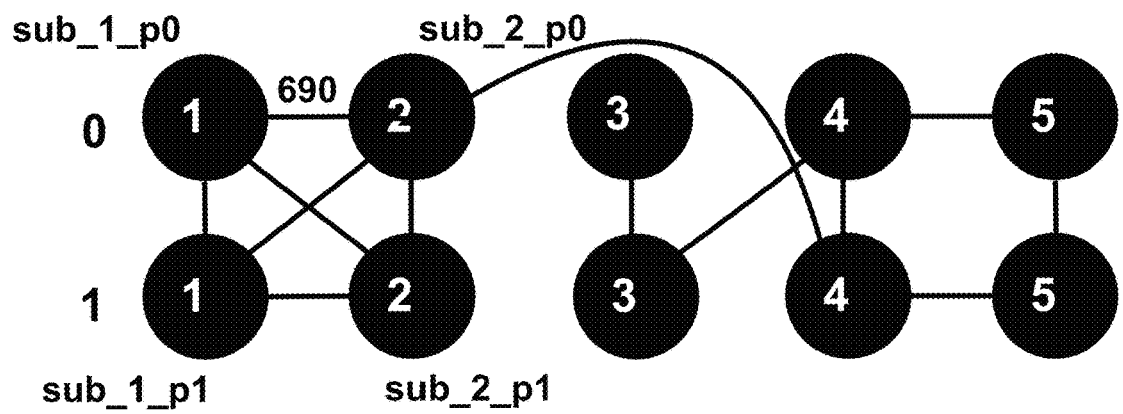

The grouping may be carried out by various clustering techniques such as a heuristic scoring approach, a bipartite graph approach, and a clustering tree approach, along with refinement (fine tuning) that will be further discussed in FIG. 5 through FIG. 6E. The linkage process may be based on similarities among the subclusters across various genomic ranges. The similarities are measured by a similarity metric, which in some embodiments, may be based on a number of commonly matched individuals classified in different subclusters across the plurality of genomic ranges. An example of a grouping result is shown in FIG. 4C as a thick line 450. The linked parental subclusters by the linking result 450 may also be referred to as a super-cluster group or simply super-cluster 450 for the first level of separation. Matched individuals whose genomic datasets are classified to one of the parental sides are likely individuals that are related to the target individual on the parental side (e.g., a maternal relative or a paternal relative).

In some cases, after grouping subclusters, there are individuals whose matched segments 420 might belong to two inheritances. There are a number of reasons why these individuals have matched segments 420 belonging to both inheritances: (1) the individuals might be descendants of the target individuals' parents such as nieces or nephews of the target individual; (2) the parents of the target individual might share IBD. The second reason can lead to individuals matching with the target individual as well as both of the target individual's parents. The method identifies individuals whose matched segments 420 belong to both sides of the family by finding individuals who have segments in both inheritance groups. These individuals' matched segments 420 may be removed from their subclusters 410 and the process of grouping subclusters may be repeated after the removal. In some embodiments, the step 340 illustrated in FIG. 3B may mitigate or eliminate the issue of individuals whose matched segments belong to two inheritances.

Using Siblings Data to Find Breakpoints

In some embodiments, for second level or above inheritance separation, a genomic range of a target individual may also be broken into two ranges based on one or more breakpoints that are evident in biological events such as recombination. In some embodiments, some of the recombination events of the target individual may be able to be modeled. For example, in some situations, genomic data of one or more siblings (e.g., including half-siblings) of the target individual may be available. Based on comparing the genomic data of the target individual and the genomic data of the one or more siblings, the computing server may apply a hidden Markov model (HMM) to model recombination points of the target genomic dataset. Biologically, the recombination points are points in the genome where there is a recombination event between a pair of chromosomes of a parent. The recombination points are inherited by the target individual and are reflected in the target genomic dataset. The recombination points may be modeled as the points where a majority of siblings change states.

If a target individual has one or more siblings (including half-siblings that share with this parent), a hidden Markov model may be used to segment each chromosome by recombination points. A recombination point is a point where there is a recombination between a parent's two haplotypes and such recombined haplotypes are inherited by the children. In some embodiments, the computing may identify a recombination point as a genomic site where a majority of siblings change from a first state to another state. The two states are:

A first genomic range that the siblings and the target individual shared inherited haplotype.

A second genomic range that no longer shares the target individual's inherited haplotype Measuring Similarity In some embodiments, the determined genomic ranges of the target genomic dataset of the target individual may be grouped using one or more clustering algorithms based on one or more objective goals that define how the genomic ranges should be grouped. In some embodiments, the objective goals are related to similarity among the genomic ranges.

FIGS. 5A and 5B are conceptual diagrams illustrating the concept of similarity metric and clustering algorithms. The second level of separation of inheritance is used to illustrate the similarity metric and clustering algorithms, but the concept may be applied to any level of separation. For the second level, the genomic dataset may be a haplotype. While only two chromosomes are shown, in various embodiments, the target genomic dataset may include more than 10 chromosomes. The target genomic dataset is broken into a plurality of genomic ranges 504A, 504B, 504C, 504D, 504E, and 504F (or generally, without specifying a particular genomic range, 504). Each genomic range has a corresponding subcluster 502 of matched segments that match one or more sub-range in the genomic range. Hence, subclusters 502A, 502B, 502C, 502D, 502E, and 502F (or generally, without specifying a particular subcluster, 502) are also present. The number of genomic ranges and subclusters is for illustration only. In an actual example, the computing server 130 analyzes a significantly more number of genomic ranges.

For two given genomic ranges, each genomic range may correspond to a subcluster that contains a number of matched individuals. In some embodiments, using subclusters 502A and 502B as an example pair, the pairwise similarity of the two genomic ranges 504A and 504B is measured with respect to (1) the matched individuals 508 that are commonly presented in both of the corresponding subclusters 502A and 502B and (2) the matched segments 506 of those commonly presented matched individuals 508. Since the matched individuals may be IBD related to the target individual, the more evidence supporting that two genomic ranges 502A and 502B share a larger number of commonly matched individuals 508, the more likely that the genomic ranges are descent from the same inheritance. Hence, two genomic ranges with a high degree of similarity may be grouped together and be attributed to the same inheritance. In some embodiments, the similarity between genomic ranges is measured by a similarity metric that compares the similarity of the matched individuals that are in the subclusters corresponding to the genomic ranges.

In some embodiments, the similarity metric may take various suitable forms. In some embodiments, a value of the similarity metric of two given genomic ranges 504 is determined based on lengths of matched segments 506 corresponding to a matched individual 508 whose segments are classified as matched segments in both of the two given genomic ranges 504. The value of the similarity metric may be referred to as a similarity score 510. For example, say two given genomic ranges are tentatively assigned to the same group, the computing server 130 may examine whether there is a matched individual who has a first IBD-matched segment matched to the first genomic range and a second IBD-matched segment matched to the second genomic range. If so, the matched individual is a commonly presented matched individual 508, and the value of the similarity metric between these two genomic ranges increases. In some embodiments, the value may be increased based on the number of commonly presented matched individuals 508 in the two genomic ranges. Alternatively, or additionally, the value may be based on the lengths of the two IBD matched segments 506 of each given commonly presented matched individual 508. In some embodiments, the similarity score may further increase if the commonly presented matched individual 508 is marked as extra-informative close relative, for example, by weighing the score contribution from the matched segments of the extra-informative close relative more heavily than other regular commonly presented matched individuals.

In some embodiments, the computing server 130 may relax the criteria of what qualifies as a commonly presented match individual in two subclusters. In some embodiments, the commonly presented matched individual 508 is defined as the same individual 508 who has two matched segments each respectively in one of the subclusters. In some embodiments, to reduce the number of the orphaned segment (e.g., illustrated as orphaned segment 326 that is not able to be linked to any group), the commonly presented matched "individual" is in fact a pair of matched individuals 509A and 509B who are close family relatives to each other. This second-degree relationship may be used to relax the criteria. In a relaxed selection of commonly presented matched "individual," a first relative 509A, and a second relative 509B, who are siblings, are respectively present in one of the subclusters but neither of them is commonly present in both subcluster. In other words, a matched segmented 506 of the first relative 509A is matched to the first genomic range (e.g., 504A) of the target individual so that the first relative 509A is present in the corresponding first subcluster 502A. A matched segmented 506 of the second relative 509B is matched to the second genomic range (e.g., 504B) of the target individual so that the second relative 509B is present in the corresponding second subcluster 502B. In such a case, in calculating the similarity matrix, the computing server 130 may consider that a commonly presented matched "individual" exists. In such a case, the similarity score 510 between subclusters 502A and 502B increases because matched individuals 509A and 509B are close relatives, even though they are not the same individual. However, the weight of this type of second-degree relationship towards the value of the similarity metric may be reduced compared to a true commonly presented matched individual 508. In some embodiments, if it is determined that both matched individuals 509A and 509B are also close relatives of the target individual, the second-degree relationship may be less discounted and is weighed more to the overall score.

By way of a specific example, in some embodiments, the similarity score 510 is a sum of the average (harmonic mean of centimorgans) for each pair of segments 506 that connect two subclusters. In some embodiments, these connections are downweighed significantly if the connections are based on a distant second-degree relationship between the two matches.

Different embodiments may use various ways to calculate the similarity between subclusters 502. In some embodiments, the similarity between two subclusters 502 may be based on a number of matched segments 506 whose corresponding relatives are shared between the two subclusters 502. In other words, it is based on the number of matched segments 506 in the two subclusters 502 whose corresponding matched individuals are the same. In some embodiments, the similarity between two subclusters 502 may be further based on the number of second-degree relationships. In other words, it is based on the number of matched segments 506 in the two subclusters 502 whose corresponding matched individuals are relatives of each other. In some embodiments, the similarity between two subclusters 502 may further be based on a combination of the number of matched segments in the two subclusters whose corresponding relatives are the same, and the number of matched segments in the two subclusters whose corresponding relatives are matches of each other.

In some embodiments, for second level or above inheritance separation, a similarity score 510 may further be adjusted based on additional data and recombination events that may be able to be modeled. FIG. 5C is a graph illustrating an actual example of matched segment 506 of a target individual for one of the individual's chromosomes. The target genomic dataset shown in FIG. 5C is a genotype dataset. The graph shows that by arranging the matched segments, potential recombination points for both parents may be observed, as shown by the vertical dashed lines in FIG. 5C.

In some embodiments, recombination events may be modeled. One or more recombination points may be identified. By identifying a recombination point as a breakpoint for the genomic datasets, two genomic ranges may be delimited, one left to the recombination point (vertical dashed line) and one right to the recombination point. Two genomic ranges, one at each side of the recombination point, may be determined to be separate because these two genomic ranges are likely separately inherited from different lines of inheritance. A negative similarity weight may be applied to the similarity score 510 of these two genomic ranges because of the determined likely biological recombination event. If the recombination breakpoint is determined based on data of multiple siblings, the evidence of the recombination points may be stronger and the magnitude of the negative similarity weight may be increased.

The precise weights of various factors that affect a similarity score 510, such as factors like having true commonly presented matched individuals, a commonly presented matched individual being extra-informative, the second-degree relationships, and the recombination events, may be parameterized and may be adjusted based on experimental results and/or based on training data if one or more machine learning models are trained to model the weights.

Referring back to FIG. 5A, in some embodiment, using the values of similarity metrics between many different pairs of subclusters 502 that each corresponds to a pair of genomic ranges 504, a similarity data object such as a similarity matrix 520 can be constructed. The similarity matrix 520 may record the similarity scores 510 between any pairs of subclusters 502. For the separation of two inheritances (e.g., phasing parent 1 and parent 2 at the first level, phasing grandparent 1 and grandparent 2 at the second level), for any subclusters A and B, a first similarity score 510 may be monitored relative to the subcluster A and subcluster B that are classified to the same group. A second similarity score 510 may also be monitored relative to the subcluster A and subcluster B that are classified into two different groups. For other pairs of subclusters, equivalent similarity scores 510 may be stored and a similarity matrix 520 can be constructed.

While in this disclosure similarity matrix 520 is used as an example, in some embodiments, dissimilarity matrix may also be used. The similarity matrix 520 in various embodiments may be defined positively to measure a degree of similarity or negatively to measure a degree of dissimilarity.

Example Tree Clustering Approach

In various embodiments, one or more different types of iterative clustering algorithms may be applied at different levels of inheritance separation. For example, in the second level of inheritance separation where two grandparents' inheritances are separated from a haplotype, a tree clustering approach may be used. In some embodiments, the tree clustering approach may be used at every level of inheritance separation. In some embodiments, the tree clustering approach may be used for the second level and beyond while a different clustering algorithm is used for the first level, the phasing from genotype to two haplotypes.

Continuing the illustration to FIG. 5B, in some embodiments, a similarity matrix 520 that is discussed above is constructed based on pairwise similar scores 510 between different pairs of subclusters 502. A hierarchical clustering algorithm such as the unweighted pair group method with arithmetic mean (UPGMA) may be used to construct a cluster tree 530 using each subcluster 502 as a node in the tree. The subclusters 502 that have higher similarity score 510 are grouped closer in the tree 530. Pairs or sets of subclusters with the highest similarity scores 510 are placed in the deepest root in the tree based on the construct of the hierarchical clustering algorithm. In some embodiments, the tree 530 constructed is a binary and rooted tree. After the tree 530 is constructed, the computing server 130 may determine the best location for a group separator 532 to be placed to separate the tree leaves (nodes) into two (or more) groups 540 and 542, each group corresponding to an inheritance. For example, the interior nodes that are rooted deeper than the group separator 532 are assigned to one group and the rest of the nodes in the tree are assigned to another group. The grouping of the subclusters 502 may be translated to the grouping of genomic ranges 504. Hence, group 1 540 and group 2 542 of genomic ranges may be assigned.

In some embodiments, the selection of the location of the group separator 532 may be selected iteratively based on one or more objective goals. In some embodiments, one of the objective goals may be to maximize the total similarity score among the nodes in a group. For example, a candidate group separator may be tentatively placed and the total similarity score of a group based on the placement of the candidate group separator may be calculated. The total similarity score may be a simple sum, a weighted sum, or another form of statistical aggregation. In some embodiments, for example, the similarity scores may be multiplied by the probability density of expected inheritance, such as the amount of DNA that would be assigned as inherited (e.g., inherited by one grandparent at the second level of separation). The probability density may be modeled as a Gaussian parameter empirically. For example, at a second level where two grandparent's DNA is separated from a haplotype, the Gaussian parameter is expected to have a mean of 0.25 (a person on average inherits 25% of the DNA from a grandparent). If a group separator is placed such as that one group is assigned to 0.38 of the genomic ranges and another group is assigned to 0.12 of the genomic ranges (the starting total is 0.5 for the second level as only one haplotype is used as the input), the total similarity score is adjusted according by the probability density of this relative imbalance assignment. In some embodiments, another candidate group separator is considered, and the total similarity score is calculated and may also be adjusted based on the probability density of inheritance. The process may be repeated until the best candidate group separator is found.

Example Fine-Tuning of Group Assignment

In some embodiments, a clustering approach may be a two-stage approach. After one or more clustering algorithms are applied, a fine-tuning process 550 may be executed to further adjust the group assignment of the genomic ranges. For example, in some embodiments, the result of the tree clustering approach may be served as an initial assignment of two groupings 540 and 542 of genomic ranges 504. A fine-tuning process 550 in a refinement stage may be executed to further adjust the group assignment based on the initial assignment.

In some embodiments, in the refinement stage (fine tuning), the computing server 130 may examine a candidate assignment. The computing server 130 may determine an objective function based on the similarity metric. The computing server 130 may swap, iteratively, one or more genomic ranges from a first group to a second group or vice versa to improve the value of the objective function. For example, as illustrated at the bottom of FIG. 5B, the genomic range 504F is switched from group 2 to group 1. In some embodiments, the objective function may be based on a distribution of naturally occurring recombination events.

By way of example, the objective function may measure the connection similarity score among both group assignments of genomic ranges. For example, at the second level of inheritance separation, the objective function may be the sum of the scores of each pair of segments assigned to the same grandparent. In some embodiments, the objective function may be based on multiple factors in addition to the sum of the similarity scores. In some embodiments, additionally or alternatively, the objective function is factored by the probability density of the total amount of genomic ranges assigned to each inheritance, modeled as a Gaussian distribution with a mean that is at the expected mean. For example, for the second level of separation, the expected mean of each inheritance is modeled at 0.25. In some embodiments, additionally or alternatively, the objective function is factored by the probability density of the number of recombination events of each inheritance, modeled as a Gaussian distribution with a mean that is at the expected mean. For example, for the second level of separation, the expected mean of the number of recombination is at around 35 based on an empirical study of recombination in a population. The standard deviations of the Gaussian distributions may be determined empirically and may be selected based on empirical results.

In some embodiments, an example of the objective score S for an assignment A is $$S(A, M) = \qquad (1)$$
$$N(C(A), 0.25, 0.12) \times N(R(A), 34.9, 24) \times \sum_{i,j} \delta(Ai, Aj) \times M(Ai, Aj)$$

where
N(x, μ, σ) is the PDF at point x of a normal distribution with mean μ and standard deviation σ,
C(A) is the proportion of DNA assigned to an inheritance given the assignment A,
$\delta(a_1, a_2)$ is +1 if $a_1$ and $a_2$ are the same (assigned to the same inheritance) and −1 otherwise, and
$M(a_1, a_2)$ is the similarity score (the strength of the connection between two subclusters) of the two genomic regions $a_1$ and $a_2$.

In some embodiments, the computing server 130 may create several threads for iterations. Each thread may start with the initial assignment generated by the clustering algorithm in the first stage. Each thread may perform a random-walk style search for an improved solution. The random walk may include flipping one genomic range from one group to the other. At each step, a change with a probability proportional to the improvement in score may be chosen, taking over the space of changes to the score of all possible changes (e.g., the worst move as probability zero).

After some number of iterations or when the fine-tune algorithm's result converges, the probabilistic-random-walk may be stopped or may continue to choose only the strictly best improvement for a few more steps until there is no change to assignment that increases the objective score. Multiple threads of iterations (e.g., 64) may be used, each starts with a different random walk. The assignment in one of the threads with the highest objective score may be chosen as the final assignment.

Example Heuristic Scoring Approach

In some embodiments, the computing server 130 assigns subclusters into two groups using a heuristic scoring clustering algorithm. For example, in some embodiments, the heuristic scoring approach may be used in phasing of genotype at the first level of inheritance separation. In some embodiments, the scoring approach may be used at a higher level of separation. The computing server 130 may calculate the similarity among subclusters assigned to a group. Each matched segment in a subcluster corresponds to a different matched individual of the target individual. In some embodiments, the similarity between two subclusters may be based on the similarity score discussed above. The computing server 130 may assign subclusters to a group based on the similarities between subclusters. The computing server 130 may choose the best group assignment. The similarity score of a group may be defined based on the sum of similarity scores between subclusters within each group.

To find a group assignment, the computing server 130 may randomly initiate group assignments. The computing server 130 switches the assignment if switching increases the similarity score of the group. In some embodiments, for the first level of inheritance separation, since a genomic range is assigned to either one of the haplotypes, all possible switching of groups may be iterated through. The assignment corresponding to the highest similarity score of the group is chosen as the group assignment (e.g., the phasing). Finding candidate assignments may be repeated for a predetermined number of times N (e.g. 1000 times) to have a group of candidate assignments. This iterative clustering algorithm may be repeated multiple times: starting with a random assignment, and switching the assignment until the best configuration is achieved. The best resulting configuration among the multiple random restarts is selected as the final group assignment.

Example Bipartite Graph Approach

In some embodiments, the clustering approach used to group the genomic ranges may include a bipartite graph approach. For example, the bipartite graph approach may be used at the first level of separation in lieu of the tree clustering approach. Consider each subcluster as a node in a graph and the computing server 130 may connect all pairs of nodes that are assigned to the same group (belong to the same inheritance). In some embodiments, the computing server 130 represents a graph with only two possible group assignments as a bipartite graph. The computing server 130 constructs a graph with subclusters as nodes such that the graph is bipartite.

FIG. 6A is an example flowchart depicting a process 600 for generating one or more super-clusters and their phasing result using a bipartite graph by applying forward formulation, in accordance with some embodiments. The process 600 may include calculating calculates the similarities between all pairs of subcluster combinations based on the similarity scores discussed above (step 610). The process 600 may include creating an initial graph where each node represents a subcluster and each edge connects two nodes whose corresponding subclusters are on the opposite group (step 620). Each node has a label (e.g., color, 1/0, any suitable binary labels) which represents an alternative group. FIG. 6B is a conceptual diagram of an example initial bipartite graph using colors (black and grey) as the parental side label. The initial graph comprises nodes for subclusters. For two subclusters sub_i_p0 and sub_i_p1, sub_i_p0 and sub_i_p1 are on the opposite groups. The initial graph comprises edges between nodes corresponding to such subclusters (e.g. sub_i_p0 and sub_i_p1).

The process 600 may include adding edges between nodes of the initial graph based on the similarity between subclusters in a group until the bipartite property is violated (step 630). The computing server 130 iterates through a list of pairs of nodes from the highest to lowest similarity for their corresponding subclusters. The computing server 130 adds edges between pairs of nodes while the bipartite property is not violated in the graph. FIG. 6C shows an example of adding additional edges. The computing server 130 may start with the pairs of nodes with high similarity (the highest similarity). For example, if there is a high similarity between sub_2_p0 and sub_4_p0, then sub_2_p0 and sub_4_p1 are on the opposite side of the family and an edge will be added between sub_2_p0 and sub_4_p1. The computing server 130 may go down the list of the pairs of nodes from the highest to lowest similarity and continue to assign edges. If there is a high similarity between sub_2_p0 and sub_3_p1, then sub_2_p0 and sub_3_p0 are on the opposite side of the family and an edge will be added between sub_2_p0 and sub_3_p0. If the graph becomes non-bipartite (e.g., having an odd cycle), the computing server 130 may disconnect the most recently connected pairs.

Once all possible edges are added, the computing server 130 has completed a bipartite graph. The process 600 may include assigning a group label (e.g., color) to each subcluster (step 640). Each label corresponds to an inheritance.

In some embodiments, the computing server 130 generates two or more super-clusters (two groups) using a bipartite graph applying backward formulation. FIG. 6D is an example flowchart depicting a process for generating one or more super-clusters and their phasing result using a bipartite graph by applying backward formulation, in accordance with some embodiments. The process may include calculating the similarities between all pairs of subcluster combinations (step 650). Different embodiments may use various ways to calculate the similarity between subclusters. Step 650 may use various embodiments described in step 610 to calculate the similarity between subclusters.

The process may include creating an initial graph where each node represents a subcluster (step 660). Edges are created between all pairs of nodes in the initial graph to represent the potential subclusters that are on the opposite parental sides.

The process may include removing edges between nodes of the initial graph based on the similarity between subclusters corresponding to the nodes (step 670). The computing server 130 may iterate through a list of pairs of nodes from highest to lowest similarity for their corresponding subclusters. The computing server 130 may remove edges between the pair of nodes until bipartite property is established in the graph. FIG. 6E shows an example of removing an edge through iteration. At an instance during iteration through the list of pairs of nodes from highest to lowest similarity, the computing server 130 reaches the pair of nodes sub_1_p0 and sub_2_p0, as the one with the highest similarity. The computing server 130 then removes the edge 690 between sub_1_p0 and sub_2_p0 because it violates bipartite property. In other words, because sub_1_p0 and sub_2_p0 are highly similar, their corresponding subclusters should be on the same side rather than the different side of the family, hence the edge 690 is removed.

Once all possible edges that cause a violation of bipartite property in the graph are removed, the computing server 130 has completed a bipartite graph, in which each group is assigned a group label (e.g., color) in step 680. Each label corresponds to an inheritance.

In some embodiments, the computing server 130 may generate two or more groups (super-clusters) using a combination of heuristic scoring and a bipartite graph. The computing server 130 runs the heuristic scoring method described above and calculates the similarity score of the resulting super-clusters. The computing server 130 also runs bipartite graph methods (forward formulation and/or backward formulation) and calculates the similarity score of the resulting super-clusters. The computing server 130 compares the calculated similarity scores and outputs the results corresponding to the best similarity score.

Example Haplotype Phasing and Genotype Imputation

Figure 7A:
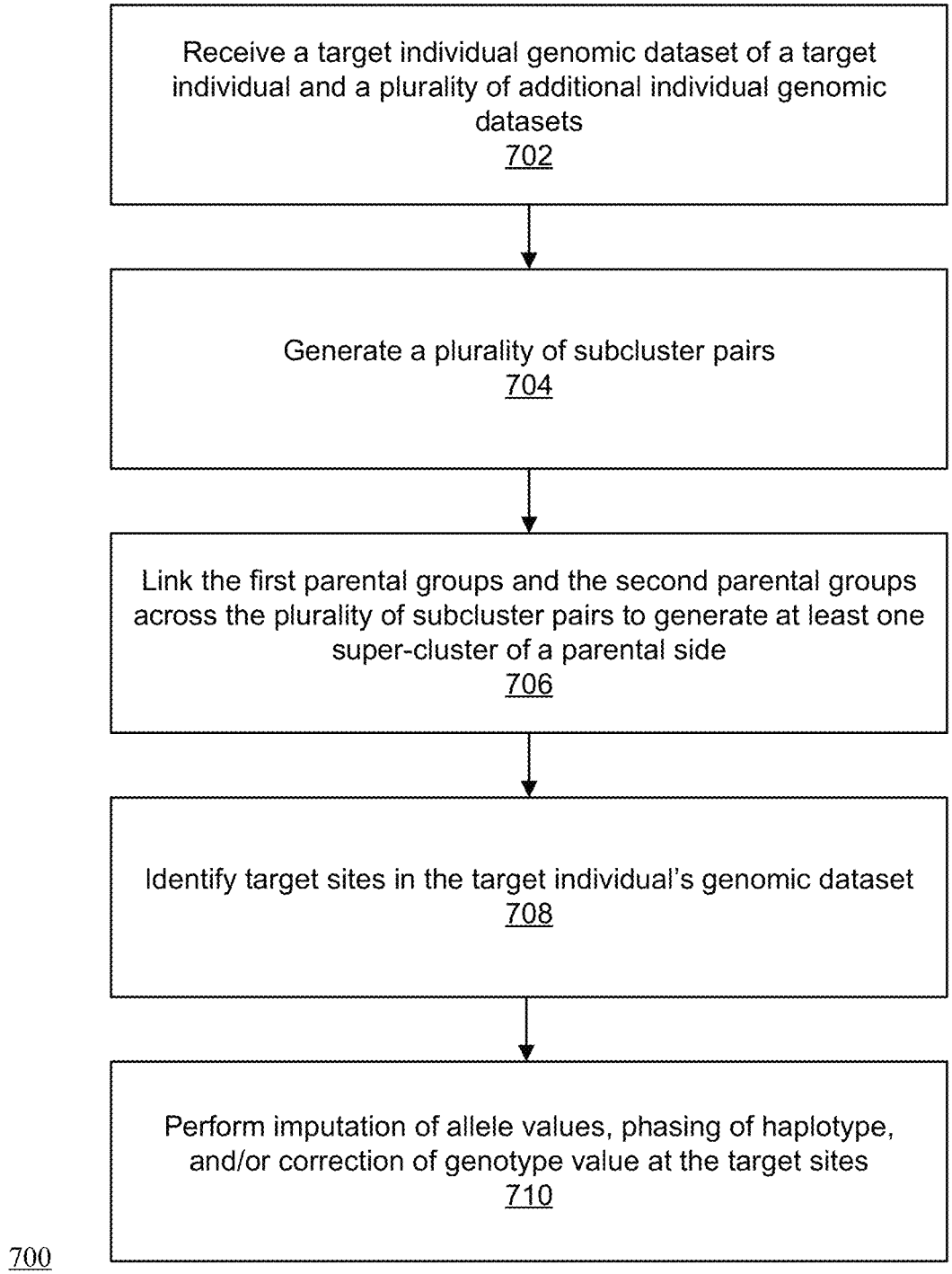
FIG. 7A is a flowchart depicting an example of haplotype phasing and genotype imputation process, in accordance with some embodiments.
Figure 7B:
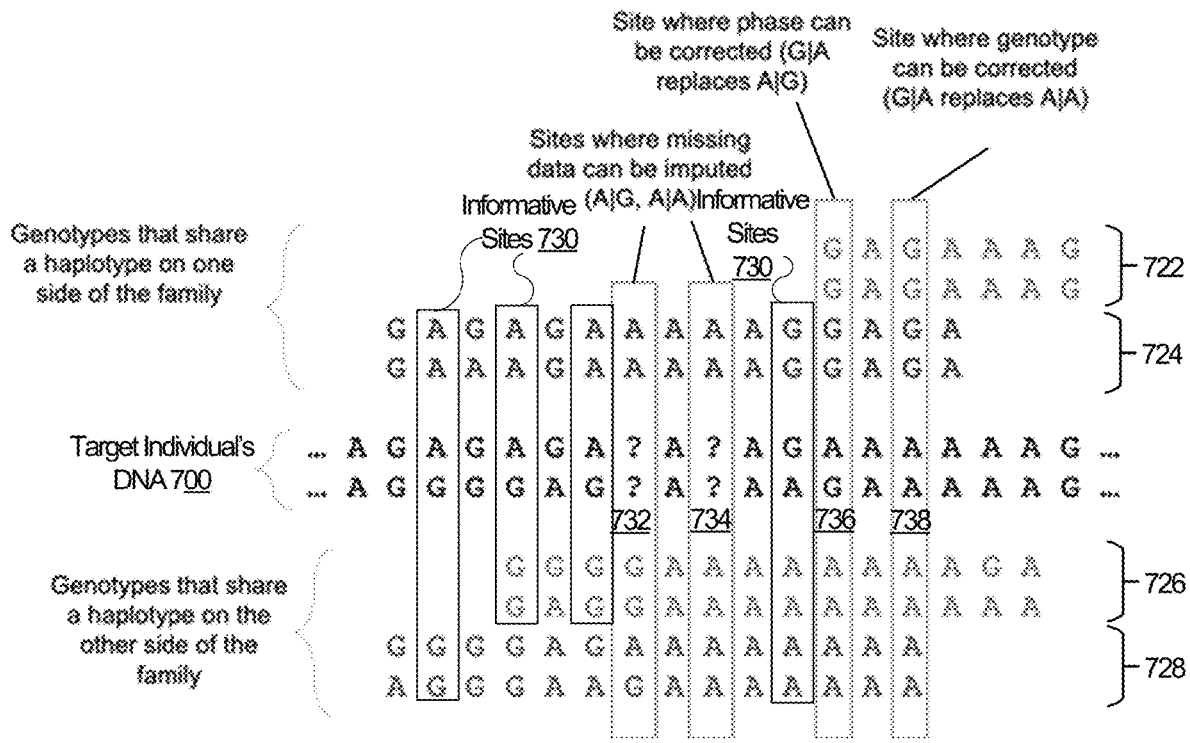
FIG. 7B is a conceptual diagram illustrating a process of haplotype phasing (e.g., the first level of inheritance separation) and imputation of missing values for the target individual, in accordance with some embodiments.

The process 300 that separates a target genomic dataset into two or more inheritances and may be used for haplotype phasing and imputation of allele values for a target individual. FIG. 7A is a flowchart depicting an example of haplotype phasing and genotype imputation process 700, in accordance with some embodiments. FIG. 7B is a conceptual diagram illustrating a process of haplotype phasing (e.g., the first level of inheritance separation) and imputation of missing values for the target individual, in accordance with some embodiments. FIG. 7A is discussed in conjunction with FIG. 7B.

The computing server 130 may perform one or more steps described in the process 300, such as receiving 702 a target individual genomic dataset of a target individual and a plurality of matched individual genomic datasets, delimiting genomic ranges, and generating 704 subclusters. In some embodiments, the computing server 130 may link a plurality of subclusters across different genomic ranges to generate one or more superclusters if the computing server 130 tries to determine a long-range haplotype.

For example, in generating a subcluster pair, the computing server 130 may assign matched segments to two subclusters in the pair. In FIG. 7B, the computing server 130 may identify heterozygous sites in the target individual's DNA 700. The computing server 130 identifies matched individuals' matched segments 722, 724, 726, and 728. Based on the heterozygous alleles of the target individual's DNA 700, the computing server 130 classifies the matched segments to one of the two sides of the family (e.g., one of the two parental groups). The computing server 130 may identify one or more informative sites 730 in which the target individual's DNA at those sites are heterozygous while the matched segments 722, 724, 726, or 728 at those sites are homozygous. In some cases, the computing server 130 may also identify homozygous sites of the target individual that match the matched individuals.

The computing server 130 may identify 708 target sites in the target individual's genomic dataset. By way of a non-limiting example, the computing server 130 may select target sites based on the distance between a candidate site and another site that the computing server 130 deems as a high-confidence site. High-confidence sites may be informative sites 730 or homozygous sites in which both the target individual and the matched individuals have the same allele. Target sites are in the same proximity as the high-confidence sites, such as sites that are within a threshold distance from at least one information site 730 or sites that belong to the same subcluster or the same genetic loci. The computing server 130 may perform 710 imputation of allele values, phasing of haplotype, and/or correction of genotype value at the target sites. For example, at the target individual's sites 732 and 734, the sequencing result does not provide a genotype value at those sites. Based on the matched segments 722, 724, 726, and/or 728 that are assigned to two different sides of the family, the computing server 130 imputes that the haplotype values at the first missing site 732 as A|G by identifying homozygous matched segments at those sites. Likewise, the computing server 130 imputes the haplotype values at the second missing site 734 as A|A. The computing server 130 may also phase or correct phasing errors performed by inheritance separation engine 220 using the matched segments in the subcluster. For example, at the heterozygous site 736, the values A|G can be either unphased or phased with an error. The computing server 130 reviews the homozygous allele values of matched segments 722, 724, 726, and/or 728 at the site 736. The computing server 130 determines that the correct phasing should be G|A instead of A|G. The computing server 130 may also use the matched segments to correct a genotyping error. For example, at the site 738, the genotyping result produced by sequencing is A|A. However, the matched segments 722 and 724 suggest that the alleles should be G|A.

In determining whether a genomic dataset has a matched segment that matches the target individual genomic dataset, the computing server 130 may use a predetermined number of consecutive sites as a threshold to determine which parental group the match belongs to. In some embodiments, the predetermined number may be set as a fixed number such as 40 allele sites. In another embodiment, the computing server 130 may determine the threshold amount based on validation data. For example, the computing server 130 may examine different threshold amounts to generate different subclusters and super-clusters to determine an appropriate level of threshold that leads to the best accuracy in identifying individuals on different parental sides. It should be noted that the phasing can be long-range and cross-chromosome.

In any cases when genotyping or haplotype phasing errors are detected, the computing server 130 may choose to override the genotype in the original data, choose to override the genotype in the phased data (often the diploid data have missing calls and the phased data do not), or choose to override the genotype in both the original and phased data. The computing server 130 may determine the extent of overriding data based on one or more factors. For example, the factors may include the number of matched segments that support the identification of error, the number of matched segments on either side of the family, the number of matched segments being homozygous at the site where an error is found, and which alleles the matched segments are homozygous. The factors may also include whether the computing server 130 is changing a genotype assignment or not and what the original genotype is. The factors may further include the confidence in the IBD segments (e.g., how certain the computing server 130 is that the segment shares a haplotype with the target individual). The confidence in the IBD segments may be based on genotype data and supporting information, including but not limited to the proximity of the SNP in question to either end of the segment, the length of the segment, and the estimated amount of DNA shared with the same individual as the IBD segment in other places on the genome.

The use of match clustering and subcluster techniques for haplotype phasing using process 300 can improve the phasing method used by the inheritance separation engine 220 by at least 35%. The match-clustering based haplotype phasing can also improve the performance of genetic communities and ethnicities used in community assignment engine 230 and ethnicity estimation engine 245.

Example Grandparent Level Phasing

Figure 8:
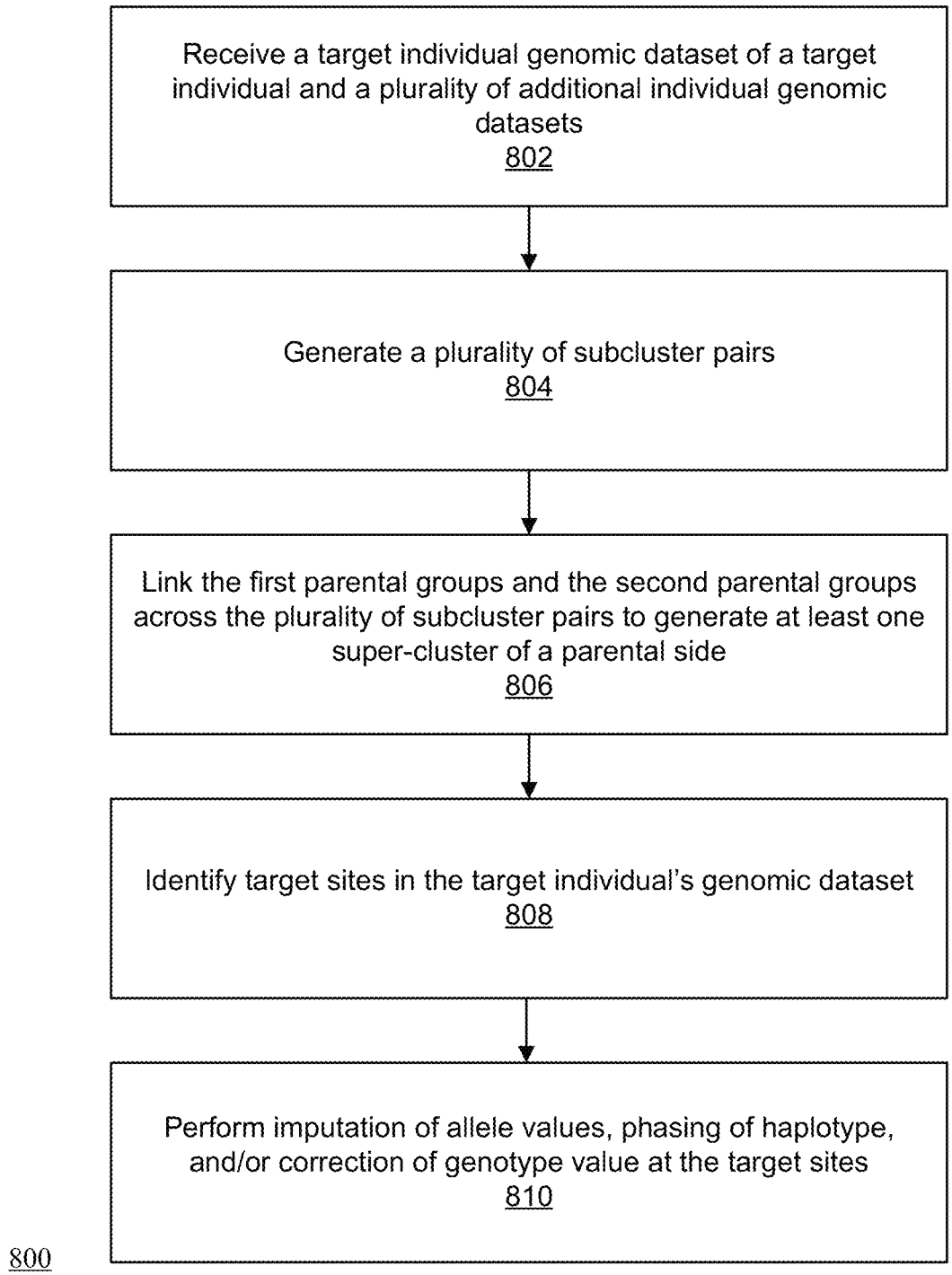
FIG. 8 is a flowchart depicting an example second-level inheritance separation process for separating grandparent DNA from a haplotype, in accordance with some embodiments.

FIG. 8 is a flowchart depicting an example second-level inheritance separation process 800 for separating grandparent DNA from a haplotype, in accordance with some embodiments. After phasing of genotype dataset using the process 700, a pair of haplotypes are generated. The process 800 may be applied to each haplotype to further separate the haplotype into two groups of genomic ranges and each group may be attributed to the inheritance from a grandparent. Since each target individual has two haplotypes, the process 800 may be repeated for each parent's haplotype.

In some embodiments, the second level of separation as illustrated in process 800 is a considerably more difficult process than the first level of separation as illustrated in process 800. In some embodiments, it is because there are more genomic ranges to assign with more combinations to consider. In addition, in some embodiments, the input genomic dataset now represents haploids not diploids and therefore the assignment is not automatically balanced. For example, in diploid genotype separation at the first level, the data is in pairs and is divided equally into two parents. At the second level, biologically while the average inheritance of a grandparent may be modeled as a Gaussian distribution with a mean of 25%, each target individual may receive a different amount of DNA from each grandparent. The separation at the second level may also be affected by recombination events occurring at the parents.

The process 800 may include receiving a target genomic dataset that is in the form of a haplotype that is phased from the genotype of the target individual (step 810). The phasing of the haplotypes may be performed using the process 700. However, in some embodiments, other phasing algorithms may also be used to generate the haplotypes. In some embodiments, the input haplotype is considered as inherited from one of the parents and potential phasing error is ignored.

The process 800 may include identifying a plurality of IBD-matched segments that match to the target genomic dataset for at least a threshold length (step 820). The matched segments may be retrieved from the database of matched individuals 302. In some embodiments, closely matched relatives may be separately analyzed. For example, at the first level of separation a closely matched relative may have been identified as the descendant of both parents. If after the first level of separation, it is determined that the closely matched relative has all or the vast majority of matched segments being on one parental group, the closely matched relative may be marked as being a closely matched relative relevant to separating the haplotype in the second level. In other words, the closely matched relative is marked as belonging to a parental side that corresponds to the haplotype being analyzed. A network of closely matched individuals, such as the relative network 308, may be created for relatives that are determined to belong to a parental side. At the second level of separation, if any relatives in the network do not match all other relatives (e.g., R1 and R2 in relative network 308 or R3 and R5 in relative network 308), the computing server 130 may mark those relatives as "grandparental," which indicates that each of those relatives is inherited from a single grandparent and can be especially useful in connecting grouping genomic ranges in step 840. The use of the matched segments of those relatives in determining similarity between two genomic ranges is weighed heavier than other matched segments that are not determined as "grandparental."

The matching of segments from matched individuals to the target genomic dataset may use informative sites and the related techniques as discussed in FIG. 4A through FIG. 4C. Hence, even though the input target genomic dataset is a haplotype in the process 800, the other haplotype may also be used in determining matching. For a genomic segment, one or more matched segments may overlap the region.

The process 800 may include delimiting, based on the overlapping of the IBD-matched segments, a plurality of genomic ranges from the target genomic dataset (step 830). The computing server 130 may divide the target genomic dataset (the haplotype) into different genomic ranges, using techniques that are discussed in step 345 and FIG. 4A through FIG. 4C. In some embodiments, comparing to the first level of inheritance separation, generally there are fewer segment overlaps in one inheritance. Segments that are not distant or segments that are not determined to be not shared with both grandparents may be ignored.

In some embodiments, the computing server 130 may also include "empty" genomic ranges of significant length because for grandparents, a plausible amount (e.g., close to 50% of the haplotype) of inheritance to each grandparent should be assigned.

In some embodiments, if sibling data of the target individual is available, sibling data may be used to model recombination events and locate breakpoints of the genomic ranges, as discussed above related to identifying breakpoints using sibling data.

The process 800 may include applying a clustering algorithm to group the plurality of genomic ranges based on values of a similarity metric among genomic ranges that are assigned to a given group (step 840). The clustering algorithm may be applied iteratively. The clustering algorithm may be based on the similarity metric. A similarity matrix that includes pairwise similarity scores may be constructed. A tree clustering algorithm may be applied. A fine tune process may also be used. Detail of the grouping of the plurality of genomic ranges is discussed in FIG. 5 and related discussion. In some situations, not all genomic ranges are assigned to a group. Some genomic ranges may have insufficient evidence to be connected to any other genomic ranges, and thus are not assigned to any group.

In some embodiments, the computing server 130 may impose heightened criteria in assigning genomic ranges to a grandparental group. For example, the computing server 130 may select heavily overlapped genomic ranges that share a majority of the segments. Each group may have at least two clusters, which are not the deepest leaf node in a clustered tree. The computing server may also impose a minimum cluster score as a threshold for a group to be formed. It should be noted that the grouping can be long-range and cross-chromosome.

The process 800 may include attributing a first set of genomic ranges of the first group to a first grandparent and attributing a second set of genomic ranges of a second group to a second grandparent (step 850). The computing server 130 may assign metadata to matched individuals' genomic datasets to associate the dataset with a grandparental side of the target individual. For example, the computing server 130 may assign metadata to one or more matched individual datasets. The metadata may specify that the one or more matched individual datasets are connected to the target individual dataset by an inheritance. The computing server 130 may also save the genomic dataset with genomic ranges. Each genomic range is associated with identifiers that identify the parent, the grandparent, and other inheritance. The coordinates of the genomic ranges may also be saved.

In some embodiments, the computing server 130 may also identify a phenotype of the target individual. The computing server 130 may determine whether the phenotype is attributable to alleles in the first set of genomic ranges that belong to a group. The computing server 130 may report that the phenotype of the target individual is passed down from one of the grandparents. For example, the computing server 130 may determine that an allele linked to a physical trait (e.g., blue eye) belongs to a set of genomic ranges that are currently assigned to a particular grandparent. The computing server 130 may report in a graphical user interface that the physical trait may be passed down from the particular grandparent.

The first and second here do not imply any order. Also, in some embodiments, the algorithm may not determine which of the first grandparent and the second grandparent is a paternal grandparent or maternal grandparent without further review of data such as family tree data.

Downstream Processing

At any level of separation, after a group is identified, the computing server 130 may identify whether a group (e.g., a parental side, a grandparental side, or another side of the family) is a paternal side or a maternal side. One or more approaches may be used to enable such identification. In some embodiments, the computing server 130 access genealogical data of the target individual to identify at least one individual in the genealogical data who belong to the group. Based on the genealogical data, the identified individual belongs to either the paternal side or maternal side of the target individual. In another embodiment, the computing server 130 may transmit, to the target individual (e.g., a user of the computing system) or another user, an inquiry about a relationship between the target individual and one of the identified matched individuals belonging to a group. For example, the computing server 130 may ask a user whether one or more close relatives belong to a maternal side or a paternal side. In yet another embodiment, the computing server 130 may examine the genetic locus of sex chromosomes or mitochondrial DNA in a group to determine a parental side. For example, if a parental side includes some segment of the Y-chromosome, the computing server 130 may designate the parental side as the paternal side. Likewise, if a parental side of a group includes some segment of mitochondrial DNA, the computing server 130 may designate the parental side as the maternal side. In another embodiment, the computing server 130 may determine the ethnicity of one or more identified matched individuals belonging to the super-parent. The server may also ask the target individual or another user if the user knows her parents' or grandparents' genetic communities. This information may also be used to identify the maternal side or parental side because a group may be clustered or otherwise classified into one of the genetic communities using community assignment engine 230 or ethnicity estimation engine 245.

In some embodiments, in determining a parental side, the computing server 130 may rely on genealogical data such as pedigree and family tree information. The computing server 130 may collect the number of matched segments that can be assigned to the maternal/paternal side by the genealogical data to determine which side of the family a subcluster belongs to. A machine learning model may be trained to a subcluster level classifier to assign the top/bottom subcluster to the maternal/paternal side with a probability given the number of maternal/paternal segments found in the top/bottom subcluster. The prediction result is the assignment of the maternal/paternal side of the family for a top/bottom subcluster, which can be determined to use or not based on its classification probability. Similarly, a machine learning model (e.g., logistic regression) may be trained as a super-cluster-level classifier to assign a super-cluster (a group) to the maternal/paternal side of the family.

In some embodiments, the computing server 130 may also identify a phenotype of the target individual. The computing server 130 may determine whether the phenotype is attributable to alleles in the first set of genomic ranges. The computing server 130 may report that the phenotype of the target individual is passed down from the first inheritance. For example, the computing server 130 may determine that an allele linked to a physical trait (e.g., blue eye) belongs to a set of genomic ranges that are currently assigned to a particular grandparent. The computing server 130 may report in a graphical user interface that the physical trait may be passed down from the particular grandparent.

Example Machine Learning Models

In various embodiments, a wide variety of machine learning techniques may be used. Examples include different forms of supervised learning, unsupervised learning, and semi-supervised learning such as clustering algorithms decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, various clustering tasks for grouping of genomic ranges and other processes described herein may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to separate genomic ranges into two groups, the training samples may include known genomic range features and corresponding subclusters' features. The labels for each training sample may be binary or multi-class. In training a machine learning model for separating genomic ranges, the training labels may include a first label for the first group and a second label for the second group.

By way of example, the training set may include known individuals' genomic ranges and corresponding matched segments. Each training sample in the training set may correspond to a past and the corresponding outcome may serve as the label for the sample. A training sample may be represented as a feature vector that include multiple dimensions. Each dimension may include features in a genomic range, features in a subclusters and features in matched segments.

In some embodiments, an unsupervised learning technique may be used. The training samples used for an unsupervised model may also be represented by features vectors, but may not be labeled. Various unsupervised learning techniques such as clustering may be used in determining similarities among the feature vectors, thereby categorizing the training samples into different clusters. Similarities among genomic ranges are discussed extensively above.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that separates genomic ranges, the objective function of the machine learning algorithm may be a similarity function that monitor the overall similarity among genomic ranges in a group, as discussed above.

A machine learning model may include certain layers, nodes, weights and/or coefficients. Training of a machine learning model may include forward propagation and backpropagation. Each layer in a model may include one or more nodes, which may be fully or partially connected to other nodes in adjacent layers. Clustering algorithms may take a different structure such as representing each genomic range as a node. In forward propagation, the machine learning algorithm performs the computation in the forward direction. Training of a machine learning model may include an iterative process that includes iterations of making determinations, monitoring the performance of the machine learning model using the objective function, and backpropagation to adjust the weights (e.g., weights, kernel values, coefficients). The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, the parameters in a machine learning model may be associated with different coefficients (e.g., weights and coefficients) that are adjustable during training. After an input is provided into the machine learning model in the forward direction, the results may be compared to the training labels or other values in the training set to determine the machine learning model performance. The process of prediction may be repeated for other samples in the training sets to compute the value of the objective function in a particular training round. In turn, the machine learning model performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples.

In various embodiments, the training samples described above may be refined and continue to re-train the model, which the model's ability to perform the inference tasks. In some embodiments, this training and re-training processes may repeat, which results in a computer system that continues to improve its functionality through the use-retraining cycle.

Experimental Results

The data and numbers below are examples only. The computing server has a "close match database", a binary file about 24 GB in "ibdb" format, which stores all matches 65 cM and above.

Summary of Performance

A lot more matches are assigned.
  Close match labels are much better (e.g., not getting parents, children, siblings, uncles, and close cousins labeled wrong)
  Having close matches always helps; it's the biggest factor determining performance
  it increases performance in grandparent labels a lot.
  Siblings aren't make-or-break for grandparent labels (that was a surprise)

Methods (in a Nutshell)

The approach for testing is to find trios (child=proband, father and mother also tested) and run IBDphase2 with the parents' matches omitted (i.e., as if there parents were not tested), then compare phase to trio-phase and match assignments to which parents share the match. For grandparents, we use double-decker trios (where at least one parent also has both of their parents tested).

We generally measure phase accuracy, match segment assignment, and for close matches (M1-M3) whole-match assignment.

IBDphased Phase Error

Based on 18,000 Randomly-Selected Probands (Who are Children in all-Consented-to-Research Trios)

Figure 9A:
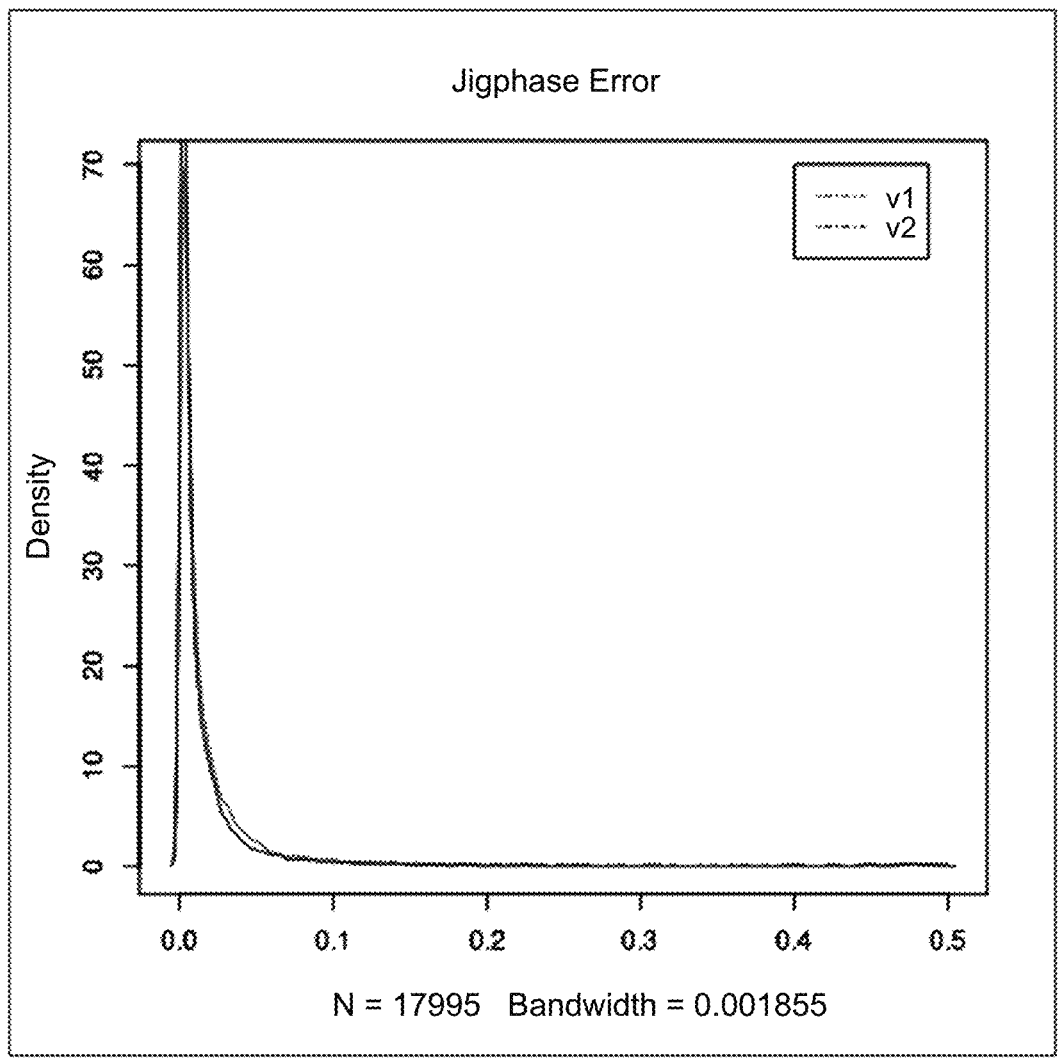
FIG. 9A and FIG. 9B illustrate IBD phasing errors, in accordance with some embodiments.
Figure 9B:
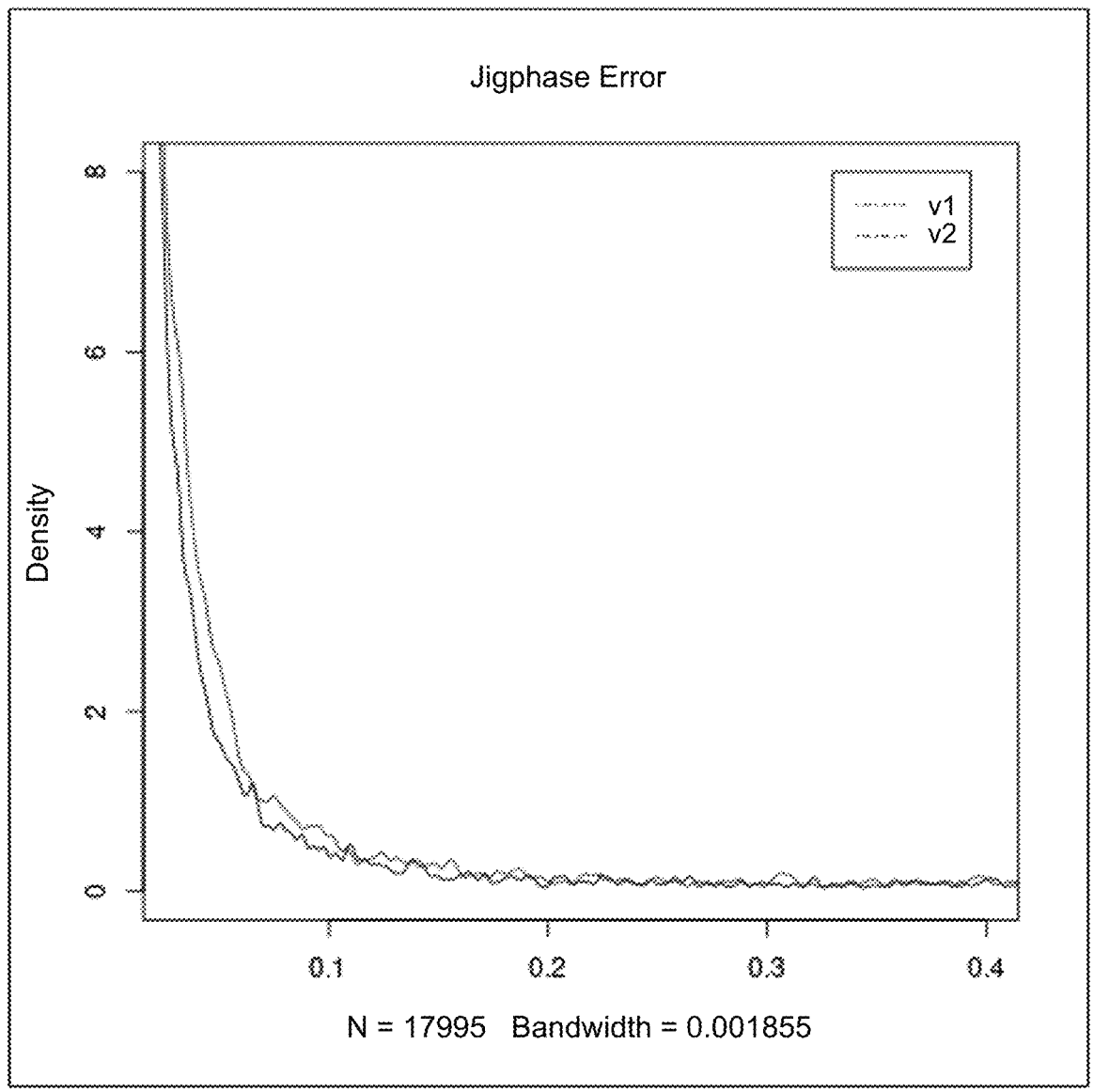

IBDphase error is measured as the proportion of het sites with the alleles assigned to the wrong parent (compared to trio phase Mendelian logic). Additional charts are illustrated in FIG. 9A and FIG. 9B.

| IBDphase Error Rate | version 1 median | version 1 mean | version 2 median | version 2 mean |
|---|---|---|---|---|
| IBDphase error | 0.0082 | 0.030 | 0.0059 | 0.025 |

Overall Correct Parent-Level Assignment to Segments

Experiments use no parent matches (those are used for evaluation only).

All other close matches are left in.

| Parent Segment Assignment | version 1 median | version 1 mean | version 2 median | version 2 mean |
|---|---|---|---|---|
| correct parent segment assignment (~precision) | 99.87% | 98.9% | 99.6% | 98.2% |
| proportion of segments assigned (~recall) | 99.77% | 93.9% | 100% | 98.7% |

Overall Grandparent-Level Segment Assignment

Experiments use no parent or grandparent matches (those are used for evaluation only).

Based on ~9,000 "double-decker trios" (about 340 of them have two parents and all four of the grandparents)
  All other close matches are left in.
  Version 2 only.

| Grandparent Segment Assignment | version 2 median | version 2 mean |
|---|---|---|
| correct segment assignment (~precision) | 94.1% | 90.4% |
| proportion of segments assigned (~recall) | 96.2% | 91.3% |

Close Family Label Accuracy

Below is a table for close matches with the correct label

| Relationship Type | Version 1 Correct assignment/ Proportion Assigned | Version 2 Correct assignment/ Proportion Assigned |
|---|---|---|
| Parent/Child | 97.8%/99.7% | 100%/99.97% |
| Full Sibling | 98.9%/99.6% | 100%/99.5% |
| Close Match ("M3") | 99.3%/99.5% | 99.9%/99.9% |
| First Cousin (or other "M4") | 99.5%/99.2% | 99.8%/99.8% |
| "M5" | 97.8%/96.0% | 99.4%/99.9% |

Including Ambiguous Cases:

Same table as above, without removing ambiguous cases (we still have some rule about which side the match should be on, based on what we think the customer would expect).

| Relationship Type | Version 1 Correct assignment/ Proportion Assigned | Version 2 Correct assignment/ Proportion Assigned | Re-run* (see below) |
|---|---|---|---|
| Parent/Child | 97.3%/99.7% | 99.9%/~100% | 98.37% 99.80% |
| Full Sibling | 98.7%/99.6% | 99.8%/99.5% | 98.84% 99.68% |
| Close Match ("M3") | 99.1%/99.4% | 99.7%/99.4% | 99.04% 99.72% |
| First Cousin (or other "M4") | 99.1%/98.8% | 99.1%/99.7% | 99.01% 98.83% |
| "M5" | 96.9%/94.7% | 98.2%/99.9% | |

* the last column is a little bit "tacked on" after the fact, but this is a confirming report where the IBDphase is based on a larger set of matches, and represents the change in average correct match assignment label only among matches that fall into the relationship category (M1 through M4).

Match Segment Assignment Rate

Figure 10A:
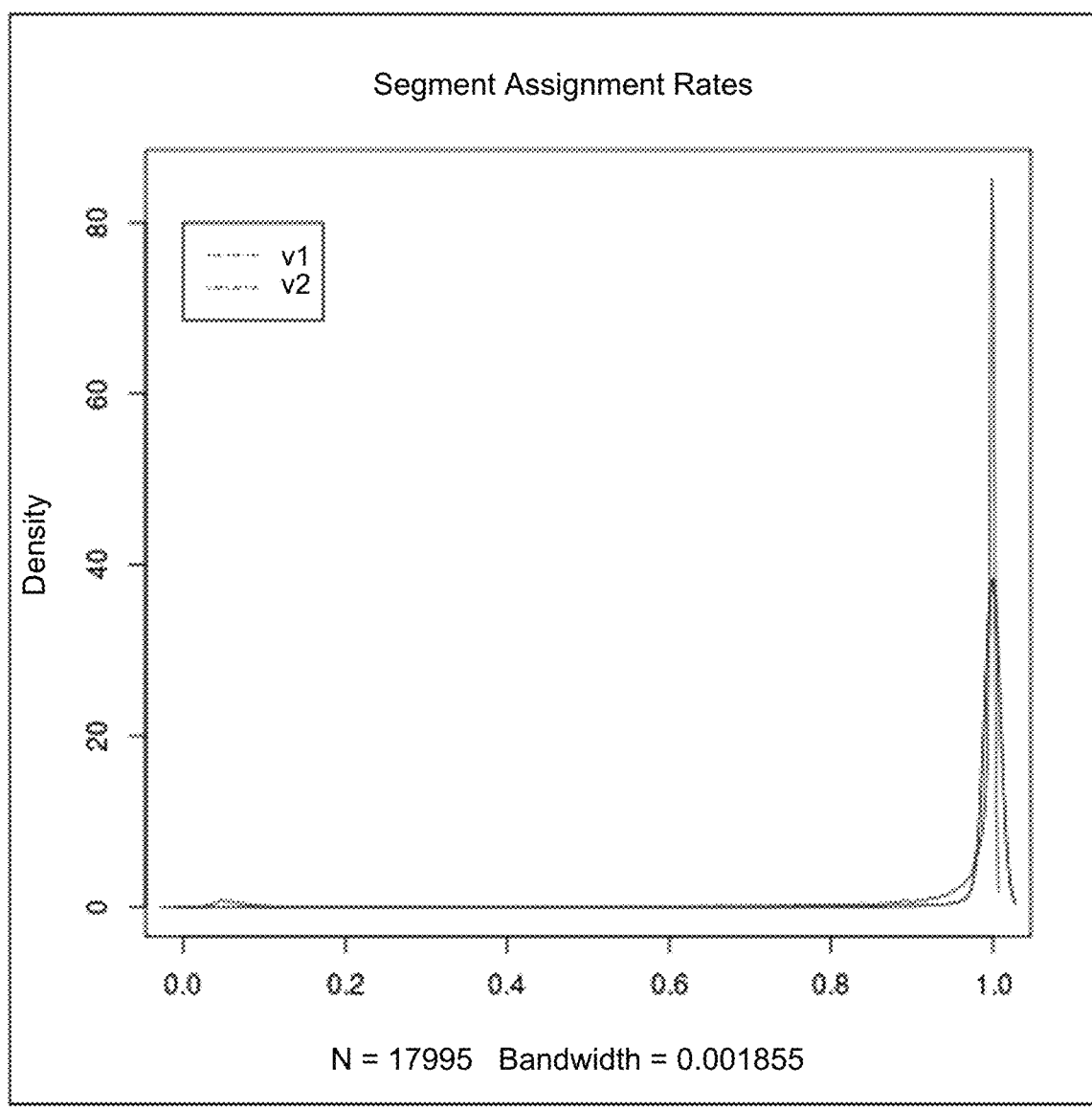
FIGS. 10A and 10B illustrates the results of distribution of segment assignment rate, in accordance with some embodiments.
Figure 10B:
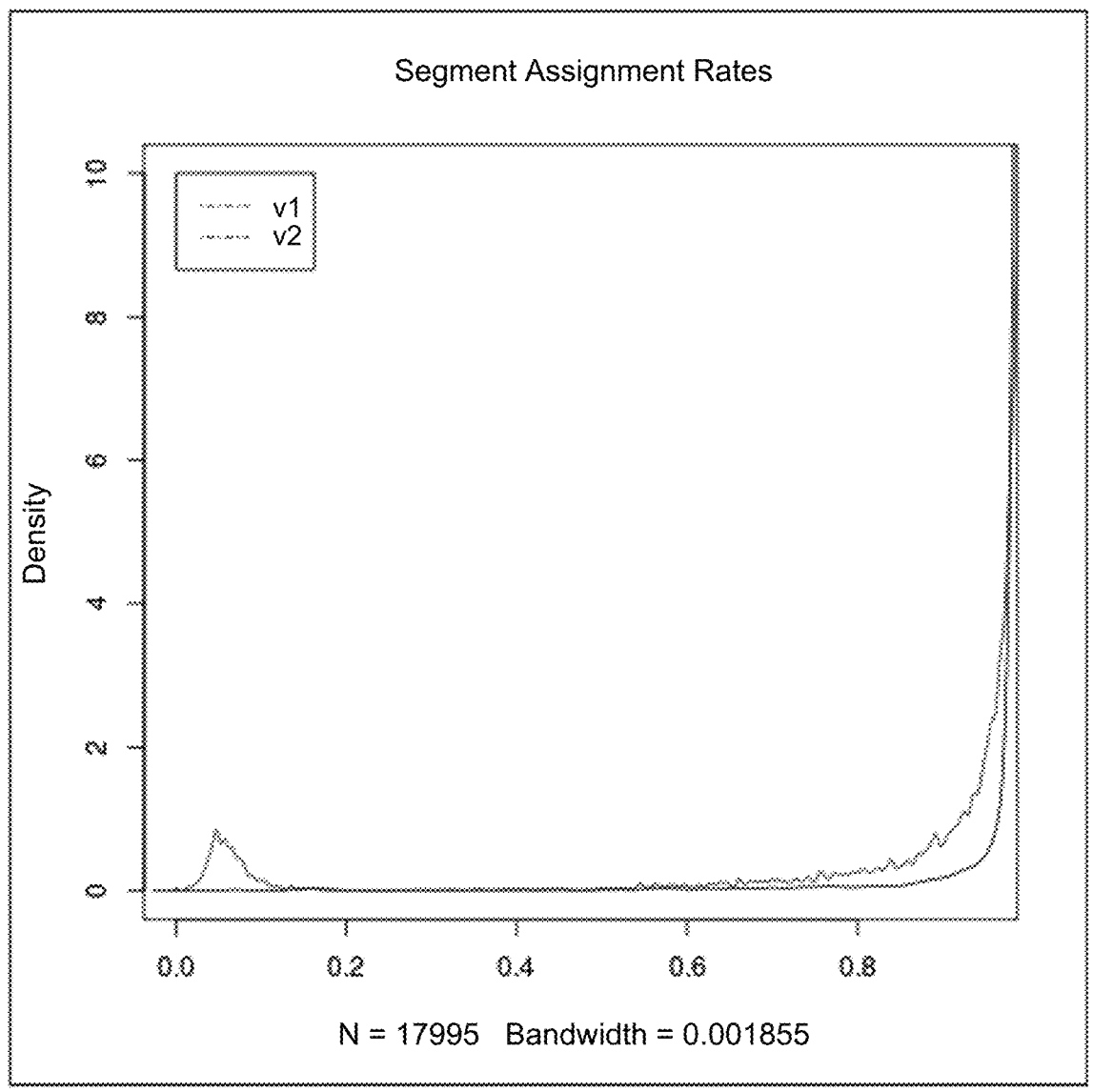

How often do match segments do get a parent label? FIGS. 10A and 10B illustrates the results of distribution of segment assignment rate. Each segment assignment rate is the proportion of one person's match segments that are given a parent label. Notice the clump of low assignments in version 1 has disappeared.

Factor of Improvement: number of people with a bad experience in version 1 for every one person with a bad experience in version 2, Judging by the assignment rate (i.e., if you believe having fewer than X % of matches labeled is a bad experience).

| | Version 1 | Version 2 | Factor of Improvement |
|---|---|---|---|
| Proportion below the 1% assignment rate | 0.03% | 0.02% | 1.50 |
| Proportion below the 5% assignment rate | 1.32% | 0.03% | 44.00 |
| Proportion below the 10% assignment rate | 3.40% | 0.08% | 42.50 |
| Proportion below the 20% assignment rate | 3.76% | 0.28% | 13.43 |

-continued

|  | Version 1 | Version 2 | Factor of Improvement |
|---|---|---|---|
| Proportion below the 30% assignment rate | 3.77% | 0.39% | 9.67 |
| Proportion below the 40% assignment rate | 3.78% | 0.56% | 6.75 |
| Proportion below the 50% assignment rate | 3.86% | 0.76% | 5.08 |
| Proportion below the 60% assignment rate | 4.41% | 1.01% | 4.37 |
| Proportion below the 70% assignment rate | 5.44% | 1.32% | 4.12 |

-continued

|  | Version 1 | Version 2 | Factor of Improvement |
|---|---|---|---|
| Proportion below the 80% assignment rate | 7.29% | 1.85% | 3.94 |
| Proportion below the 90% assignment rate | 11.49% | 2.77% | 4.15 |
| Proportion below the 95% assignment rate | 16.96% | 4.18% | 4.06 |
| Proportion below the 99% assignment rate | 34.30% | 9.48% | 3.62 |

Parent and Grandparent Segment Label Results by Scenario Version 2 Only

| Scenario | Parent-Level Correct Assignment (~precision) | Parent-Level Assignment Rate (~recall) | Grandparent-Level Correct Assignment (~precision) | Grandparent-Level Assignment Rate (~recall) |
|---|---|---|---|---|
| 2 Parents and 4 Grandparents tested (small sample - 100 cases) | 99.80% median, 99.47% mean | 100.00% median, 100.00% mean | 99.80% median, 99.46% mean | 99.20% median, 98.39% mean |
| No parents, but all 4 Grandparents | 99.80% median, 99.46% mean | 100.00% median, 100.00% mean | 99.70% median, 97.75% mean | 99.90% median, 98.67% mean |
| No parents, two Grandparents (only side with the 2 grandparents is evaluated) | 100% median, 99.68% mean | 100% median, 100% mean | 99.9% median, 99.02% mean | 100% median, 98.94% mean |
| One parent, no grandparents | 99.75% median, 99.46% mean | 100.00% median, 100.00% mean | 99.15% median, 94.95% mean | 97.85% median, 92.95% mean |
| No siblings | 100.00% median, 98.60% mean | 100.00% median, 98.81% mean | 93.60% median, 89.33% mean | 96.70% median, 92.12% mean |
| One sibling | 99.50% median, 98.40% mean | 100.00% median, 98.88% mean | 94.70% median, 91.91% mean | 95.40% median, 90.08% mean |
| Multiple siblings | 99.00% median, 98.18% mean | 100.00% median, 99.42% mean | 94.35% median, 90.84% mean | 96.10% median, 91.04% mean |
| No close matches (zero M1-M4) | 99.80% median, 97.30% mean | 100.00% median, 97.42% mean | 93.90% median, 87.50% mean | 95.60% median, 90.34% mean |
| A few close matches (1-9 M1-M4) | 99.70% median, 98.76% mean | 100.00% median, 99.25% mean | 94.10% median, 90.92% mean | 96.20% median, 91.45% mean |
| Many close matches (10+ M1-M4) | 98.80% median, 98.02% mean | 100.00% median, 99.95% mean | 97.90% median, 96.13% mean | 96.00% median, 93.67% mean |

IBDphase Vs. Unphased Match Genotype Data

| Parent-level Assignment Correctness | Correct Assignment | Proportion Assigned |
|---|---|---|
| Using unphased match genotype data | 99.6% median, 98.2% mean | 100% median, 98.8% mean |
| Using IBDphased match genotype data | 99.7% median, 98.3% mean | 100% median, 98.7% mean |
| Correctness |  |  |
| Using unphased match genotype data | 95.1% median, 90.0% mean | 95.9% median, 90.7% mean |
| Using IBDphased match genotype data | 94.2% median, 90.7% mean | 96.6% median, 91.4% mean |

Computing Machine Architecture

Figure 11:
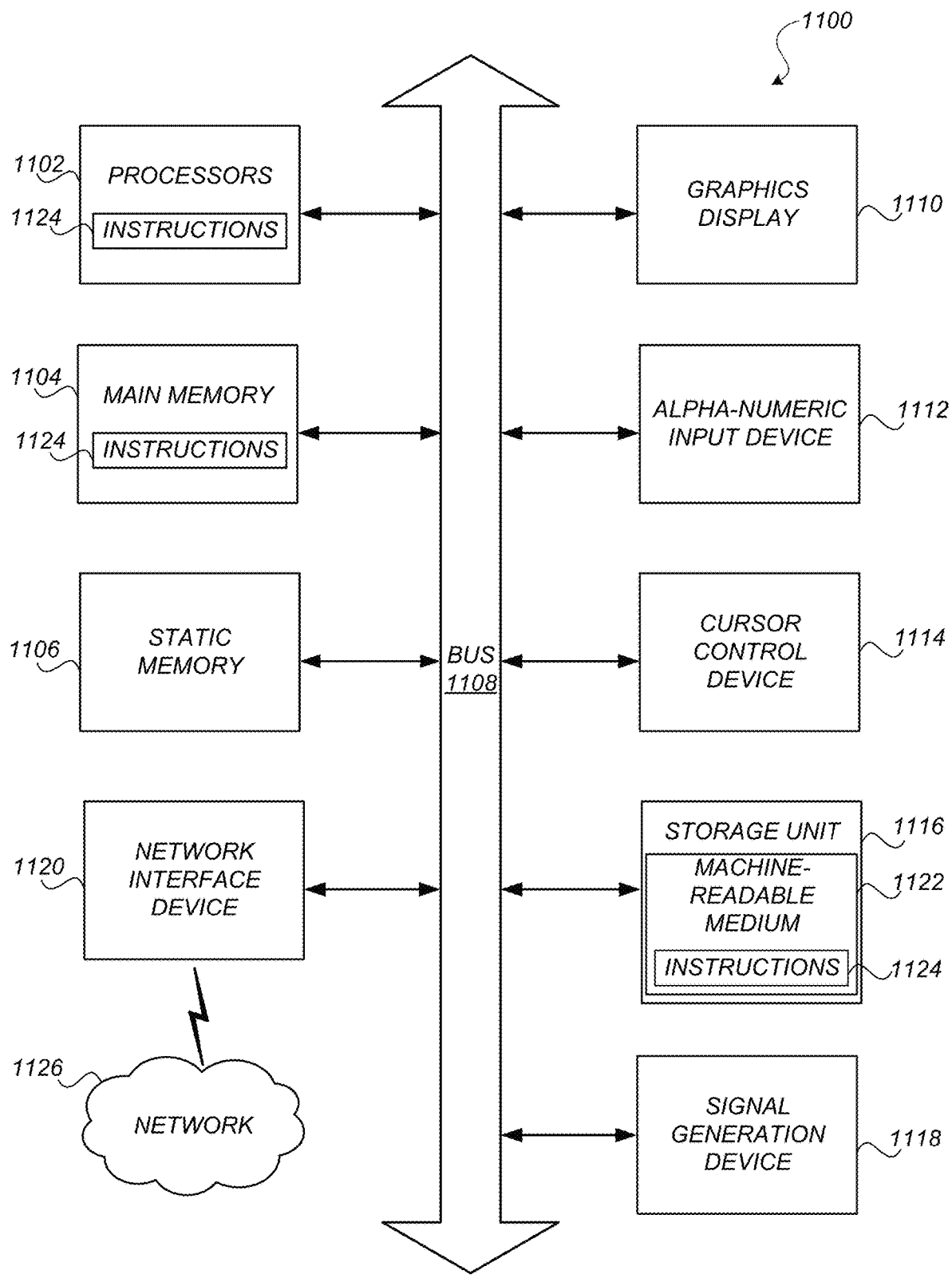
FIG. 11 is a block diagram of an example computing device, in accordance with some embodiments.

FIG. 11 is a block diagram illustrating components of an example computing machine that is capable of reading instructions from a computer-readable medium and execute them in a processor (or controller). A computer described herein may include a single computing machine shown in FIG. 11, a virtual machine, a distributed computing system that includes multiple nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIGS. 1 and 2, including but not limited to, the client device 110, the computing server 130, and various engines, interfaces, terminals, and machines shown in FIG. 2A. While FIG. 11 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1100 may also include a memory 1104 that store computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1102 and reduces the space required for the memory 1104. For example, the database processing techniques and machine learning methods described herein reduce the complexity of the computation of the processors 1102 by applying one or more novel techniques that simplify the steps in training, reaching convergence, and generating results of the processors 1102. The algorithms described herein also reduces the size of the models and datasets to reduce the storage space requirement for memory 1104.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processors 1102, displays a graphical user interface (GUI) to display one or more results and data generated by the processes described herein. The computer system 1100 may also include alphanumeric input device 1112 (e.g., a keyboard), a cursor control device 1114 (e.g., a mouse, a trackball, a joystick, a motion sensor, or other pointing instruments), a storage unit 1116 (a hard drive, a solid-state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

As discussed in further detail above, the process for inheritance separation such as the process 300 discussed herein improves the technology in the field of DNA sequencing and bioinformatics. For example, a subset of the SNPs in an individual's genome may be detected with SNP genotyping through DNA sequencing. In DNA sequencing, a laboratory assay or a massively parallel sequencing process often starts with a primer that is bindable to sequences from both chromosomes. As a result, SNP genotyping often identifies a pair of alleles for a given position, but does not identify which allele corresponds to which haplotype, i.e., SNP genotyping does not identify the homomorphic chromosome (of the homomorphic pair) to which each allele corresponds. Thus, SNP genotyping produces an unordered pair of alleles, where each allele corresponds to one of two haplotypes. As such, separation of haplotypes from genotyping requires an additional process. The process 300 provides a solution to the inherent deficiency of the laboratory sequencing technique.

The process for inheritance separation such as the process 300 discussed herein also improves the technical field of bioinformatics. The first level of separation using the process 300 provides a long-range cross-chromosome separation of haplotypes for each parental inheritance with a high confidence. A conventional phasing algorithm can only separate haplotypes at a local level. Conventional phasing algorithm provides no confidence of which haplotype is inherited from which parent for sequences that are distanced apart. Conventional phasing algorithms are not able to provide cross-chromosome phasing. For example, haplotypes A and B separated at chromosome pair 1 and haplotypes C and D separates at chromosome pair 2 have no association under conventional phasing algorithms that primarily rely on Markov models. Conventional phasing algorithms are not able to tell that haplotype A and haplotype C are inherited from the same parent or haplotype A and haplotype D are inherited from the same parent. In contrast, the process 300, which may be referred to IBD-phasing, uses a large amount of relative and genetic matched individuals' genomic data to determine inheritance and provides a high confidence of separation even across chromosomes. As such, a cross-chromosome long-range haplotype with a high confidence that such haplotype is inherited from one parent can be generated. Because parental genetic materials can be largely separated, additional level of inheritance separations can be further performed using the process 300, each level with high confidence of accuracy.

The process 300 may also improve the speed of operation of a computer running the process 300. In some embodiments, the database of matched individuals 302 can be reduced to a small set in the proximity of 10 GB that can be loaded in computer RAM. As such, the matching, delimiting, clustering algorithms, and fine tuning processes discussed herein may be performed using the data store in the RAM. This significantly increases the processing speed in various steps described in this disclosure.

By using the process for inheritance separation such as the process 300 discussed herein, it is novel that a human's genome can be separated by parents, grandparents, and ancestors because the process 300 is a first process that allows genomic data to be separated by inheritance in a long range and cross-chromosome manner. The lang range nature of the separation using the process 300 allows the process 300 to be repeated at higher level as long as sufficient data is available. The ability of attributing a genomic range to a more distanced ancestor (e.g., grandparent or above) allows many downstream bioinformatics applications, as such the study of how inherited traits are passed down and the identification of genes that may be associated with a phenotype expression.

The process for inheritance separation such as the process 300 discussed herein cannot be performed mentally. The separation of inheritance requires a large amount of IBD data to map segments to different locations of the genomic. The process is not viable using only a small amount of data using papers and pens. The clustering algorithms and other related algorithms also improve the field of machine learning by applying machine learning and other optimization techniques to clustering various genomic ranges. Such clustering algorithms may only be iteratively executed by a computer and cannot be performed mentally.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

The invention claimed is:

1. A computer-implemented method for determining data inheritance of data segments, the computer-implemented method comprising:
   receiving a target data instance of a target individual;
   comparing a plurality of additional data instances with the target data instance to identify a plurality of matched data segments, wherein each matched segment is shared between the target individual and an additional individual;
   classifying the matched segments into a plurality of sub-cluster pairs, wherein each sub-cluster pair represents a data locus in a plurality of data loci, and wherein each sub-cluster pair has a first side comprising a first set of matched segments and a second side comprising a second set of matched segments, wherein the target data instance and the plurality of additional data instances are genetic datasets, and the matched data segments are identity by descent (IBD) matched segments, and wherein each of the matched segments in matches the target data instance in a genetic locus, and classifying a set of match segments into a sub-cluster pair comprises:
      identifying a heterozygous allele site in the genetic locus of the target data instance, the target data instance having a first allele and a second allele at the heterozygous allele site,
      classifying a first set of matched segments having a first corresponding site that has the first allele and is homozygous to the first side, and
      classifying a second set of matched segments having a second corresponding site that has the second allele and is homozygous to the second side;
   generating a super-cluster by linking one or more first sides and one or more second sides across the plurality of sub-cluster pairs; and
   generating an inheritance separation of the target data instance of the target individual from the super-cluster.

2. The computer-implemented method of claim 1, wherein generating the super-cluster comprises:
   defining a candidate configuration for the super-cluster, the candidate configuration comprises candidate side assignments of inheritance sides across the plurality of sub-cluster pairs;
   determining a number of common additional data instances that are classified in the candidate configuration; and
   switching the candidate side assignments to increase number of common additional data instances that are classified in the candidate configuration.

3. The computer-implemented method of claim 1, wherein the first side is a first parental side and the second side is a second parental side.

4. The computer-implemented method of claim 1, further comprising:
   identifying the super-cluster as either paternal or maternal by one or more of the following:
      accessing genealogical data of the target individual to identify at least one individual in the genealogical data, the at least one identified individual belonging to either a paternal side or maternal side of the target individual according to the genealogical data,
      transmitting, to a user, an inquiry about a relationship between the target individual and one of the additional individuals,
      examining a genetic locus of sex chromosomes in the super-cluster to determine whether the super-cluster is paternal or maternal,
      examining a genetic locus of mitochondrial DNA in the super-cluster to determine whether the super-cluster is paternal or maternal,
      determining an ethnicity of one or more identified additional individuals belonging to the super-cluster, and/or
      transmitting, to a user, an inquiry about a genetic community to which the target individual belongs.

5. The computer-implemented method of claim 1, further comprising:

determining a confidence metric measuring confidence associated with an assignment of the one or more identified additional individuals to the super-cluster.

6. The computer-implemented method of claim 1, wherein each of the matched segments classified into the plurality of sub-cluster pairs overlaps a corresponding segment of the target data instance by more than a predetermined threshold amount.

7. The computer-implemented method of claim 1, wherein linking one or more first sides and one or more second sides across the plurality of sub-cluster pairs is based on a heuristic scoring approach measuring similarities among parental groups across the plurality of sub-cluster pairs.

8. The computer-implemented method of claim 1, wherein linking one or more first sides and one or more second sides across the plurality of sub-cluster pairs is based on a bipartite graph that matches different sub-cluster and sub-parent combinations.

9. The computer-implemented method of claim 1, wherein the target data instance is a genetic dataset and the computer-implemented method further comprises correcting a genotyping error or a haplotype phasing error in the target data instance.

10. The computer-implemented method of claim 1, wherein the super-cluster is a first super-cluster, and the method further comprises:
identifying a second super-cluster;
identifying one or more additional individuals whose additional individual datasets are classified to both the first and second super-clusters; and
removing the identified additional individuals from being associated with the first super-cluster or the second super-cluster.

11. The computer-implemented method of claim 1, further comprising:
generating a higher inheritance level of super-cluster from the inheritance separation of the target data instance.

12. A system comprising:
one or more processors; and
memory configured to store code comprising instructions, wherein the instructions, when executed by the one or more processors, cause the one or more processors to perform steps comprising:
receiving a target data instance of a target individual;
comparing a plurality of additional data instances with the target data instance to identify a plurality of matched data segments, wherein each matched segment is shared between the target individual and an additional individual;
classifying the matched segments into a plurality of sub-cluster pairs, wherein each sub-cluster pair represents a data locus in a plurality of data loci, and wherein each sub-cluster pair has a first side comprising a first set of matched segments and a second side comprising a second set of matched segments, wherein the target data instance and the plurality of additional data instances are genetic datasets, and the matched data segments are identity by descent (IBD) matched segments, and wherein each of the matched segments in matches the target data instance in a genetic locus, and classifying a set of match segments into a sub-cluster pair comprises:
identifying a heterozygous allele site in the genetic locus of the target data instance, the target data instance having a first allele and a second allele at the heterozygous allele site,
classifying a first set of matched segments having a first corresponding site that has the first allele and is homozygous to the first side, and
classifying a second set of matched segments having a second corresponding site that has the second allele and is homozygous to the second side;
generating a super-cluster by linking one or more first sides and one or more second sides across the plurality of sub-cluster pairs; and
generating an inheritance separation of the target data instance of the target individual from the super-cluster.

13. The system of claim 12, wherein generating the super-cluster comprises:
defining a candidate configuration for the super-cluster, the candidate configuration comprises candidate side assignments of inheritance sides across the plurality of sub-cluster pairs;
determining a number of common additional data instances that are classified in the candidate configuration; and
switching the candidate side assignments to increase number of common additional data instances that are classified in the candidate configuration.

14. The system of claim 12, wherein the target data instance and the plurality of additional data instances are genetic datasets, and the matched data segments are identity by descent (IBD) matched segments.

15. The system of claim 12, further comprising:
identifying the super-cluster as either paternal or maternal by one or more of the following:
accessing genealogical data of the target individual to identify at least one individual in the genealogical data, the at least one identified individual belonging to either a paternal side or maternal side of the target individual according to the genealogical data,
transmitting, to a user, an inquiry about a relationship between the target individual and one of the additional individuals,
examining a genetic locus of sex chromosomes in the super-cluster to determine whether the super-cluster is paternal or maternal,
examining a genetic locus of mitochondrial DNA in the super-cluster to determine whether the super-cluster is paternal or maternal,
determining an ethnicity of one or more identified additional individuals belonging to the super-cluster, and/or
transmitting, to a user, an inquiry about a genetic community to which the target individual belongs.

16. A non-transitory computer-readable medium configured to store code comprising instructions, wherein the instructions, when executed by one or more processors, cause the one or more processors to perform steps comprising:
receiving a target data instance of a target individual;
comparing a plurality of additional data instances with the target data instance to identify a plurality of matched data segments, wherein each matched segment is shared between the target individual and an additional individual;
classifying the matched segments into a plurality of sub-cluster pairs, wherein each sub-cluster pair represents a data locus in a plurality of data loci, and wherein each sub-cluster pair has a first side comprising a first set of matched segments and a second side comprising a second set of matched segments, wherein the target data instance and the plurality of additional data instances are genetic datasets, and the matched data segments are identity by descent (IBD) matched segments, and wherein each of the matched segments in matches the target data instance in a genetic locus, and classifying a set of match segments into a sub-cluster pair comprises:
  identifying a heterozygous allele site in the genetic locus of the target data instance, the target data instance having a first allele and a second allele at the heterozygous allele site,
  classifying a first set of matched segments having a first corresponding site that has the first allele and is homozygous to the first side, and
  classifying a second set of matched segments having a second corresponding site that has the second allele and is homozygous to the second side;
generating a super-cluster by linking one or more first sides and one or more second sides across the plurality of sub-cluster pairs; and
generating an inheritance separation of the target data instance of the target individual from the super-cluster.

17. A computer-implemented method for determining data inheritance of data segments, the computer-implemented method comprising:
  receiving a target data instance of a target individual;
  comparing a plurality of additional data instances with the target data instance to identify a plurality of matched data segments, wherein each matched segment is shared between the target individual and an additional individual;
  classifying the matched segments into a plurality of sub-cluster pairs, wherein each sub-cluster pair represents a data locus in a plurality of data loci, and wherein each sub-cluster pair has a first side comprising a first set of matched segments and a second side comprising a second set of matched segments;
  generating a super-cluster by linking one or more first sides and one or more second sides across the plurality of sub-cluster pairs;
  identifying the super-cluster as either paternal or maternal by one or more of the following:
    accessing genealogical data of the target individual to identify at least one individual in the genealogical data, the at least one identified individual belonging to either a paternal side or maternal side of the target individual according to the genealogical data,
    transmitting, to a user, an inquiry about a relationship between the target individual and one of the additional individuals,
    examining a genetic locus of sex chromosomes in the super-cluster to determine whether the super-cluster is paternal or maternal,
    examining a genetic locus of mitochondrial DNA in the super-cluster to determine whether the super-cluster is paternal or maternal,
    determining an ethnicity of one or more identified additional individuals belonging to the super-cluster, and/or
    transmitting, to a user, an inquiry about a genetic community to which the target individual belongs; and
  generating an inheritance separation of the target data instance of the target individual from the super-cluster.

18. The computer-implemented method of claim 17, wherein generating the super-cluster comprises:
  defining a candidate configuration for the super-cluster, the candidate configuration comprises candidate side assignments of inheritance sides across the plurality of sub-cluster pairs;
  determining a number of common additional data instances that are classified in the candidate configuration; and
  switching the candidate side assignments to increase number of common additional data instances that are classified in the candidate configuration.

19. The computer-implemented method of claim 17, wherein the target data instance and the plurality of additional data instances are genetic datasets, and the matched data segments are identity by descent (IBD) matched segments.

20. The computer-implemented method of claim 17, further comprising:
  determining a confidence metric measuring confidence associated with an assignment of the one or more identified additional individuals to the super-cluster.

21. The computer-implemented method of claim 17, wherein each of the matched segments classified into the plurality of sub-cluster pairs overlaps a corresponding segment of the target data instance by more than a predetermined threshold amount.

22. The computer-implemented method of claim 17, wherein linking one or more first sides and one or more second sides across the plurality of sub-cluster pairs is based on a heuristic scoring approach measuring similarities among parental groups across the plurality of sub-cluster pairs.

23. The computer-implemented method of claim 17, wherein linking one or more first sides and one or more second sides across the plurality of sub-cluster pairs is based on a bipartite graph that matches different sub-cluster and sub-parent combinations.

24. The computer-implemented method of claim 17, wherein the target data instance is a genetic dataset and the computer-implemented method further comprises correcting a genotyping error or a haplotype phasing error in the target data instance.

25. The computer-implemented method of claim 17, wherein the super-cluster is a first super-cluster, and the method further comprises:
  identifying a second super-cluster;
  identifying one or more additional individuals whose additional individual datasets are classified to both the first and second super-clusters; and
  removing the identified additional individuals from being associated with the first super-cluster or the second super-cluster.

26. The computer-implemented method of claim 17, further comprising:
  generating a higher inheritance level of super-cluster from the inheritance separation of the target data instance.

27. The computer-implemented method of claim 17, wherein the inheritance separation is a phased result of genotype of the target individual.

28. A system comprising:
  one or more processors; and
  memory configured to store code comprising instructions, wherein the instructions, when executed by the one or more processors, cause the one or more processors to perform steps comprising:
    receiving a target data instance of a target individual;
    comparing a plurality of additional data instances with the target data instance to identify a plurality of matched data segments, wherein each matched segment is shared between the target individual and an additional individual;

classifying the matched segments into a plurality of sub-cluster pairs, wherein each sub-cluster pair represents a data locus in a plurality of data loci, and wherein each sub-cluster pair has a first side comprising a first set of matched segments and a second side comprising a second set of matched segments;

generating a super-cluster by linking one or more first sides and one or more second sides across the plurality of sub-cluster pairs;

identifying the super-cluster as either paternal or maternal by one or more of the following:

accessing genealogical data of the target individual to identify at least one individual in the genealogical data, the at least one identified individual belonging to either a paternal side or maternal side of the target individual according to the genealogical data, transmitting, to a user, an inquiry about a relationship between the target individual and one of the additional individuals, examining a genetic locus of sex chromosomes in the super-cluster to determine whether the super-cluster is paternal or maternal, examining a genetic locus of mitochondrial DNA in the super-cluster to determine whether the super-cluster is paternal or maternal, determining an ethnicity of one or more identified additional individuals belonging to the super-cluster, and/or transmitting, to a user, an inquiry about a genetic community to which the target individual belongs; and generating an inheritance separation of the target data instance of the target individual from the super-cluster.

29. The system of claim 28, wherein generating the super-cluster comprises:

defining a candidate configuration for the super-cluster, the candidate configuration comprises candidate side assignments of inheritance sides across the plurality of sub-cluster pairs;

determining a number of common additional data instances that are classified in the candidate configuration; and switching the candidate side assignments to increase number of common additional data instances that are classified in the candidate configuration.

30. The system of claim 28, wherein the target data instance and the plurality of additional data instances are genetic datasets, and the matched data segments are identity by descent (IBD) matched segments.

* * * * *